US009714306B2

(12) United States Patent
Yanagimoto et al.

(10) Patent No.: US 9,714,306 B2
(45) Date of Patent: Jul. 25, 2017

(54) OLEFIN RESIN AND METHOD FOR PRODUCING SAME

(71) Applicant: MITSUI CHEMICALS, INC., Tokyo (JP)

(72) Inventors: Yasushi Yanagimoto, Ichihara (JP); Tomoaki Matsugi, Kisarazu (JP); Akihiko Iwashita, Tokyo (JP); Tatsuya Nakamura, Ichihara (JP); Junji Saito, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 15/128,336

(22) PCT Filed: Mar. 26, 2015

(86) PCT No.: PCT/JP2015/059425
§ 371 (c)(1),
(2) Date: Sep. 22, 2016

(87) PCT Pub. No.: WO2015/147186
PCT Pub. Date: Oct. 1, 2015

(65) Prior Publication Data
US 2017/0101492 A1     Apr. 13, 2017

(30) Foreign Application Priority Data

Mar. 28, 2014 (JP) ................................ 2014-068305

(51) Int. Cl.
C08F 210/00 (2006.01)
C08F 210/16 (2006.01)

(52) U.S. Cl.
CPC .................. *C08F 210/16* (2013.01)

(58) Field of Classification Search
CPC .................................................. C08F 210/16
See application file for complete search history.

(56) References Cited

U.S. PATENT DOCUMENTS

| | | |
|---|---|---|
| 4,892,851 A | 1/1990 | Ewen et al. |
| 4,990,640 A | 2/1991 | Tsutsui et al. |
| 5,026,798 A | 6/1991 | Canich |
| 5,055,438 A | 10/1991 | Canich |
| 5,057,475 A | 10/1991 | Canich et al. |
| 5,096,867 A | 3/1992 | Canich |
| 5,153,157 A | 10/1992 | Hlatky et al. |
| 5,155,080 A | 10/1992 | Elder et al. |
| 5,158,920 A | 10/1992 | Razavi |
| 5,162,278 A | 11/1992 | Razavi |
| 5,223,467 A | 6/1993 | Razavi |
| 5,223,468 A | 6/1993 | Razavi |
| 5,225,500 A | 7/1993 | Elder et al. |
| 5,227,440 A | 7/1993 | Canich et al. |
| 5,241,025 A | 8/1993 | Hlatly et al. |
| 5,243,002 A | 9/1993 | Razavi |
| 5,264,405 A | 11/1993 | Canich |
| 5,278,119 A | 1/1994 | Turner et al. |
| 5,278,265 A | 1/1994 | Razavi |
| 5,292,838 A | 3/1994 | Razavi |
| 5,304,523 A | 4/1994 | Razavi |
| 5,321,106 A | 6/1994 | LaPointe |
| 5,334,677 A | 8/1994 | Razavi et al. |
| 5,384,299 A | 1/1995 | Turner et al. |
| 5,387,568 A | 2/1995 | Ewen et al. |
| 5,391,629 A | 2/1995 | Turner et al. |
| 5,407,884 A | 4/1995 | Turner et al. |
| 5,408,017 A | 4/1995 | Turner et al. |
| 5,420,217 A | 5/1995 | Canich |
| 5,470,927 A | 11/1995 | Turner et al. |
| 5,483,014 A | 1/1996 | Turner et al. |
| 5,504,169 A | 4/1996 | Canich |

(Continued)

FOREIGN PATENT DOCUMENTS

JP    H01-501950 A    7/1989
JP    H01-502036 A    7/1989

(Continued)

OTHER PUBLICATIONS

US 5,168,111 (withdrawn).

*Primary Examiner* — Rip A Lee

(74) *Attorney, Agent, or Firm* — Foley & Lardner LLP

(57) ABSTRACT

The present invention provides an olefin resin with an improved heat resistance, reduced stickiness, excellent optical and low temperature properties, as well as the balance between these physical properties. The olefin resin according to the present invention satisfies the following requirements: (I) a melting peak (Tm) is observed within the range of from 60° C. to 130° C., and the heat of fusion ΔH at the melting peak is within the range of from 5 to 150 J/g; (II) the percentage E (wt %) of a portion soluble in o-dichlorobenzene at 20° C. or lower, and the heat of fusion ΔH satisfy certain relationships; (III) the glass transition temperature (Tg) is from −80 to −30° C.; (IV) the spin-spin relaxation time (T2) of a component having the highest mobility, as obtained in a four-component approximation with a Lorentzian function performed for a free induction decay curve, is within the range of from 150 to 500 ms, and the abundance ratio of the component is within the range of from 15 to 50%; and (V) the intrinsic viscosity [η] as measured in decalin at 135° C. is within the range of from 0.1 to 12 dl/g.

7 Claims, 6 Drawing Sheets

(56) References Cited

U.S. PATENT DOCUMENTS

| | | | |
|---|---|---|---|
| 5,519,100 A | 5/1996 | Ewen et al. | |
| 5,547,675 A | 8/1996 | Canich | |
| 5,561,092 A | 10/1996 | Ewen et al. | |
| 5,589,556 A | 12/1996 | Razavi | |
| 5,599,761 A | 2/1997 | Turner | |
| 5,614,457 A | 3/1997 | Ewen et al. | |
| 5,621,126 A | 4/1997 | Canich et al. | |
| 5,631,391 A | 5/1997 | Canich | |
| 5,663,249 A | 9/1997 | Ewen et al. | |
| 5,723,560 A | 3/1998 | Canich | |
| 5,763,549 A | 6/1998 | Elder et al. | |
| 5,801,113 A | 9/1998 | Jejelowo et al. | |
| 5,807,939 A | 9/1998 | Elder et al. | |
| 5,883,202 A | 3/1999 | Ewen et al. | |
| 5,955,557 A * | 9/1999 | Machida | C08F 8/04 526/346 |
| 6,121,395 A | 9/2000 | Turner | |
| 6,197,985 B1 | 3/2001 | Kobata et al. | |
| 6,232,420 B1 | 5/2001 | Turner | |
| 6,245,706 B1 | 6/2001 | Hlatky | |
| 6,265,338 B1 | 7/2001 | Canich | |
| 6,294,625 B1 | 9/2001 | Hlatky et al. | |
| 6,355,592 B1 | 3/2002 | Hlatky et al. | |
| 6,380,341 B1 * | 4/2002 | Waymouth | C08F 10/00 526/160 |
| 6,417,120 B1 | 7/2002 | Mitchler et al. | |
| 6,423,795 B1 | 7/2002 | Canich et al. | |
| 6,617,466 B1 | 9/2003 | Canich | |
| 6,632,898 B1 | 10/2003 | Canich | |
| 6,897,261 B1 * | 5/2005 | Machida | C08F 290/04 525/240 |
| 6,939,928 B1 | 9/2005 | Kawai et al. | |
| 7,041,841 B1 | 5/2006 | Canich | |
| 7,163,907 B1 | 1/2007 | Canich et al. | |
| 7,569,646 B1 | 8/2009 | Canich | |
| 7,678,866 B2 * | 3/2010 | Yamada | C08L 23/06 525/241 |
| 8,431,662 B2 * | 4/2013 | Brant | C08F 10/00 526/134 |
| 2002/0155776 A1 | 10/2002 | Mitchler et al. | |
| 2002/0164491 A1 * | 11/2002 | Ogawa | C09J 7/0246 428/516 |
| 2003/0027955 A1 | 2/2003 | Ishii et al. | |
| 2003/0120003 A1 | 6/2003 | Kashiwa et al. | |
| 2005/0228155 A1 | 10/2005 | Kawai et al. | |
| 2006/0161013 A1 | 7/2006 | Tohi et al. | |
| 2006/0178491 A1 | 8/2006 | Canich | |
| 2006/0198983 A1 | 9/2006 | Patel | |
| 2006/0199006 A1 | 9/2006 | Poon et al. | |
| 2006/0199030 A1 | 9/2006 | Liang et al. | |
| 2006/0199744 A1 | 9/2006 | Walton et al. | |
| 2006/0199872 A1 | 9/2006 | Prieto et al. | |
| 2006/0199884 A1 | 9/2006 | Hoenig et al. | |
| 2006/0199887 A1 | 9/2006 | Liang et al. | |
| 2006/0199896 A1 | 9/2006 | Walton et al. | |
| 2006/0199897 A1 | 9/2006 | Karjala et al. | |
| 2006/0199905 A1 | 9/2006 | Hughes et al. | |
| 2006/0199906 A1 | 9/2006 | Walton et al. | |
| 2006/0199907 A1 | 9/2006 | Chang et al. | |
| 2006/0199908 A1 | 9/2006 | Cheung et al. | |
| 2006/0199910 A1 | 9/2006 | Walton et al. | |
| 2006/0199911 A1 | 9/2006 | Markovich et al. | |
| 2006/0199912 A1 | 9/2006 | Fuchs et al. | |
| 2006/0199914 A1 | 9/2006 | Harris et al. | |
| 2006/0199930 A1 | 9/2006 | Li Pi Shan et al. | |
| 2006/0199931 A1 | 9/2006 | Poon et al. | |
| 2006/0205833 A1 | 9/2006 | Martinez et al. | |
| 2006/0211819 A1 | 9/2006 | Hoenig et al. | |
| 2007/0010616 A1 | 1/2007 | Kapur et al. | |
| 2007/0066756 A1 | 3/2007 | Poon et al. | |
| 2007/0078222 A1 | 4/2007 | Chang et al. | |
| 2007/0112127 A1 | 5/2007 | Soediono et al. | |
| 2007/0155900 A1 | 7/2007 | Chang et al. | |
| 2007/0167315 A1 | 7/2007 | Arriola et al. | |
| 2007/0167578 A1 | 7/2007 | Arriola et al. | |
| 2007/0202330 A1 | 8/2007 | Peng et al. | |
| 2007/0219334 A1 | 9/2007 | Li Pi Shan et al. | |
| 2008/0090983 A1 | 4/2008 | Satoh et al. | |
| 2008/0177242 A1 | 7/2008 | Chang et al. | |
| 2008/0234435 A1 | 9/2008 | Chang et al. | |
| 2008/0269388 A1 | 10/2008 | Markovich et al. | |
| 2008/0280517 A1 | 11/2008 | Chang et al. | |
| 2008/0281037 A1 | 11/2008 | Karjala et al. | |
| 2008/0311812 A1 | 12/2008 | Arriola et al. | |
| 2009/0042472 A1 | 2/2009 | Poon et al. | |
| 2009/0105417 A1 | 4/2009 | Walton et al. | |
| 2009/0247033 A1 | 10/2009 | Peng et al. | |
| 2009/0318640 A1 | 12/2009 | Brant et al. | |
| 2009/0318644 A1 | 12/2009 | Brant et al. | |
| 2009/0318646 A1 | 12/2009 | Brant et al. | |
| 2009/0318647 A1 | 12/2009 | Hagadorn et al. | |
| 2009/0324914 A1 | 12/2009 | Liang et al. | |
| 2010/0038290 A1 | 2/2010 | Wang et al. | |
| 2010/0069574 A1 | 3/2010 | Shan et al. | |
| 2010/0170829 A1 | 7/2010 | Ng et al. | |
| 2010/0240818 A1 | 9/2010 | Walton et al. | |
| 2010/0279571 A1 | 11/2010 | Poon et al. | |
| 2010/0292421 A1 | 11/2010 | Bando | |
| 2011/0003929 A1 | 1/2011 | Soediono et al. | |
| 2011/0118416 A1 | 5/2011 | Arriola et al. | |
| 2011/0124818 A1 | 5/2011 | Arriola et al. | |
| 2011/0144240 A1 | 6/2011 | Harris et al. | |
| 2011/0152437 A1 | 6/2011 | Harris et al. | |
| 2011/0230108 A1 | 9/2011 | Arriola et al. | |
| 2011/0282017 A1 | 11/2011 | Kaji et al. | |
| 2012/0309903 A1 | 12/2012 | Brant et al. | |
| 2013/0018150 A1 | 1/2013 | Walton et al. | |
| 2013/0030092 A1 | 1/2013 | Arriola et al. | |
| 2013/0030126 A1 | 1/2013 | Hagadorn et al. | |
| 2013/0030135 A1 | 1/2013 | Hagadorn et al. | |
| 2013/0048204 A1 | 2/2013 | Chang et al. | |
| 2013/0059992 A1 | 3/2013 | Brant et al. | |
| 2013/0066103 A1 | 3/2013 | Brant et al. | |
| 2013/0085234 A1 | 4/2013 | Harris et al. | |
| 2013/0137830 A1 | 5/2013 | Brant et al. | |
| 2013/0281641 A1 * | 10/2013 | Kolb | C08F 4/76 526/126 |
| 2014/0114031 A1 | 4/2014 | Bando et al. | |
| 2014/0141228 A1 | 5/2014 | Fuchs et al. | |
| 2014/0249286 A1 | 9/2014 | Arriola et al. | |
| 2016/0060552 A1 | 3/2016 | Ng et al. | |

FOREIGN PATENT DOCUMENTS

| | | | | |
|---|---|---|---|---|
| JP | H02-078687 A | 3/1990 | | |
| JP | H03-179005 A | 8/1991 | | |
| JP | H03-179006 A | 8/1991 | | |
| JP | H03-207703 A | 9/1991 | | |
| JP | H03-207704 A | 9/1991 | | |
| JP | H11-140113 A | 5/1999 | | |
| JP | 2000-038410 A | 2/2000 | | |
| JP | 2000-095810 A | 4/2000 | | |
| JP | 2002-105132 A | 4/2002 | | |
| JP | 2002-275319 A * | 9/2002 | | C08L 23/02 |
| JP | 2003-73412 A | 3/2003 | | |
| JP | 2003-268169 A * | 9/2003 | | C08L 23/02 |
| JP | 2004-204058 A | 7/2004 | | |
| JP | 2006-2057 A * | 1/2006 | | C08F 4/646 |
| JP | 2006-008841 A | 1/2006 | | |
| JP | 2006-233207 A | 9/2006 | | |
| JP | 2007-039540 A | 2/2007 | | |
| JP | 2007-039541 A | 2/2007 | | |
| JP | 2007-529617 A | 10/2007 | | |
| JP | 2009-144148 A | 7/2009 | | |
| JP | 2013-220992 A | 10/2013 | | |
| WO | WO 01/27124 A1 | 4/2001 | | |
| WO | WO 2004/029062 A1 | 4/2004 | | |
| WO | WO 2006/057229 A1 | 6/2006 | | |
| WO | WO 2009/155510 A2 | 12/2009 | | |
| WO | WO 2010/055652 A1 | 5/2010 | | |

* cited by examiner

OLEFIN RESIN AND METHOD FOR PRODUCING SAME

CROSS-REFERENCE TO RELATED APPLICATIONS

The present application is a U.S. national stage application claiming the benefit of International Patent Application No. PCT/JP2015/059425, filed Mar. 26, 2015, which claims the benefit of priority to Japanese Patent Application No. 2014-068305, filed Mar. 28, 2014, the entireties of which are hereby incorporated by reference.

TECHNICAL FIELD

The present invention relates to an olefin resin and a method for producing the same.

BACKGROUND ART

Olefin resins are molded by various molding methods and used in a variety of applications. Properties required for the olefin resins vary depending on the molding methods or applications.

Of the olefin resins, ethylene/α-olefin copolymers such as ethylene/propylene copolymer, ethylene/butene copolymer, and ethylene/octene copolymer are widely used in automobile parts such as bumpers and instrument panels, packaging materials (such as low temperature heat sealable films and easy peel films), sporting goods (such as midsoles in sports shoes), and wire coverings, because of their excellent properties, such as being lightweight, having a low specific gravity, flexibility, low melting point, and excellent compatibility with other olefin resins, and being easily recyclable. At the same time, improvements have been demanded, because of the problems that ethylene/α-olefin copolymers have a poor heat resistance due to being non-crystalline or low-crystalline polymers, and that the resulting molded articles may be sticky depending on the proportion of ethylene structural units.

In order to solve the above mentioned problems, studies have been reported in which an effort is made to arrange a crystalline segment and a non-crystalline or low-crystalline segment in blocks during the polymerization stage in the production of an olefin copolymer. Patent Document 1 discloses a technique to produce an olefin block copolymer in which a crystalline ethylene homopolymer segment and an ethylene copolymer segment are arranged on a straight-chain using a specific living polymerization catalyst. Further, Patent Document 2 discloses that an olefin block copolymer having a multi-block structure can be obtained by using two different types of transition metal complex catalysts varying in copolymerizability, and by adding a zinc compound to allow a reversible chain transfer reaction to occur through the zinc compound.

The copolymers disclosed in these documents are proposed for the purpose of improving the heat resistance by incorporating a crystalline segment into the polymer. However, the copolymer disclosed in Patent Document 2, in particular, is associated with other problems that the zinc compound used as a chain transfer agent remains in the finally resulting polymer component, and that the improvement in reducing the stickiness is limited because of the formation of a copolymerization component which remained unincorporated into the block structure. Further, in the copolymers obtained by the methods disclosed in the above mentioned Patent Document 1 and Patent Document 2, the number of free terminals of the crystalline segment per one molecule is limited to 2 or less, in principle, and accordingly, the size of spherulites formed during the crystallization process cannot be controlled, possibly leading to a deterioration of mechanical performance and optical properties.

CITATION LIST

Patent Documents

Patent Document 1 JP 2004-204058 A
Patent Document 2 JP 2007-529617 A

SUMMARY OF THE INVENTION

Problems to be Solved by the Invention

In view of the above background art, an object of the present invention is to provide an olefin resin, in which problems associated with the existing olefin copolymers such as low heat resistance and stickiness are improved, and which has excellent optical properties and low temperature properties, as well as an improved balance between these physical properties.

Means for Solving the Problems

The present inventors have found out, as a result of intensive studies to solve the above mentioned problems, that an olefin resin that satisfies specific requirements improves problems associated with the existing olefin copolymers such as low heat resistance and stickiness, and has excellent optical properties and low temperature properties, as well as an improved balance between these physical properties.

In other words, the present invention relates to the following [1] to [7].

[1] An olefin resin satisfying the following requirements (I) to (V):

(I) a melting peak (Tm) as measured by differential scanning calorimetry (DSC) is observed within the range of from 60° C. to 130° C., and the heat of fusion ΔH at the melting peak is within the range of from 5 to 150 J/g;

(II) the percentage E (wt %) of a portion soluble in o-dichlorobenzene at 20° C. or lower as measured by cross-fractionation chromatography (CFC), and the heat of fusion ΔH as described in (I) above, satisfy the following relationships:

when the ΔH is 5 J/g or more and less than 15 J/g, the value E is 45 wt % or less, when the ΔH is 15 J/g or more and less than 30 J/g, the value E is 40 wt % or less, and when the ΔH is 30 J/g or more, the value E is 30 wt % or less;

(III) the glass transition temperature (Tg) as measured by differential scanning calorimetry (DSC) is within the range of −80 to −30° C.;

(IV) the spin-spin relaxation time (T2) of a component having the highest mobility, as obtained in a four-component approximation by a Lorentzian function performed for a free induction decay curve obtained by Carr Purcell Meiboom Gill method in a pulsed nuclear magnetic resonance measurement (pulsed NMR) at 200° C., is within the range of from 150 to 500 ms, and the abundance ratio of the component is within the range of from 15 to 50%; and (V) the intrinsic viscosity [η] as measured in decalin at 135° C. is within the range of from 0.1 to 12 dl/g.

[2] The olefin resin according to [1], wherein the olefin resin has a tensile elastic modulus in accordance with ASTM D638 within the range of from 2 to 120 MPa.

[3] An olefin polymer (R1) composed of a main chain polymer and a side chain polymer satisfying the following requirements:

(i) a main chain is composed of repeating units derived from ethylene, and repeating units derived from at least one α-olefin selected from α-olefins having from 3 to 20 carbon atoms, wherein the content of the repeating units derived from the α-olefin in the main chain is within the range of from 5 to 40 mol %;

(ii) the main chain has an intrinsic viscosity [η] as measured in decalin at 135° C. within the range of from 0.5 to 5 dl/g;

(iii) a side chain(s) is/are composed of repeating units derived from ethylene, and optional repeating units derived from at least one α-olefin selected from α-olefins having from 3 to 20 carbon atoms, wherein the content of the repeating units derived from ethylene in the side chain(s) is within the range of from 95 to 100 mol %;

(iv) the side chain(s) has/have a weight average molecular weight within the range of from 500 to 10,000; and (v) the side chain(s) is/are bound to the main chain at a ratio of 0.5 to 20 side chains per 1,000 main chain carbon atoms.

[4] A method for producing the olefin resin according to [1] or [2], the method comprising the step of copolymerizing ethylene and at least one α-olefin selected from α-olefins having from 3 to 20 carbon atoms in the presence of an olefin polymerization catalyst comprising each of the following components (A) to (C):

(A) a transition metal compound of a transition metal of Group 4 in the periodic table, the compound comprising a ligand having a cyclopentadienyl skeleton;

(B) at least one transition metal compound selected from compounds represented by the following general formulae [B0], [B1], and [B2]; and (C) at least one compound selected from an organometallic compound (C-1), an organoaluminum oxy compound (C-2), and a compound (C-3) which reacts with the transition metal compound (A) or the transition metal compound (B) to form an ion pair;

[Chem. 1]

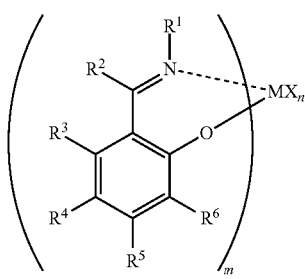

[B0]

(wherein in the general formula [B0],

M represents a transition metal atom of Group 4 or 5 in the periodic table;

m represents an integer of from 1 to 4;

$R^1$ represents an acyclic hydrocarbon group ($C_{n'}H_{2n'+1}$, n'=1 to 20) having from 1 to 20 carbon atoms or a hydrogen atom;

$R^2$ to $R^6$, which may be the same or different from each other, each represents a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group, and two or more of these are optionally bound together to form a ring;

in cases where m is two or more, two of the groups represented by $R^2$ to $R^6$ are optionally bound to each other; n is a number satisfying the valence of M;

X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group; and in cases where n is two or more, Xs may be the same or different from each other, and a plurality of groups represented by X may be bonded to each other to form a ring)

[Chem. 2]

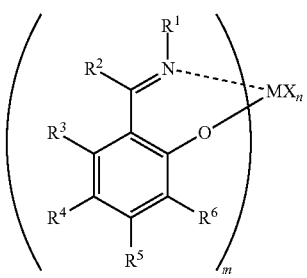

[B1]

(wherein in the general formula [B1],

M represents a transition metal of the Group 4 or 5 in the periodic table; m represents an integer of from 1 to 4;

$R^1$ represents an alicyclic hydrocarbon group of a 3- to 10-membered ring, optionally including one or more substituents; $R^2$ to $R^6$, which may be the same or different from each other, each represents a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group, and two or more of these are optionally bound together to form a ring;

in cases where m is two or more, two of the groups represented by $R^2$ to $R^6$ are optionally bound to each other; n is a number satisfying the valence of M;

X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group; and in cases where n is two or more, Xs may be the same or different from each other, and a plurality of groups represented by X may be bonded to each other to form a ring)

[Chem. 3]

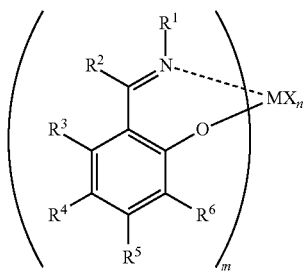

[B2]

(wherein in the general formula [B2],

M represents a transition metal of the Group 4 or 5 in the periodic table; m represents an integer of from 1 to 4;

$R^1$ represents a bicyclic aliphatic hydrocarbon group having from 4 to 20 carbon atoms, optionally containing one or more substituents, wherein the two rings of the bicyclic aliphatic hydrocarbon group share at least one or more carbon atoms;

$R^2$ to $R^6$, which may be the same or different from each other, each represents a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group, and two or more of these are optionally bound together to form a ring;

in cases where m is two or more, two of the groups represented by $R^2$ to $R^6$ are optionally bound to each other; n is a number satisfying the valence of M;

X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group; and in cases where n is two or more, Xs may be the same or different from each other, and a plurality of groups represented by X may be bonded to each other to form a ring).

[5] The method for producing the olefin resin, according to [4], wherein the transition metal compound (A) is a bridged metallocene compound represented by the following general formula (I):

[Chem. 4]

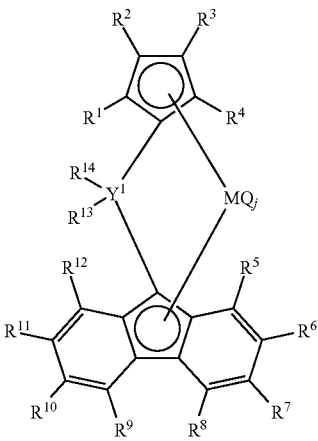

(I)

(wherein in the formula (I), $R^1$, $R^2$, $R^3$, $R^4$, $R^5$, $R^8$, $R^9$ and $R^{12}$ each independently represents a hydrogen atom, a hydrocarbon group, a silicon-containing group, or a hetero atom-containing group other than silicon-containing groups, and two adjacent groups of the groups represented by $R^1$ to $R^4$ are optionally bound together to form a ring;

$R^6$ and $R^{11}$ are the same atom or the same group selected from hydrogen atom, hydrocarbon groups, silicon-containing groups, and hetero atom-containing groups other than the silicon-containing groups; $R^7$ and $R^{10}$ are the same atom or the same group selected from hydrogen atom, hydrocarbon groups, silicon-containing groups, and hetero atom-containing groups other than the silicon-containing groups; $R^6$ and $R^7$ are optionally bound together to form a ring; and $R^{10}$ and $R^{11}$ are optionally bound together to form a ring; with the proviso that not all of $R^6$, $R^7$, $R^{10}$ and $R^{11}$ are hydrogen atoms;

$R^{13}$ and $R^{14}$ each independently represent an aryl group;

M represents a titanium atom, a zirconium atom or a hafnium atom;

$Y^1$ represents a carbon atom or a silicon atom;

Q represents a halogen atom, a hydrocarbon group, a halogenated hydrocarbon group, a neutral conjugated or non-conjugated diene having from 4 to 10 carbon atoms, an anionic ligand or a neutral ligand capable of being coordinated with a lone pair of electrons;

j represents an integer of from 1 to 4; and in cases where j is an integer of two or more, a plurality of Qs may be the same as or different from each other).

[6] The method for producing the olefin resin, according to [4] or [5], wherein the step of copolymerizing is carried out by a solution polymerization method at a temperature within the range of from 80 to 300° C.

[7] A molded article obtainable from the olefin resin according to [1] or [2].

Effect of the Invention

The olefin resin according to the present invention has a feature of having an excellent heat resistance and markedly reduced stickiness, as compared to the existing olefin copolymers having an excellent flexibility and low temperature properties. Further, the olefin resin according to the present invention has a feature of achieving comparable or improved optical properties as compared to the currently available products, which properties have been sacrificed in the existing olefin copolymers for the purpose of improving the above mentioned characteristics. Still further, the olefin resin according to the present invention has an excellent flexibility and low temperature properties.

MODE FOR CARRYING OUT THE INVENTION

Figure 1:
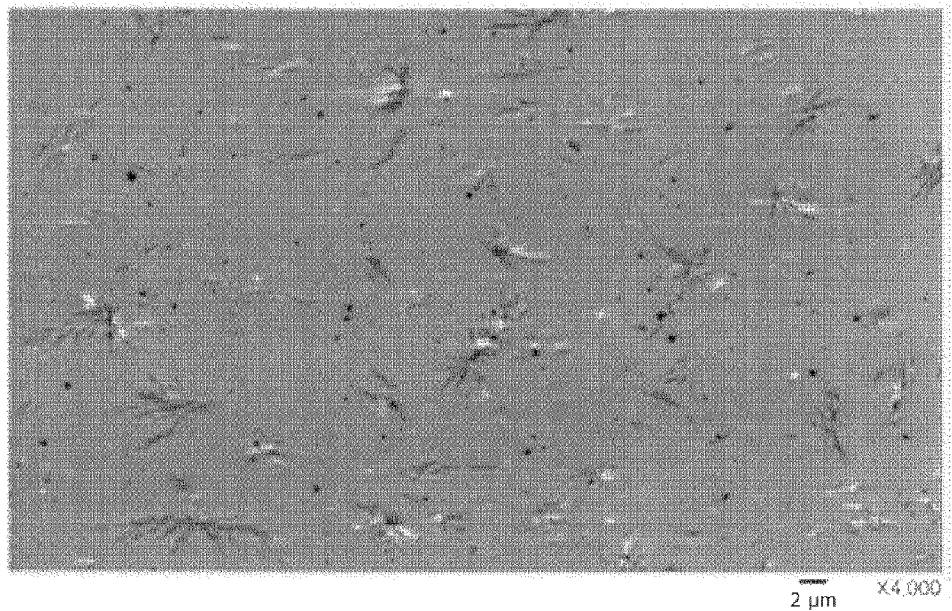
FIG. 1 is an image of the olefin resin produced in Example 7 obtained by transmission electron microscope observation (at a magnification of 4,000-fold).

The olefin resin [R] according to the present invention and the method for producing the olefin resin will now be described in detail.

<Olefin Resin [R]>

The olefin resin [R] according to the present invention may be composed of one type of olefin polymer alone, or two or more types of olefin polymers, but has a feature of necessarily satisfying all of the following requirements (I) to (V):

(I) a melting peak (Tm) as measured by differential scanning calorimetry (DSC) is observed within the range of from 60° C. to 130° C., and the heat of fusion (ΔH) calculated from the melting peak area is within the range of from 5 to 150 J/g.

(II) the percentage E (wt %) of a portion soluble in o-dichlorobenzene at 20° C. or lower as measured by cross-fractionation chromatography (CFC), and the heat of fusion ΔH as described in (I) above, satisfy the following relationships:
  when the ΔH is 5 J/g or more and less than 15 J/g, the value E is 45 wt % or less,
  when the ΔH is 15 J/g or more and less than 30 J/g, the value E is 40 wt % or less, and
  when the ΔH is 30 J/g or more, the value E is 30 wt % or less;

(III) the glass transition temperature (Tg) as measured by differential scanning calorimetry (DSC) is within the range of −80 to −30° C.;

(IV) the spin-spin relaxation time (T2) of a component having the highest mobility, as obtained in a four-component approximation by a Lorentzian function performed for a free induction decay curve obtained by Carr Purcell Meiboom Gill method in a pulsed nuclear magnetic resonance measurement (pulsed NMR) at 200° C., is within the range of from 150 to 500 ms, and the abundance ratio of the component is within the range of from 15 to 50%; and (V) the intrinsic viscosity [η] as measured in decalin at 135° C. is within the range of from 0.1 to 12 dl/g.

The olefin resin [R] according to the present invention preferably includes an olefin polymer [R1] to be described later, and the olefin polymer [R1] is efficiency produced by a polymerization method to be described later. When the olefin resin [R] according to the present invention is composed of one type of olefin polymer alone, the olefin polymer is preferably the olefin polymer [R1]. When the olefin resin [R] according to the present invention is composed of two or more types of olefin polymers, the olefin resin preferably includes the olefin polymer [R1], and an olefin polymer(s) [R2] other than the olefin polymer [R1] to be included in the resin may be, for example, a polymer or copolymer of ethylene and one or more olefins selected from α-olefins having from 3 to 20 carbon atoms, obtained by using a metallocene catalyst, a post-metallocene catalyst or a Ziegler catalyst; or a high-pressure method low density polyethylene produced by high pressure radical polymerization method. Further, the olefin polymer [R2] may be, for example, a polymer by-produced during the polymerization process in the production of the olefin polymer [R1], specifically, an ethylene polymer or an ethylene/α-olefin copolymer. When the olefin resin [R] is composed of two or more types of olefin polymers, the composition ratio of the olefin polymer [R1] and the olefin polymer [R2], and the type of the olefin polymer [R2] are not particularly limited, as long as [R1] and [R2] can be blended and a resultant blended resin satisfies the above mentioned requirements (I) to (V) at the same time. However, the composition ratio is usually selected such that the ratio of the olefin polymer [R1] in the olefin resin [R] is from 40 to 99 wt %, preferably from 45 to 95 wt %, and still more preferably, from 50 to 90 wt %. In a preferred embodiment of the olefin resin [R] according to the present invention, the olefin resin [R] is usually composed of the olefin polymer [R1] alone, from the viewpoint of being able to eliminate treatment steps, such as blending. On the other hand, when it is intended to further and markedly improve the specific performance(s) of the olefin polymer [R1], or to add a new capability(ies) that the olefin polymer [R1] does not originally have, the olefin polymer [R1] is used as a blend with the olefin polymer [R2] as described above.

In a preferred and typical embodiment of the present invention, the olefin resin [R] according to the present invention includes the olefin polymer [R1] produced by the polymerization method to be described later, as a structural component. The olefin polymer [R1] has a structure of a graft copolymer having as the main chain a so-called ethylene/α-olefin copolymer unit composed of repeating units derived from ethylene and repeating units derived from one or more α-olefins selected from α-olefins having from 3 to 20 carbon atoms, and having as the side chains a specific number of so-called ethylene polymer units composed of repeating units derived substantially from ethylene.

In the present invention, the term "graft copolymer" refers to a so-called comb-shaped polymer in which one or more side chains are bound to a main chain. A polymer having only one side chain is a T-shaped polymer. Note, however, that the side chains can include repeating units other than those derived from ethylene, without departing from the gist of the invention.

The olefin resin [R] according to the present invention satisfies the requirements (I) to (V) at the same time. These requirements (I) to (V) will now be described specifically.

[Requirement (I): Melting Peak (Tm) and Heat of Fusion (ΔH)]

The olefin resin according to the present invention has a melting peak (Tm) as measured by differential scanning calorimetry (DSC) within the range of from 60 to 130° C., preferably from 80 to 125° C., and more preferably from 90 to 120° C.

Further, the heat of fusion ΔH at the above mentioned melting peak, specifically, the heat of fusion (ΔH) calculated from the melting peak area, is within the range of from 5 to 150 J/g, preferably from 10 to 120 J/g, more preferably from 15 to 100 J/g, and still more preferably from 20 to 80 J/g.

The melting peak (Tm) and the heat of fusion (ΔH) are obtained using DSC by: melting a sample through a first temperature-increasing step; then allowing the melted sample to crystallize through a cooling step to 30° C.; and then subjecting the resultant to a second temperature-increasing step (at a temperature rise rate of 10° C./min) and analyzing the endothermic peak observed at this step.

The melting peak (Tm) observed within the above mentioned range is mainly derived from ethylene polymer moiety of the olefin polymer [R1] contained in the olefin resin, and the fact that the heat of fusion (ΔH) is observed within the above mentioned range indicates that the olefin resin contains a significant amount of the ethylene polymer moiety of the olefin polymer [R1], in other words, the side chain moiety of the olefin polymer [R1]. In the olefin resin according to the present invention, the ethylene polymer moiety of the olefin polymer [R1] serves to impart heat resistance to, as well as to reduce the stickiness of, the entire resin. When the heat of fusion (ΔH) is within the above mentioned range, in particular, it is possible to improve the heat resistance and reduce the stickiness, while maintaining the properties such as flexibility and low temperature properties. On the other hand, when the heat of fusion (ΔH) is lower than the above mentioned range, it indicates a low content of the ethylene polymer moiety, and sufficient heat resistance and sufficient reduction in the stickiness cannot be obtained. Further, when the heat of fusion (ΔH) exceeds the above mentioned range, there are cases where the properties such as flexibility and low temperature properties may be significantly impaired, even though sufficient heat resistance and reduction in the stickiness can be achieved.

In order for the olefin resin according to the present invention to have the melting peak (Tm) and the heat of fusion (ΔH) as specified above, it is necessary that the content of a component composed of the ethylene polymer moiety of the olefin polymer [R1] be within the range of from about 2 to 60% by weight in the olefin resin. To adjust the content within the above range, it is preferred to adjust the amount to be added to the polymerization vessel of an ethylene polymer having a terminal double bond, as a raw material of the side chains, and to use an olefin polymerization catalyst having an excellent capability to introduce the ethylene polymer having a terminal double bond into the main chain, in the polymerization reaction. Descriptions regarding the specific amount of the ethylene polymer to be added and regarding the olefin polymerization catalyst will be given later.

[Requirement (II): o-Dichlorobenzene-Soluble Portion]

In the olefin resin according to the present invention, the percentage E of a portion soluble in o-dichlorobenzene at 20° C. or lower as measured by cross-fractionation chromatography (CFC) satisfies, in connection with the heat of fusion (ΔH) as described in the above requirement (I), the following requirements:

when the ΔH is 5 J/g or more and less than 15 J/g, the value E is 45 wt % or less, when the ΔH is 15 J/g or more and less than 30 J/g, the value E is 40 wt % or less, and when the ΔH is 30 J/g or more, the value E is 30 wt % or less.

In a preferred and typical embodiment of the present invention, the olefin resin according to the present invention includes the olefin polymer [R1]. The olefin polymer [R1] has a structure of a graft copolymer having an ethylene/α-olefin copolymer, which is a non-crystalline or low-crystalline component, as the main chain, and an ethylene polymer, which is a crystalline component, as the side chain(s).

Usually, an ethylene/α-olefin copolymer is mostly soluble in o-dichlorobenzene at 20° C. or lower, since it is a non-crystalline or low-crystalline component. Further, an ethylene polymer is insoluble in o-dichlorobenzene at 20° C. or lower, since it is a crystalline component. In contrast, in the olefin polymer [R1], since the ethylene polymer moiety of the side chains is insoluble in o-dichlorobenzene at 20° C. or lower, the ethylene/α-olefin copolymer moiety of the main chain which is chemically bound with the side chains is also hardly soluble in o-dichlorobenzene.

When the olefin resin according to the present invention includes the olefin polymer [R1], an ethylene polymer and an ethylene/α-olefin copolymer(s) are produced as byproducts, during the production process of the olefin polymer [R1].

Accordingly, when the olefin resin according to the present invention includes the olefin polymer [R1], the value E of the olefin resin according to the present invention corresponds to the content of the component obtained by subtracting the amount of the crystalline component consisting of the ethylene polymer and the amount of the olefin polymer [R1] from the total amount of the olefin resin according to the present invention. That is to say, the value E corresponds to the content of the non-crystalline or low-crystalline component consisting of the ethylene/α-olefin copolymer, contained in the olefin resin according to the present invention.

In other words, since the olefin resin according to the present invention includes a significant amount of the olefin polymer [R1] as described above, in a preferred and typical embodiment, the percentage of the portion soluble in o-dichlorobenzene at 20° C. or lower is lower than the percentage of the non-crystalline or low-crystalline component (the ethylene/α-olefin copolymer and a component composed of the ethylene/α-olefin copolymer moiety corresponding to the main chain of the olefin polymer [R1]) actually contained.

As described above, the heat of fusion ΔH of the crystalline component (the ethylene polymer and a component composed of the ethylene polymer moiety corresponding to the side chains of the olefin polymer [R1]) can be used as an index for the content of the crystalline component. Further, since the content of the non-crystalline or low-crystalline component (the ethylene/α-olefin copolymer and the component composed of the ethylene/α-olefin copolymer moiety corresponding to the main chain of the olefin polymer [R1]) is the amount obtained by subtracting the content of the crystalline component (the ethylene polymer and the component composed of the ethylene polymer moiety corresponding to the side chains of the olefin polymer [R1]) from the total amount of the olefin resin, the above mentioned ΔH can also be used as an index for the content of the non-crystalline or low-crystalline component (the ethylene/α-olefin copolymer and the component composed of the ethylene/α-olefin copolymer moiety corresponding to the main chain of the olefin polymer [R1]). In other words, a higher value of the ΔH indicates a lower percentage of the ethylene/α-olefin copolymer and the component composed of the ethylene/α-olefin copolymer moiety corresponding to the main chain of the olefin polymer [R1], whereas a lower value of the ΔH indicates a higher percentage of the ethylene/α-olefin copolymer and the component composed of the ethylene/α-olefin copolymer moiety corresponding to the main chain of the olefin polymer [R1].

As described above, since the olefin resin according to the present invention includes a significant amount of the olefin polymer [R1] in a preferred and typical embodiment, the value of the ΔH and the value E satisfy the following relationship.

When the ΔH is 5 J/g or more and less than 15 J/g, the value E is 45 wt % or less, preferably 40 wt % or less, and more preferably within the range of from 10 to 35 wt %.

Although it varies depending on the molecular weight of the ethylene polymer or the ethylene polymer moiety corresponding to the side chains of the olefin polymer [R1] and the content of the olefin polymer [R1], when the ΔH is 5 J/g or more and less than 15 J/g, the content of the crystalline component composed of the ethylene polymer and the ethylene polymer moiety corresponding to the side chains of the olefin polymer [R1] can be estimated to be about 3 to 10 wt %. Therefore, the content of the non-crystalline or low-crystalline component composed of the ethylene/α-olefin copolymer and the ethylene/α-olefin copolymer moiety corresponding to the main chain of the olefin polymer [R1] is about 90 to 97 wt %. When the ΔH is within the above mentioned range, the value E of the olefin resin according to the present invention is set to be 45 wt % or less, which is significantly lower as compared to the content of the non-crystalline or low-crystalline component estimated from the ΔH.

When the ΔH is 15 J/g or more and less than 30 J/g, the value E is 40 wt % or less, preferably 35 wt % or less, and more preferably within the range of from 5 to 30 wt %.

Although it varies depending on the molecular weight of the ethylene polymer or the ethylene polymer moiety corresponding to the side chains of the olefin polymer [R1] and the content of the olefin polymer [R1], when the ΔH is 15 J/g or more and less than 30 J/g, the content of the crystalline component composed of the ethylene polymer and the ethylene polymer moiety corresponding to the side chains of the olefin polymer [R1] can be estimated to be about 10 to 25 wt %. Therefore, the content of the non-crystalline or low-crystalline component composed of the ethylene/α-olefin copolymer and the ethylene/α-olefin copolymer moiety corresponding to the main chain of the olefin polymer [R1] is about 75 to 90 wt %. When the ΔH is within the above mentioned range, the value E of the olefin resin according to the present invention is set to be 40 wt % or less, which is significantly lower as compared to the content of the non-crystalline or low-crystalline component estimated from the ΔH.

When the ΔH is 30 J/g or more, the value E is 30 wt % or less, and preferably 25 wt % or less.

Although it varies depending on the molecular weight of the ethylene polymer or the ethylene polymer moiety corresponding to the side chains of the olefin polymer [R1] and the content of the olefin polymer [R1], when the ΔH is 30 J/g or more and 150 J/g or less, the content of the crystalline component composed of the ethylene polymer and the ethylene polymer moiety corresponding to the side chains of the olefin polymer [R1] is estimated to be about 25 to 60 wt %. Therefore, the content of the non-crystalline or low-crystalline component composed of the ethylene/α-olefin copolymer and the ethylene/α-olefin copolymer moiety corresponding to the main chain of the olefin polymer [R1] is about 40 to 75 wt %. When the ΔH is within the above mentioned range, the value E of the olefin resin according to the present invention is set to be 30 wt % or less, which is significantly lower as compared to the content of the non-crystalline or low-crystalline component estimated from the ΔH.

On the other hand, in a blended product obtained by simply blending the component consisting of the ethylene polymer and the component consisting of the ethylene/α-olefin copolymer, which product contains substantially no olefin polymer [R1], the percentage of the component consisting of the ethylene/α-olefin copolymer, which is non-crystalline or low-crystalline, takes a value close to the value E, and the relationship between the ΔH and the value E does not satisfy the above mentioned range requirements.

While an ethylene/α-olefin copolymer usually has excellent low temperature properties and flexibility, a phenomenon in which the copolymer migrates to the surface of a molded article to be exuded therefrom, which is called bleed-out, could occur, causing problems such as "blocking" when formed into pellets, or surface stickiness when formed into a molded article. However, when the ethylene polymer moiety, which is crystalline, is chemically bound to the ethylene/α-olefin copolymer, which is non-crystalline or low-crystalline, the polymer chain of the copolymer is unable to migrate freely at a temperature equal to or less than the melting point of the crystalline ethylene polymer moiety, and thus, there is no chance that the copolymer exudes from the surface of the molded article.

In the olefin resin according to the present invention, since the relationship between the ΔH and the value E satisfies the above mentioned range requirements, as previously described, it includes a significant amount of the component in which the crystalline ethylene polymer moiety is chemically bound to the ethylene/α-olefin copolymer component.

Accordingly, although the olefin resin according to the present invention includes the non-crystalline or low-crystalline component composed of the ethylene/α-olefin copolymer and the ethylene/α-olefin copolymer moiety corresponding to the main chain of the olefin polymer [R1] in an amount sufficient to exhibit properties such as flexibility and low temperature properties, the stickiness and the blocking of the resin can also be prevented.

[Requirement (III): Glass Transition Temperature (Tg)]

The olefin resin according to the present invention has a glass transition temperature as measured by differential scanning calorimetry (DSC) within the range of from −80° C. to −30° C., preferably, from −80° C. to −40° C., and more preferably from −80° C. to −50° C.

The olefin resin according to the present invention includes the non-crystalline or low-crystalline component composed of the ethylene/α-olefin copolymer and the ethylene/α-olefin copolymer moiety, and the glass transition temperature (Tg) is derived from the non-crystalline or low-crystalline component. When the olefin resin has a glass transition temperature (Tg) within the range of from −80° C. to −30° C., for example, from −80° C. to −40° C., properties as an elastomer such as flexibility and low temperature properties are exhibited. The glass transition temperature (Tg) within the above mentioned range is achieved by controlling the type and the composition of the α-olefin as a comonomer.

[Requirement (IV): Pulsed NMR]

In the olefin resin according to the present invention, the spin-spin relaxation time (T2) of a component having the highest mobility, as obtained in a four-component approximation by a Lorentzian function performed for a free induction decay curve obtained by Carr Purcell Meiboom Gill (CPMG) method in a pulsed nuclear magnetic resonance measurement (pulsed NMR) at 200° C., is within the range of from 150 to 500 ms, and the abundance ratio of the component is within the range of from 15 to 50%.

The pulsed NMR is an analysis commonly used as a method for evaluating the mobility of polymer molecular chains and the state of interaction between different components, and the evaluation is carried out by measuring the $^1$H transverse relaxation times of all the components constituting a resin. The lower the mobility of a polymer chain, the shorter the relaxation time, and thus the faster the attenuation of signal intensity; and accordingly, a relative signal intensity with respect to 100% of the initial signal intensity is decreased in a shorter time. Further, the higher the mobility of the polymer chain, the longer the relaxation time, and thus the slower the attenuation of signal intensity; and accordingly, the relative signal intensity with respect to 100% of the initial signal intensity is decreased slowly over a longer period of time.

When the four-component approximation by the Lorentzian function is performed for the free induction decay curve (FID) of $^1$H nuclei obtained in the pulsed NMR measurement carried out by CPMG method, at a measurement temperature of 200° C., with an observed pulse width of 2.0 μsec and a repetition time of 4 sec, a component with the longest T2 can be considered to be derived from a component having the highest polymer mobility. In particular, when the T2 is from 150 to 500 ms, it can be said that the T2 is derived from the mobility of the free terminal of the polymer chain.

Since the olefin resin according to the present invention includes a significant amount of a so-called graft polymer composed of the non-crystalline or low-crystalline ethylene/α-olefin copolymer moiety as the main chain, and the crystalline ethylene polymer moiety as the side chains which are chemically bound to the main chain, the olefin resin has more terminal structures as compared to straight-chain polymers.

Therefore, in the olefin resin according to the present invention, the abundance ratio of the component having the highest mobility is within the range of from 15 to 50%, and preferably, within the range of from 15 to 40%.

Thus, it is considered that the higher ratio of the free terminals of the crystalline polymer chains derived from the ethylene polymer moiety accelerates the crystallization rate of the ethylene polymer moiety during the cooling process in molding, thereby resulting in a refinement of the spherulites of the ethylene polymer formed during the crystallization. This allows the olefin resin according to the present invention to achieve a high light transmittance and to have excellent optical properties.

[Requirement (V): Intrinsic Viscosity [η]]

The olefin resin according to the present invention preferably has an intrinsic viscosity [η] as measured in decalin at 135° C. within the range of from 0.1 to 12 dl/g, more preferably from 0.2 to 10 dl/g, and still more preferably from 0.5 to 5 dl/g. By adjusting the intrinsic viscosity [η] to be within the above mentioned range, a balance between practical physical properties and moldability can be obtained.

[Other Physical Properties]

Elastic Modulus

The olefin resin according to the present invention preferably has a tensile elastic modulus in accordance with ASTM D638 within the range of from 2 to 120 MPa, more preferably from 3 to 100 MPa, and still more preferably from 5 to 90 MPa. By adjusting the tensile elastic modulus to be within the above mentioned range, a sufficient flexibility and practical strength can be obtained.

When the proportion of the ethylene/α-olefin copolymer and the component composed of the ethylene/α-olefin copolymer moiety corresponding to the main chain of the olefin polymer [R1] is increased, the elastic modulus is decreased; and when the proportion of the ethylene/α-olefin copolymer and the component composed of the ethylene/α-olefin copolymer moiety corresponding to the main chain of the olefin polymer [R1] is decreased, and the proportion of the ethylene polymer and the component composed of the ethylene polymer moiety corresponding to the side chains of the olefin polymer [R1] is increased instead, the elastic modulus is increased.

The olefin resin according to the present invention has a high flexibility, because it includes a large amount of the ethylene/α-olefin copolymer and the component composed of the ethylene/α-olefin copolymer moiety corresponding to the main chain of the olefin polymer [R1]. In other words, the olefin resin according to the present invention has an elastic modulus within the above mentioned range, and thus, properties such as flexibility and low temperature properties are exhibited.

Transmission Electron Microscope Observation

In the olefin resin according to the present invention, a phase representing the crystalline component observed by a transmission electron microscope is preferably a discontinuous phase of micrometer order. In order to confirm if the olefin resin has the above mentioned phase structure or not, the observation is carried out, for example, as follows.

First, using a hydraulic hot press molding machine controlled at 170° C., the olefin resin is preheated for 5 minutes followed by molding for one minute under a pressure of 10 MPa. Then the resultant is cooled at 20° C. for 3 minutes under a pressure of 10 MPa to give a sheet having a predetermined thickness, to be used as a test specimen.

The above mentioned pressed sheet is formed into a small piece of 0.5 mm square, and dyed with ruthenium acid ($RuO_4$). The resulting piece is then cut into an ultra-thin slice having a film thickness of about 100 nm, using an ultramicrotome with a diamond knife. Thereafter, carbon is deposited on the ultra-thin slice, and the resultant is observed by a transmission electron microscope (acceleration voltage: 100 kV).

In the above mentioned observation method, the component composed of the ethylene polymer and the ethylene polymer moiety corresponding to the side chains of the olefin polymer [R1] is observed with a higher contrast, because an inter-crystal non-crystalline moiety in a lamellar structure formed by the component is selectively dyed with osmic acid.

In the olefin resin according to the present invention, the thus observed phase representing the crystalline component composed of the ethylene polymer and the ethylene polymer moiety corresponding to the side chains of the olefin polymer [R1] is a discontinuous phase of micrometer order, and such a finely dispersed crystalline component allows for improving the heat resistance of the entire sample.

Since, in a preferred and typical embodiment, the olefin resin includes a considerable amount of the olefin polymer [R1] in which the non-crystalline or low-crystalline main chain and the crystalline side chains are covalently bound, as described above, the non-crystalline or low-crystalline component composed of the ethylene/α-olefin copolymer and the ethylene/α-olefin copolymer moiety, and the crystalline component composed of the ethylene polymer and the ethylene polymer moiety corresponding to the side chain of the olefin polymer [R1], are highly compatible, which is thought to be the reason for the formation of the above described microphase-separated structure.

<Olefin Polymer [R1]>

In a preferred and typical embodiment of the present invention, the olefin resin [R] according to the present invention includes the olefin polymer [R1]. The olefin polymer [R1] included in the olefin resin [R] according to the present invention refers to a graft copolymer having a main chain and a side chain (s), as described above. In the present invention, the olefin polymer [R1] is preferably composed of the main chain and the side chains satisfying the following requirements (i) to (v).

(i) The main chain is composed of a copolymer of ethylene and at least one α-olefin selected from α-olefins having from 3 to 20 carbon atoms, and the content of repeating units derived from ethylene is within the range of from 60 to 97 mol %, and the content of repeating units derived from the α-olefin is within the range of from 3 to 40 mol %.

(ii) The main chain moiety has an intrinsic viscosity [η] of from 0.5 to 5.0 dl/g.

(iii) The side chains are composed of the repeating units derived from ethylene.

(iv) The weight average molecular weight of the side chains is within the range of from 500 to 10,000.

(v) The side chains are bound to the main chain at a ratio of 0.5 to 20 side chains per 1,000 main chain carbon atoms.

These requirements (i) to (v) will now be specifically described.

[Requirement (i)]

The main chain of the olefin polymer [R1] is composed of the ethylene/α-olefin copolymer, and, as the ethylene/α-olefin copolymer unit, serves as a moiety responsible for exhibiting properties such as flexibility and low temperature properties. Accordingly, the main chain of the olefin polymer [R1] is composed of repeating units derived from ethylene and repeating units derived from at least one α-olefin selected from α-olefins having from 3 to 20 carbon atoms.

The α-olefin having from 3 to 20 carbon atoms to be copolymerized with ethylene is preferably an α-olefin having from 3 to 10 carbon atoms, and more preferably, an α-olefin having from 3 to 8 carbon atoms. Specific examples of the α-olefin include: linear olefins such as propylene, 1-butene, 1-pentene, 1-hexene, 1-octene, and 1-decene; and branched olefins such as 4-methyl-1-pentene, 3-methyl-1-pentene, and 3-methyl-1-butene. Preferred are propylene, 1-butene, 1-hexene, and 4-methyl-1-pentene.

The molar ratio of the repeating units derived from ethylene with respect to the total repeating units in the main chain of the olefin polymer [R1], is within the range of from 60 to 97 mol %, preferably from 60 to 95 mol %, and more preferably from 65 to 90 mol %. Further, the molar ratio of the repeating units derived from the α-olefin with respect to the total repeating units in the main chain is within the range of from 3 to 40 mol %, preferably from 5 to 40 mol %, and more preferably from 10 to 35 mol %. As used herein, when an olefin (for example, ethylene or an α-olefin) constituting a certain (co)polymer is defined as X, an expression "structural units derived from X" means "structural units corresponding to X", in other words, structural units each having a pair of dangling bonds formed by opening of a π-bond constituting the double bond of X.

When the molar ratios of the ethylene-derived repeating units and the α-olefin-derived repeating units in the main chain are within the above mentioned ranges, the moiety constituting the main chain of the olefin polymer [R1] will have a high flexibility and excellent low temperature properties, and thus the olefin resin according to the present invention will also have the same properties. On the other hand, when the molar ratios of the ethylene-derived repeating units and the α-olefin-derived repeating units are lower than the above mentioned ranges, the resulting resin will have a poor flexibility and/or low temperature properties. Further, when the molar ratios of the ethylene-derived repeating units and the α-olefin-derived repeating units are higher than the above mentioned ranges, they have a disadvantageous effect in the copolymerization of a macromonomer forming the side chains to be described later, resulting in a failure to introduce a desired amount of side chains.

The molar ratios of the above described ethylene-derived repeating units and the α-olefin-derived repeating units in the main chain can be adjusted by controlling the concentrations of ethylene and the α-olefin to be present in the polymerization reaction system in the production of the main chain.

The molar ratio (mol %) of the α-olefin-derived units in the main chain, namely, the composition ratio of the α-olefin in the main chain, can be calculated and defined by the following method.

(1) The α-olefin composition in a component consisting of an ethylene/α-olefin copolymer(s) by-produced in the production process of the olefin resin [R] is defined as the unit derived from the α-olefin in the main chain. Since the by-produced ethylene/α-olefin copolymer corresponds to the portion soluble in o-dichlorobenzene at 20° C. or lower, when the olefin resin [R] is placed therein, the α-olefin composition in the soluble portion can be calculated by a known method using a carbon nuclear magnetic resonance analysis ($^{13}$C-NMR).

(2) A polymer consisting of the main chain moiety is separately synthesized under reasonable conditions, in view of the conditions for producing the olefin resin [R], and the α-olefin composition of the resulting ethylene/α-olefin copolymer is analyzed, and indirectly defined as the α-olefin composition of the main chain of the olefin polymer [R1]. The reasonable conditions refers to conditions under which a polymer equivalent to the main chain moiety of the olefin polymer [R1] in principle is formed, such as the concentrations of ethylene and the α-olefin and the molecular abundance ratio of ethylene to hydrogen in the polymerization system. Particularly, incases where a production method of the olefin resin [R] is used in which an ethylene polymer moiety (macromonomer) corresponding to the side chains is synthesized in advance, followed by copolymerizing the macromonomer, ethylene and the α-olefin, a separate polymerization is carried out under the same conditions except that no macromonomer is added, and the α-olefin composition of the resulting ethylene/α-olefin copolymer is analyzed, and indirectly defined as the α-olefin composition of the main chain of the olefin polymer [R1].

[Requirement (ii)]

The intrinsic viscosity [η] as measured in a decalin solvent at 135° C., as an index for the molecular weight of the main chain of the olefin polymer [R1], is preferably in the range of from 0.1 to 12 dl/g, more preferably from 0.2 to 10 dl/g, and still more preferably from 0.5 to 5 dl/g.

Since the intrinsic viscosity of the main chain primarily controls the intrinsic viscosity [η] of the olefin polymer [R1], when the intrinsic viscosity [η] of the main chain is within the above mentioned range, the balance between the practical physical properties and workability will be improved.

The intrinsic viscosity [η] of the main chain of the olefin polymer [R1] can be adjusted by controlling the concentration of ethylene in the polymerization system in the production process to be described later. The concentration of ethylene can be controlled, for example, by adjusting the partial pressure of ethylene or adjusting the polymerization temperature. The adjustment of the intrinsic viscosity [η] of the main chain can also be achieved by supplying hydrogen into the polymerization system.

The intrinsic viscosity [72] of the main chain can be obtained by producing an ethylene/α-olefin copolymer according to the method described above in the section of "Requirement (i)", for calculating and defining the molar ratio (mol %) of the α-olefin-derived units, and then measuring the intrinsic viscosity [η] of the resulting copolymer by a usual method.

[Requirement (iii)]

The side chain of the olefin polymer [R1] is an ethylene polymer moiety composed of repeating units derived substantially from ethylene, and is a crystalline ethylene polymer chain.

The ethylene polymer composed of repeating units derived substantially from ethylene refers to an ethylene polymer consisting of repeating units derived from ethylene (namely, an ethylene homopolymer), and a copolymer including repeating units derived from ethylene and a small amount of repeating units derived from a comonomer(s) other than ethylene. The ethylene polymer composed of repeating units derived substantially from ethylene represents a polymer in which the molar ratio of the repeating units derived from ethylene with respect to the total repeating units contained in the ethylene polymer is preferably from 95.0 to 100 mol %, more preferably from 98.0 to 100 mol %, and still more preferably from 99.5 to 100 mol %. In other words, the "ethylene polymer moiety composed of repeating units derived substantially from ethylene" which constitutes the side chains of the olefin polymer [R1] may include one or more types of repeating units derived from an α-olefin(s) other than ethylene, to the extent that the role and the characteristics thereof are not impaired. Examples of the α-olefin other than ethylene include α-olefins having from 3 to 20 carbon atoms.

In the olefin resin [R] according to the present invention, the side chains of the olefin polymer [R1] are responsible for reducing the stickiness and providing a heat resistance by forming physical crosslinking points.

The fact that the side chains of the olefin polymer [R1] are crystalline ethylene polymer chains can be confirmed when the melting peak (Tm) of the olefin resin according to the present invention as measured by differential scanning calorimetry (DSC) is observed within the range of from 60° C. to 130° C., in other words, when the olefin resin has a melting peak (Tm) within the range of from 60° C. to 130° C.

[Requirement (iv)]

The side chains of the olefin polymer [R1] has a weight average molecular weight within the range of from 500 to 10,000, and the weight average molecular weight is preferably within the range of from 500 to 5,000, and more preferably within the range of from 500 to 3,000.

When the weight average molecular weight of the side chains of the olefin polymer [R1] is within the above mentioned range, it is possible to reduce the stickiness, and to effectively provide a heat resistance due to the formation of the physical crosslinking points.

The olefin polymer [R1] can be obtained by copolymerizing a macromonomer, which is the ethylene polymer chain, with ethylene and an α-olefin(s). In other words, the weight average molecular weight of the macromonomer corresponds to the weight average molecular weight of side chains of the olefin polymer [R1].

When the weight average molecular weight of the side chains is lower than the above mentioned range, the melting point of the crystalline component composed of the ethylene polymer moiety in the olefin polymer [R1] is decreased, thereby reducing the heat resistance. At the same time, the physical crosslinking points formed by the crystalline component are weakened, possibly resulting in a polymer having poor mechanical properties.

On the other hand, when the weight average molecular weight of the side chains is higher than the above mentioned range, the relative amount of the non-crystalline or low-crystalline component composed of the ethylene/α-olefin copolymer moiety corresponding to the main chain is reduced, possibly resulting in a failure to secure the flexibility of the polymer as a whole.

The weight average molecular weight of the side chains can be obtained by performing the GPC analysis of: the ethylene polymer moiety (macromonomer) corresponding to the side chains, which is separated as an eluted component on the low molecular weight-side in GPC by the method described in the section of "Requirement (iii)" above; or a previously synthesized ethylene polymer moiety (macromonomer) corresponding to the side chains.

The weight average molecular weight of the side chains can be adjusted, for example, by changing the type of a transition metal compound used as a catalyst for producing a vinyl-terminated macromonomer to be described later, or by adjusting the polymerization conditions.

[Requirement (v)]

The side chains of the olefin polymer [R1] are bound to the main chain at a ratio of from 0.5 to 20, preferably from 0.5 to 15, and more preferably from 0.5 to 10 side chains per 1,000 main chain carbon atoms, namely, per 1,000 carbon atoms contained in the main chain. Stated more strictly, the side chains of the olefin polymer [R1] are present at an average frequency of from 0.3 to 20 per 1,000 carbon atoms in the main chain polymer molecular chain, namely, per 1,000 carbon atoms contained in the main chain. The side chains are preferably present at an average frequency of from 0.5 to 15, and more preferably, at an average frequency of from 0.5 to 10 per 1,000 main chain carbon atoms.

When the side chains are introduced to the main chain at an average frequency within the above mentioned range, the olefin resin [R] is capable of exhibiting properties such as a reduced stickiness and an excellent heat resistance.

On the other hand, when the side chains are introduced to the main chain at an average frequency lower than the above mentioned range, the relative amount of the non-crystalline or low-crystalline component corresponding to the ethylene/α-olefin copolymer is increased, resulting in a sticky material having a poor heat resistance. Further, when the side chains are introduced to the main chain at an average frequency higher than the above mentioned range, the relative amount of the crystalline component composed of the ethylene polymer moiety is increased, failing to sufficiently exhibit properties such as flexibility and low temperature properties.

The average frequency of the side chains can be calculated, for example, by [a] a method using carbon isotope nuclear magnetic resonance spectroscopy ($^{13}$C-NMR) to be described later; or [b] a method using gel permeation chromatography (GPC).

The methods [a] and [b] will now be described.

[a] It is preferred that the main chain of the olefin polymer [R1] be composed of repeating units derived from ethylene and repeating units derived from at least one α-olefin selected from α-olefins having from 3 to 20 carbon atoms, and that, in a carbon isotope nuclear magnetic resonance spectroscopy ($^{13}$C-NMR) measurement, a signal which can be assigned to the methine carbon at the binding site between the main chain and the side chain be observed in the range of from in 37.8 to 38.1 ppm, in addition to a signal assigned to the methine carbon derived from the α-olefin.

When the above mentioned signal is observed, the average frequency of the side chains can be obtained by the following equation:

[Average frequency of side chains]=1,000×
$[I_{PE\text{-}methine}]/\{[I_{all\text{-}C}]\times(100-[R2']-[M])/100\}$;

$[I_{PE\text{-}methine}]$: integral value of methine carbon at binding site between side chain and main chain, $[I_{all\text{-}C}]$: total carbon integral value,

[R2']: weight ratio (wt %) of [R2] other than polymer by-produced in the production of [R1], in olefin resin [R], and

[M]: weight ratio (wt %) of macromonomer added or produced in the production of [R1], in olefin resin [R].

[b] As described above, the peak on the low molecular weight side obtained by analyzing the olefin resin [R] by gel permeation chromatography (GPC) is derived from the ethylene polymer moiety (macromonomer) remaining without being copolymerized in the copolymerization reaction. Therefore, the weight ratio of the remaining macromonomer included in the olefin resin [R] can be obtained from the area ratio of the peak. Incases where the weight composition of the macromonomer added or produced in the production of [R1] is known, the average frequency of the side chains can be obtained from the difference between the weight composition and the weight ratio of the remaining macromonomer. Specifically, the average frequency can be obtained by the following equation:

[Average frequency of side chains]=([M]−[M'])/
(100−[M'])×(1/[Mn$_{\_M}$])×14/{1−([M]−[M'])/
(100−[M'])}×(1/1000);

[M]: weight ratio (wt %) of macromonomer added or produced in the production of [R1] to the total amount of resin [R'] obtained in the production of [R1],

[M']: weight ratio (wt %) of remaining macromonomer as measured by GPC to the total amount of resin [R'] obtained in the production of [R1], and

[Mn$_{\_M}$]: number average molecular weight of macromonomer.

When the by-produced ethylene/α-olefin copolymer is present, the average frequency obtained by the above mentioned method [a] or [b] is a value obtained by counting the number of the side chains in the copolymer as 0.

The number of the side chains can be adjusted by controlling the molar concentration of the macromonomer in the polymerization system. It is possible to increase the number of the side chains of the graft polymer to be produced, for example, by increasing the amount to be charged (or to be produced) of the macromonomer, when the molecular weight of the side chains is constant; or by reducing the molecular weight of the side chains, when the amount to be charged (or to be produced) of the macromonomer is constant. Further, it is possible to reduce the number of the side chains of the graft polymer to be produced, by reducing the amount to be charged (or to be produced) of the macromonomer, when the molecular weight of the side chains is constant; or by increasing the molecular weight of the side chains, when the amount to be charged (or to be produced) of the macromonomer is constant. In addition, the number of the side chains can also be adjusted by selecting the type of a transition metal compound (A) to be described later. For example, the number of the side chains can be increased by selecting an olefin polymerization catalyst containing a transition metal compound capable of producing a high molecular weight polymer at a high temperature.

When the olefin polymer [R1] included in the olefin resin [R] according to the present invention satisfies the above mentioned requirements (i) to (v), the olefin resin [R] exhibits characteristics of excellent heat resistance and markedly reduced stickiness. However, it is preferred that the olefin polymer [R1] further satisfy the following requirement (vi).

[Requirement (vi)]

The number of methyl branches in the side chains of the olefin polymer [R1] is less than 0.1 per 1,000 side chain carbon atoms, in other words, per 1,000 carbon atoms contained in the side chains.

When the number of methyl branches in the side chains is within the above mentioned range, the crystallinity of the ethylene polymer moiety of the side chains is further increased, allowing for a further improvement in the heat resistance of the olefin resin [R].

The number of methyl branches can be measured by analyzing: the ethylene polymer moiety (macromonomer) corresponding to the side chains, which is separated as an eluted component on the low molecular weight-side in GPC by the method described in the section of "Requirement (iii)" described above; or a previously synthesized ethylene polymer moiety (macromonomer) corresponding to the side chains, by a known method using carbon isotope nuclear magnetic resonance spectroscopy ($^{13}$C-NMR), for example, a method disclosed in JP 2006-233207 A.

The side chain ethylene polymer moiety satisfying the above mentioned requirement can be obtained by using a specific type of the transition metal compound which is used as a catalyst for producing the vinyl-terminated macromonomer to be described later.

<Method for Producing Olefin Resin [R]>

In the method for producing the olefin resin [R] according to the present invention, specific olefins are polymerized in the presence of an olefin polymerization catalyst obtained by combining each of the following (A) to (C) in a manner suited to the production method, in other words, in the presence of an olefin polymerization catalyst including each of the following components (A) to (C).

The each of the components (A) to (C) will now be described, followed by descriptions of specific production methods, production conditions and the like.

[Transition Metal Compound (A)]

The transition metal compound (A) to be used in the present invention is a compound of a transition metal of Group 4 in the periodic table, including a ligand having a cyclopentadienyl skeleton, and it functions as an olefin polymerization catalyst in the presence of a compound (C) to be described later.

An olefin polymerization catalyst including the transition metal compound (A) serves to copolymerize ethylene, at least one α-olefin selected from α-olefins having from 3 to 20 carbon atoms, and a vinyl-terminated macromonomer synthesized by an olefin polymerization catalyst composed of (B) and (C) to be described later.

Therefore, the transition metal compound (A) is not particularly limited as long as it is capable of copolymerizing ethylene, at least one α-olefin selected from α-olefins having from 3 to 20 carbon atoms and the above described vinyl-terminated macromonomer, and a known compound can be used. However, one having a high α-olefin copolymerizability is preferably used, because it allows for incorporating a larger amount of the olefin polymer [R1] satisfying the above mentioned characteristics into the olefin resin [R]. Further, in cases where the olefin resin [R] is produced by a solution polymerization to be described later, the transition metal compound (A) is preferably one exhibiting sufficiently high olefin polymerization activity and capable of producing a polymer having sufficiently high molecular weight, even under relatively high temperature conditions in which the macromonomer as the ethylene polymer chain dissolves in a solvent.

A description will now be given regarding the characteristics of the chemical structure of the transition metal compound (A) to be used in the present invention.

The transition metal compound (A) to be used in the present invention is a compound including a ligand having a cyclopentadienyl skeleton, and is a transition metal compound represented by the following general formula [A0].

$$M^1L_x \qquad [A0]$$

In the formula [A0], $M^1$ is a transition metal of Group 4 in the periodic table, specifically, zirconium, titanium or hafnium.

Each L is a ligand (group) coordinated to the transition metal, at least one L is a ligand having a cyclopentadienyl skeleton, and each L other than the ligand(s) having a cyclopentadienyl skeleton is a hydrocarbon group having from 1 to 12 carbon atoms, an alkoxy group, an aryloxy group, a halogen atom, a trialkylsilyl group, —$SO_3R$ (wherein R is a hydrocarbon group having from 1 to 8 carbon atoms, optionally containing a substituent such as a halogen atom), or a hydrogen atom.

x is a valence of the transition metal and represents the number of L.

The transition metal compound represented by the general formula [A0] is preferably at least one metallocene compound selected from a compound represented by the following general formula [A1] (non-bridged metallocene compound) and a compound represented by the following general formula [A2] (bridged metallocene compound).

[Chem. 5]

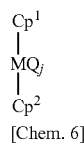

[A1]

[Chem. 6]

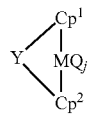

[A2]

In the formulae [A1] and [A2], M represents an atom of Group 4 in the periodic table. Specific examples of M include titanium, zirconium, and hafnium.

In the formulae [A1] and [A2], Q represents a halogen atom, a hydrocarbon group, a halogenated hydrocarbon group (namely, a hydrocarbon group in which at least one hydrogen atom is substituted with a halogen atom), a neutral conjugated or non-conjugated diene, an anionic ligand or a neutral ligand capable of being coordinated with a lone pair of electrons.

Examples of the halogen atom include fluorine, chlorine, bromine, and iodine.

Examples of the hydrocarbon group include: straight-chain or branched aliphatic hydrocarbon groups having from 1 to 30 carbon atoms, and preferably from 1 to 20 carbon atoms; alicyclic hydrocarbon groups having from 3 to 30 carbon atoms, and preferably from 3 to 20 carbon atoms; and aromatic hydrocarbon groups having from 6 to 30 carbon atoms, and preferably from 6 to 20 carbon atoms.

Examples of the aliphatic hydrocarbon group include: straight-chain or branched alkyl groups having from 1 to 30 carbon atoms, preferably from 1 to 20 carbon atoms, and more preferably from 1 to 10 carbon atoms, such as methyl group, ethyl group, n-propyl group, isopropyl group, n-butyl group, isobutyl group, sec-butyl group, t-butyl group, neo-pentyl group, and n-hexyl group; straight-chain or branched alkenyl groups having from 2 to 30 carbon atoms, and preferably from 2 to 20 carbon atoms, such as vinyl group, allyl group, and isopropenyl group; and straight-chain or branched alkynyl groups having from 2 to 30 carbon atoms, preferably from 2 to 20 carbon atoms, and more preferably from 2 to 10 carbon atoms, such as ethynyl group, and propargyl group.

Examples of the alicyclic hydrocarbon group include: cyclic saturated hydrocarbon groups having from 3 to 30 carbon atoms, preferably from 3 to 20 carbon atoms, and more preferably from 3 to 10 carbon atoms, such as cyclopropyl group, cyclobutyl group, cyclopentyl group, cyclohexyl group, and adamantyl group; and cyclic unsaturated hydrocarbon groups having from 5 to 30 carbon atoms such as cyclopentadienyl group, indenyl group, and fluorenyl group.

Examples of the aromatic hydrocarbon group include: aryl groups such as unsubstituted aryl groups having from 6 to 30 carbon atoms, preferably from 6 to 20 carbon atoms, and more preferably from 6 to 10 carbon atoms, such as phenyl group, naphthyl group, biphenyl group, terphenyl group, phenanthryl group, and anthracenyl group; and alkyl-substituted aryl groups such as tolyl group, isopropylphenyl group, t-butylphenyl group, dimethylphenyl group, and di-t-butylphenyl group.

In the hydrocarbon groups, at least one hydrogen atom may be substituted with another hydrocarbon group. Examples of the hydrocarbon group in which at least one hydrogen atom is substituted with another hydrocarbon group include aryl-substituted alkyl groups such as benzyl group and cumyl group.

Examples of the halogenated hydrocarbon group include halogenated hydrocarbon groups having from 1 to 30 carbon atoms, and preferably from 1 to 20 carbon atoms, such as trifluoromethyl group, pentafluorophenyl group, and chlorophenyl group.

Examples of the neutral conjugated or non-conjugated diene include neutral conjugated or non-conjugated dienes having from 4 to 10 carbon atoms. Specific example thereof include s-cis- or s-trans-η4-1,3-butadiene, s-cis- or s-trans-η4-1,4-diphenyl-1,3-butadiene, s-cis- or s-trans-η4-3- methyl-1,3-pentadiene, s-cis- or s-trans-η4-1,4-dibenzyl-1,3-butadiene, s-cis- or s-trans-η4-2,4-hexadiene, s-cis- or s-trans-η4-1,3-pentadiene, s-cis- or s-trans-η4-1,4-ditolyl-1,3-butadiene, and s-cis- or s-trans-η4-1,4-bis(trimethylsilyl)-1,3-butadiene.

Examples of the anionic ligand include alkoxy groups such as methoxy group and tert-butoxy group; aryloxy groups such as phenoxy group; carboxylate groups such as acetate and benzoate; and sulfonate groups such as mesylate and tosylate.

Examples of the neutral ligand capable of being coordinated with a lone pair of electrons include organophosphorus compounds such as trimethylphosphine, triethylphosphine, triphenylphosphine, and diphenylmethylphosphine; and ethers such as tetrahydrofuran, dioxane, diethyl ether, and 1,2-dimethoxyethane.

In the formulae [A1] and [A2], j is an integer of from 1 to 4, preferably, an integer of from 2 to 4, and more preferably 2 or 3. In cases where j is an integer of two or more, a plurality of Qs may be the same as or different from each other.

In the formulae [A1] and [A2], $Cp^1$ and $Cp^2$ may be the same or different from each other, and each represents a cyclopentadienyl group or a substituted cyclopentadienyl group capable of forming a sandwich structure together with M. The substituted cyclopentadienyl group refers to a cyclopentadienyl group in which at least one hydrogen atom is substituted with a substituent.

Examples of the substituent of the substituted cyclopentadienyl group include hydrocarbon groups (preferably, hydrocarbon groups having from 1 to 20 carbon atoms, hereinafter sometimes referred to as "hydrocarbon groups (f1)"); and silicon-containing groups (preferably silicon-containing groups having from 1 to 20 carbon atoms, hereinafter sometimes referred to as "silicon-containing groups (f2)"). In addition, examples of the substituent of the substituted cyclopentadienyl group include hetero atom-containing groups (excluding the silicon-containing groups (f2)) such as halogenated hydrocarbon groups, oxygen-containing groups, and nitrogen-containing groups).

Preferred hydrocarbon groups (f1) are hydrocarbon groups having from 1 to 20 carbon atoms, and examples thereof include straight-chain or branched hydrocarbon groups (such as alkyl groups, alkenyl groups, and alkynyl groups); cyclic saturated hydrocarbon groups (such as cycloalkyl groups), and cyclic unsaturated hydrocarbon groups (such as aryl groups). Of the groups exemplified above, those in which two arbitrary hydrogen atoms bound to carbon atoms adjacent to each other are both substituted to form an alicyclic or aromatic ring, are also included in the hydrocarbon groups (f1).

Specific examples of the hydrocarbon groups (f1) include straight-chain hydrocarbon groups such as methyl group, ethyl group, n-propyl group, n-butyl group, n-pentyl group, n-hexyl group, n-heptyl group, n-octyl group, n-nonyl group, n-decanyl group, and allyl group; branched hydrocarbon groups such as isopropyl group, isobutyl group, sec-butyl group, t-butyl group, amyl group, 3-methylpentyl group, neopentyl group, 1,1-diethylpropyl group, 1,1-dimethylbutyl group, 1-methyl-1-propylbutyl group, 1,1-propylbutyl group, 1,1-dimethyl-2-methylpropyl group, and 1-methyl-1-isopropyl-2-methylpropyl group; cyclic saturated hydrocarbon groups such as cyclopentyl group, cyclohexyl group, cycloheptyl group, cyclooctyl group, norbornyl group, and adamantyl group; cyclic unsaturated hydrocarbon groups such as phenyl group, naphthyl group, biphenyl group, phenanthryl group, and anthracenyl group, and alkyl-substituted forms of these groups; and hydrocarbon groups in which at least one hydrogen atom is substituted with an aryl group, such as benzyl group and cumyl group.

Preferred silicon-containing groups (f2) are silicon-containing groups having from 1 to 20 carbon atoms, and examples thereof include groups in which a silicon atom is covalently bound directly to a ring carbon of a cyclopentadienyl group. Specific examples thereof include alkylsilyl groups (such as trimethylsilyl group), and arylsilyl groups (such as triphenylsilyl group).

Specific examples of the hetero atom-containing groups (excluding the silicon-containing groups (f2)) include methoxy group, ethoxy group, phenoxy group N-methylamino group, trifluoromethyl group, tribromomethyl group, pentafluoroethyl group, and pentafluorophenyl group.

Among the hydrocarbon groups (f1), straight-chain or branched aliphatic hydrocarbon groups having from 1 to 20 carbon atoms are preferred. Specific preferred examples thereof include methyl group, ethyl group, n-propyl group, isopropyl group, n-butyl group, isobutyl group, sec-butyl group, t-butyl group, neopentyl group, n-hexyl group, and the like.

The substituted cyclopentadienyl groups include indenyl group, fluorenyl group, azulenyl group, and these groups in which one or more hydrogen atoms are substituted with the above mentioned hydrocarbon group(s). In the case of indenyl group, fluorenyl group, or azulenyl group, a part or all of the double bonds in its unsaturated ring condensed with a cyclopentadienyl group may be hydrogenated.

In the formula [A2], Y represents a divalent hydrocarbon group having from 1 to 30 carbon atoms, a divalent halogenated hydrocarbon group having from 1 to 20 carbon atoms, a divalent silicon-containing group, a divalent germanium-containing group, a divalent tin-containing group, —O—, —CO—, —S—, —SO—, —SO$_2$—, —Ge—, —Sn (tin)-, —NR$^a$—, —P(R$^a$)—, —P(O)(R$^a$)—, —BR$^a$— or —AlR$^a$—; wherein R$^a$ is a hydrocarbon group having from 1 to 20 carbon atoms, a halogenated hydrocarbon group having from 1 to 20 carbon atoms, a hydrogen atom, a halogen atom, or a nitrogen compound residue in which one or two hydrocarbon groups having from 1 to 20 carbon atoms are bound to a nitrogen atom (—NRH or —NR$_2$; wherein R is a hydrocarbon group having from 1 to 20 carbon atoms).

The transition metal compound (A) is preferably a compound represented by the general formula [A2], and more preferably a bridged metallocene compound represented by the general formula (I) (hereinafter, also referred to as a "bridged metallocene compound [I]").

[Chem. 7]

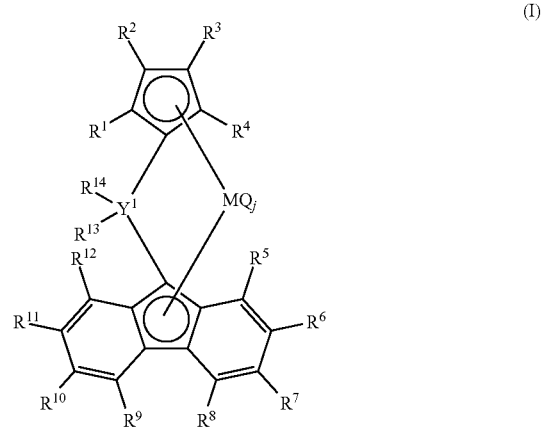

(I)

The bridged metallocene compound [I] has the following structural characteristics [m1] to [m3].

[m1] One of two ligands is a cyclopentadienyl group optionally containing a substituent, and the other is a fluorenyl group containing a substituent (hereinafter, also referred to as a "substituted fluorenyl group").

[m2] The two ligands are bound by an aryl group-containing covalent bond cross-linking site (hereinafter, also referred to as "cross-linking site") comprising a carbon atom or a silicon atom having the aryl group.

[m3] The transition metal (M) constituting the metallocene compound is an atom of Group 4 in the periodic table, specifically, a titanium atom, a zirconium atom or a hafnium atom.

The descriptions will now be given in order, regarding the cyclopentadienyl group optionally containing a substituent, the substituted fluorenyl group, and the cross-linking site, included in the bridged metallocene compound [I]; and other characteristics thereof.

(Cyclopentadienyl Group Optionally Containing Substituent)

In the formula [I], $R^1$, $R^2$, $R^3$ and $R^4$ each independently represents a hydrogen atom, a hydrocarbon group, a silicon-containing group or a hetero atom-containing group other than silicon-containing groups, among which a hydrogen atom, a hydrocarbon group or a silicon-containing group is preferred, and two adjacent groups of the groups represented by $R^1$ to $R^4$ are optionally bound together to form a ring.

For example, all of $R^1$, $R^2$, $R^3$ and $R^4$ are hydrogen atoms, or anyone or more of $R^1$, $R^2$, $R^3$ and $R^4$ are each a hydrocarbon group (preferably, a hydrocarbon group having from 1 to 20 carbon atoms) or a silicon-containing group (preferably, a silicon-containing group having from 1 to 20 carbon atoms). Other examples of $R^1$, $R^2$, $R^3$ and $R^4$ include hetero atom-containing groups such as halogenated hydrocarbon groups, oxygen-containing groups, and nitrogen-containing groups.

In cases where two or more of $R^1$, $R^2$, $R^3$ and $R^4$ are substituents other than hydrogen atoms, the substituents may be the same as or different from each other; and two adjacent groups of the groups represented by $R^1$, $R^2$, $R^3$ and $R^4$ are optionally bound together to form an alicyclic or an aromatic ring.

Exemplary and preferred groups as the hydrocarbon groups for $R^1$ to $R^4$ include the hydrocarbon groups (f1) defined in the above described section of the substituted cyclopentadienyl group. Exemplary and preferred groups as the silicon-containing groups for $R^1$ to $R^4$ include the silicon-containing groups (f2) defined in the above described section of the substituted cyclopentadienyl group. Examples of the hetero atom-containing groups for $R^1$ to $R^4$ include groups exemplified in the above described section of the substituted cyclopentadienyl group.

(Substituted Fluorenyl Group)

In the formula [I], $R^5$, $R^8$, $R^9$ and $R^{12}$ each independently represents a hydrogen atom, a hydrocarbon group, a silicon-containing group or a hetero atom-containing group other than silicon-containing groups; and preferred is a hydrogen atom, a hydrocarbon group or a silicon-containing group. $R^6$ and $R^{11}$ are the same atom or the same group selected from hydrogen atom, hydrocarbon groups, silicon-containing groups, and hetero atom-containing groups other than the silicon-containing groups, and preferred is a hydrogen atom, a hydrocarbon group or a silicon-containing group; $R^7$ and $R^{10}$ are the same atom or the same group selected from hydrogen atom, hydrocarbon groups, silicon-containing groups, and hetero atom-containing groups other than the silicon-containing groups, and preferred is a hydrogen atom, a hydrocarbon group or a silicon-containing group; $R^6$ and $R^7$ are optionally bound together to form a ring, and $R^{10}$ and $R^{11}$ are optionally bound together to form a ring; with the proviso that not "all of $R^6$, $R^7$, $R^{10}$ and $R^{11}$ are hydrogen atoms".

From the viewpoint of the polymerization activity, preferably, neither $R^6$ nor $R^{11}$ is a hydrogen atom; more preferably, none of $R^6$, $R^7$, $R^{10}$ and $R^{11}$ is a hydrogen atom; and particularly preferably, $R^6$ and $R^{11}$ are the same group selected from hydrocarbon groups and silicon-containing groups, and $R^7$ and $R^{10}$ are the same group selected from hydrocarbon groups and silicon-containing groups. Further, it is also preferred that $R^6$ and $R^7$ be bound together to form an alicyclic or an aromatic ring, and that $R^{10}$ and $R^{11}$ be bound together to form an alicyclic or an aromatic ring.

Exemplary and preferred groups as the hydrocarbon groups for $R^5$ to $R^{12}$ include the hydrocarbon groups (f1) defined in the above described section of the substituted cyclopentadienyl group. Exemplary and preferred groups as the silicon-containing groups for $R^5$ to $R^{12}$ include the silicon-containing groups (f2) defined in the above described section of the substituted cyclopentadienyl group. Examples of the hetero atom-containing groups for $R^5$ to $R^{12}$ include groups exemplified in the above described section of the substituted cyclopentadienyl group.

Preferred examples of the substituted fluorenyl group in the case where $R^6$ and $R^7$ ($R^{10}$ and $R^{11}$) are bound together to form an alicyclic or an aromatic ring, include groups derived from the compounds represented by the general formulae [II] to [VI] to be described later.

(Cross-Linking Site)

In the formula [I], $R^{13}$ and $R^{14}$ each independently represents an aryl group, and $Y^1$ represents a carbon atom or a silicon atom. An important point in the production method of the olefin polymer according to the present invention is the fact that the bridging atom $Y^1$ in the cross-linking site has aryl groups [$R^{13}$ and $R^{14}$] which may be the same as or different from each other. In terms of ease of production, $R^{13}$ and $R^{14}$ are preferably the same.

Examples of the aryl groups include phenyl group, naphthyl group, anthracenyl group, and these groups in which one or more aromatic hydrogen atoms (sp2-type hydrogen atoms) contained therein are substituted with a substituent. Examples of the substituent include the hydrocarbon groups (f1) and the silicon-containing groups (f2) defined in the above described section of the substituted cyclopentadienyl group, halogen atoms and halogenated hydrocarbon groups. The aryl groups optionally include an alkoxy group as a substituent, in addition to the above mentioned substituent (s). Examples of the alkyl group constituting the alkoxy group include the hydrocarbon groups (f1) defined in the above described section of the substituted cyclopentadienyl group.

Specific examples of the aryl group include unsubstituted aryl groups having from 6 to 14 carbon atoms, and preferably from 6 to 10 carbon atoms, such as phenyl group, naphthyl group, anthracenyl group, and biphenyl group; alkyl-substituted aryl groups such as tolyl group, isopropylphenyl group, n-butylphenyl group, t-butylphenyl group, and dimethylphenyl group; alkyl-alkoxy-substituted aryl groups such as p-methoxy-m-methylphenyl group; cycloalkyl-substituted aryl groups such as cyclohexylphenyl group; halogenated aryl groups such as chlorophenyl group, bromophenyl group, dichlorophenyl group, and dibromophenyl group; and halogenated alkyl-substituted aryl groups such as (trifluoromethyl)phenyl group and bis(trifluoromethyl)phenyl group. The substituents are preferably at the meta and/or the para positions. Among the above mentioned groups, preferred are substituted phenyl groups having substituents at the meta and/or the para positions.
(Other Characteristics of Bridged Metallocene Compound)

In the formula [I], Q represents a halogen atom, a hydrocarbon group, a halogenated hydrocarbon group, a neutral conjugated or non-conjugated diene having from 4 to 10 carbon atoms, an anionic ligand or a neutral ligand capable of being coordinated with a lone pair of electrons; j represents an integer of from 1 to 4; and incases where j is an integer of two or more, a plurality of Qs may be the same as or different from each other.

Examples of the halogen atom, the neutral conjugated or non-conjugated diene having from 4 to 10 carbon atoms, the anionic ligand, or the neutral ligand capable of being coordinated with a lone pair of electrons for Q include the same atoms and groups as described for Q in the formulae [A1] and [A2].

Examples of the hydrocarbon group for Q include straight-chain or branched aliphatic hydrocarbon groups having from 1 to 10 carbon atoms, and alicyclic hydrocarbon groups having from 3 to 10 carbon atoms. Examples of the aliphatic hydrocarbon group include methyl group, ethyl group, n-propyl group, isopropyl group, 2-methylpropyl group, 1,1-dimethylpropyl group, 2,2-dimethylpropyl group, 1,1-diethylpropyl group, 1-ethyl-1-methylpropyl group, 1,1,2,2-tetramethylpropyl group, sec-butyl group, tert-butyl group, 1,1-dimethylbutyl group, 1,1,3-trimethylbutyl group, and neopentyl group. Examples of the alicyclic hydrocarbon group include cyclohexyl group, cyclohexylmethyl group, and 1-methyl-1-cyclohexyl group.

Examples of the halogenated hydrocarbon group for Q include the above mentioned hydrocarbon groups for Q in which at least one hydrogen atom is substituted with a halogen atom.
(Examples of Preferred Bridged Metallocene Compound [I])

Specific examples of the bridged metallocene compound [I] will be given below. In the compounds to be exemplified, octamethyloctahydrodibenzofluorenyl refers to a group derived from a compound having a structure represented by the formula [II], octamethyltetrahydrodicyclopentafluorenyl refers to a group derived from a compound having a structure represented by the formula [III], dibenzofluorenyl refers to a group derived from a compound having a structure represented by the formula [IV], 1,1',3,6,8,8'-hexamethyl-2,7-dihydrodicyclopentafluorenyl refers to a group derived from a compound having a structure represented by the formula [V], and 1,3,3',6,6',8-hexamethyl-2,7-dihydrodicyclopentafluorenyl refers to a group derived from a compound having a structure represented by the formula [VI].

[Chem. 8]

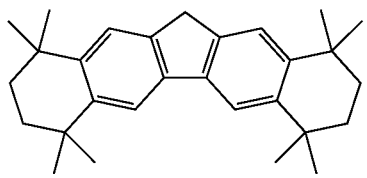

[II]

[Chem. 9]

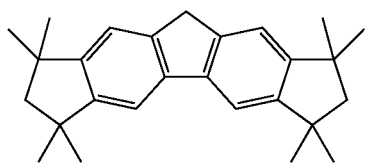

[III]

[Chem. 10]

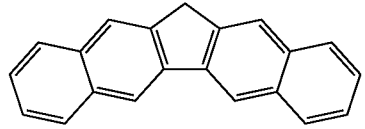

[IV]

[Chem. 11]

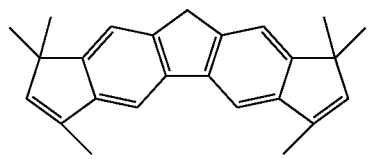

[V]

[Chem. 12]

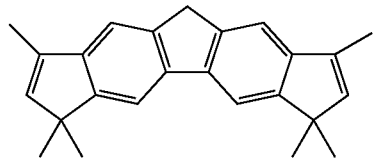

[VI]

Examples of the bridged metallocene compound [I] include:
diphenylmethylene(cyclopentadienyl)(2,7-ditert-butylfluorenyl)zirconium dichloride, diphenylmethylene(cyclopentadienyl)(3,6-ditert-butylfluorenyl) zirconium dichloride, diphenylmethylene(cyclopentadienyl)(octamethyloctahydrodibenzofluorenyl)zirconium dichloride, diphenylmethylene(cyclopentadienyl)(octamethyltetrahydrodicyclopentafluorenyl)zirconium dichloride, diphenylmethylene(cyclopentadienyl)(dibenzofluorenyl) zirconium dichloride, diphenylmethylene(cyclopentadienyl)(1,1',3,6,8,8'-hexamethyl-2,7-dihydrodicyclopentafluorenyl)zirconium dichloride, diphenylmethylene(cyclopentadienyl)(1,3,3',6,6',8-hexamethyl-2,7-dihydrodicyclopentafluorenyl)zirconium dichloride, diphenylmethylene(cyclopentadienyl)(2,7-diphenyl-3,6-ditert-butylfluorenyl)zirconium dichloride, diphenylmethylene(cyclopentadienyl)(2,7-dimethyl-3,6-ditert-butylfluorenyl)zirconium dichloride, diphenylmethylene(cyclopentadienyl)(2,7-(trimethylphenyl)-3,6-ditert-butylfluorenyl)zirconium dichloride, diphenylmethylene(cyclopentadienyl)(2,7-(dimethylphenyl)-3,6-ditert-butylfluorenyl)zirconium dichloride, diphenylmethylene(cyclopentadienyl)(2,3,6,7-tetratert-butylfluorenyl) zirconium dichloride, di(p-tolyl)methylene(cyclopentadienyl)(2,7-ditert-butyl fluorenyl)zirconium dichloride, di(p-tolyl)methylene(cyclopentadienyl)(3,6-ditert-butylfluorenyl)zirconium dichloride, di(p-tolyl)methylene(cyclopentadienyl)(octamethyloctahydrodibenzofluorenyl)zirconium dichloride, di(p-tolyl)methylene(cyclopentadienyl)(octamethyltetrahydrodicyclopentafluorenyl)zirconium dichloride, di(p-tolyl)methylene(cyclopentadienyl)(dibenzofluorenyl)zirconium dichloride, di(p-tolyl)methylene(cyclopentadienyl)(1,1',3,6,8,8'-hexamethyl-2,7-dihydrodicyclopentafluorenyl)zirconium dichloride, di(p-tolyl)methylene(cyclopentadienyl)(1,3,3',6,6',8-hexamethyl-2,7-dihydrodicyclopentafluorenyl)zirconium dichloride, di(p-tolyl)methylene(cyclopentadienyl)(2,7-diphenyl-3,6-ditert-butylfluorenyl)zirconium dichloride, di(p-tolyl)methylene(cyclopentadienyl)(2,7-dimethyl-3,6-ditert-butylfluorenyl)zirconium dichloride, di(p-tolyl)methylene(cyclopentadienyl)(2,7-(trimethylphenyl)-3,6-ditert-butylfluorenyl)zirconium dichloride, di(p-tolyl)methylene(cyclopentadienyl)(2,7-(dimethylphenyl)-3,6-ditert-butylfluorenyl)zirconium dichloride, di(p-tolyl)methylene(cyclopentadienyl)(2,3,6,7-tetramethylfluorenyl)zirconium dichloride, di(p-tolyl)methylene(cyclopentadienyl)(2,3,6,7-tetratert-butylfluorenyl)zirconium dichloride, di(p-chlorophenyl)methylene(cyclopentadienyl)(2,7-di-tert-butylfluorenyl)zirconium dichloride, di(p-chlorophenyl)methylene(cyclopentadienyl)(3,6-ditert-butylfluorenyl)zirconium dichloride, di(p-chlorophenyl)methylene(cyclopentadienyl)(octamethyloctahydrodibenzofluorenyl)zirconium dichloride, di(p-chlorophenyl)methylene(cyclopentadienyl)(octamethyltetrahydrodicyclopentafluorenyl)zirconium dichloride, di(p-chlorophenyl)methylene(cyclopentadienyl)(dibenzofluoreyl)zirconium dichloride, di(p-chlorophenyl)methylene(cyclopentadienyl)(1,1',3,6,8,8'-hexamethyl-2,7-dihydrocyclopentafluorenyl)zirconium dichloride, di(p-chlorophenyl)methylene(cyclopentadienyl)(1,3,3',6,6',8-hexamethyl-2,7-dihydrodicyclopentafluorenyl)zirconium dichloride, di(p-chlorophenyl)methylene(cyclopentadienyl)(2,7-diphenyl-3,6-ditert-butylfluorenyl)zirconium dichloride, di(p-chlorophenyl)methylene(cyclopentadienyl)(2,7-dimethyl-3,6-ditert-butylfluorenyl)zirconium dichloride, di(p-chlorophenyl)methylene(cyclopentadienyl)(2,7-(trimethylphenyl)-3,6-ditert-butylfluorenyl)zirconium dichloride, di(p-chlorophenyl)methylene(cyclopentadienyl)(2,7-(dimethylphenyl)-3,6-ditert-butylfluorenyl)zirconium dichloride, di(p-chlorophenyl)methylene(cyclopentadienyl)(2,3,6,7-tetratert-butylfluorenyl)zirconium dichloride, di(m-chlorophenyl)methylene(cyclopentadienyl)(2,7-di-tert-butylfluorenyl)zirconium dichloride, di(m-chlorophenyl)methylene(cyclopentadienyl)(3,6-ditert-butylfluorenyl)zirconium dichloride, di(m-chlorophenyl)methylene(cyclopentadienyl)(octamethyloctahydrodibenzofluorenyl)zirconium dichloride, di(m-chlorophenyl)methylene(cyclopentadienyl)(octamethyltetrahydrodicyclopentafluorenyl)zirconium dichloride, di(m-chlorophenyl)methylene(cyclopentadienyl)(dibenzofluorenyl)zirconium dichloride, di(m-chlorophenyl)methylene(cyclopentadienyl)(1,1',3,6,8,8'-hexamethyl-2,7-dihydrocyclopentafluorenyl)zirconium dichloride, di(m-chlorophenyl)methylene(cyclopentadienyl)(1,3,3',6,6',8-hexamethyl-2,7-dihydrodicyclopentafluorenyl)zirconium dichloride, di(m-chlorophenyl)methylene(cyclopentadienyl)(2,7-diphenyl-3,6-ditert-butylfluorenyl)zirconium dichloride, di(m-chlorophenyl)methylene(cyclopentadienyl)(2,7-dimethyl-3,6-ditert-butylfluorenyl)zirconium dichloride, di(m-chlorophenyl)methylene(cyclopentadienyl)(2,7-(trimethylphenyl)-3,6-ditert-butylfluorenyl)zirconium dichloride, di(m-chlorophenyl)methylene(cyclopentadienyl)(2,7-(dimethylphenyl)-3,6-ditert-butylfluorenyl)zirconium dichloride, di(m-chlorophenyl)methylene(cyclopentadienyl)(2,3,6,7-tetratert-butylfluorenyl)zirconium dichloride, di(p-bromophenyl)methylene(cyclopentadienyl)(2,7-di-tert-butylfluorenyl)zirconium dichloride, di(p-bromophenyl)methylene(cyclopentadienyl)(3,6-ditert-butylfluorenyl)zirconium dichloride, di(p-bromophenyl)methylene(cyclopentadienyl)(octamethyloctahydrodibenzofluorenyl)zirconium dichloride, di(p-bromophenyl)methylene(cyclopentadienyl)(octamethyltetrahydrodicyclopentafluorenyl)zirconium dichloride, di(p-bromophenyl)methylene(cyclopentadienyl)(dibenzofluorenyl) zirconium dichloride, di(p-bromophenyl)methylene(cyclopentadienyl)(1,1',3,6,8,8'-hexamethyl-2,7-dihydrocyclopentafluorenyl)zirconium dichloride, di(p-bromophenyl)methylene(cyclopentadienyl)(1,3,3',6,6',8-hexamethyl-2,7-dihydrodicyclopentafluorenyl)zirconium dichloride, di(p-bromophenyl)methylene(cyclopentadienyl)(2,7-diphenyl-3,6-ditert-butylfluorenyl)zirconium dichloride, di(p-bromophenyl)methylene(cyclopentadienyl)(2,7-dimethyl-3,6-ditert-butylfluorenyl)zirconium dichloride, di(p-bromophenyl)methylene(cyclopentadienyl)(2,7-(trimethylphenyl)-3,6-ditert-butylfluorenyl)zirconium dichloride, di(p-bromophenyl)methylene(cyclopentadienyl)(2,7-(dimethylphenyl)-3,6-ditert-butylfluorenyl)zirconium dichloride, di(p-bromophenyl)methylene(cyclopentadienyl)(2,3,6,7-tetratert-butylfluorenyl)zirconium dichloride, di(m-trifluoromethyl-phenyl)methylene(cyclopentadienyl) (2,7-ditert-butylfluorenyl)zirconium dichloride, di(m-trifluoromethyl-phenyl)methylene(cyclopentadienyl) (3,6-ditert-butylfluorenyl)zirconium dichloride, di(m-trifluoromethyl-phenyl)methylene(cyclopentadienyl)(octamethyloctahydrodibenzofluorenyl)zirconium dichloride, di(m-trifluoromethyl-phenyl)methylene(cyclopentadienyl)(octamethyltetrahydrodicyclopentafluorenyl)zirconium dichloride, di(m-trifluoromethyl-phenyl)methylene(cyclopentadienyl)(dibenzofluorenyl)zirconium dichloride, di(m-trifluoromethyl-phenyl)methylene(cyclopentadienyl) (1,1',3,6,8,8'-hexamethyl-2,7-dihydrodicyclopentafluorenyl)zirconium dichloride, di(m-trifluoromethyl-phenyl)methylene(cyclopentadienyl) (1,3,3',6,6',8-hexamethyl-2,7-dihydrodicyclopentafluorenyl)zirconium dichloride, di(m-trifluoromethyl-phenyl)methylene(cyclopentadienyl) (2,7-diphenyl-3,6-ditert-butylfluorenyl)zirconium dichloride, di(m-trifluoromethyl-phenyl)methylene (cyclopentadienyl) (2,7-dimethyl-3,6-ditert-butylfluorenyl)zirconium dichloride, di(m-trifluoromethyl-phenyl)methylene(cyclopentadienyl)(2,7-(trimethylphenyl)-3,6-ditert-butylfluorenyl)zirconium dichloride, di(m-trifluoromethyl-phenyl)methylene(cyclopentadienyl)(2,7-(dimethylphenyl)-3,6-ditert-butylfluorenyl)zirconium dichloride, di(m-trifluoromethyl-phenyl)methylene(cyclopentadienyl) (2,3,6,7-tetratert-butylfluorenyl)zirconium dichloride, di(p-trifluoromethyl-phenyl)methylene(cyclopentadienyl) (2,7-ditert-butylfluorenyl)zirconium dichloride, di(p-trifluoromethyl-phenyl)methylene(cyclopentadienyl) (3,6-ditert-butylfluorenyl)zirconium dichloride, di(p-trifluoromethyl-phenyl)methylene(cyclopentadienyl)(octamethyloctahydrodibenzofluorenyl)zirconium dichloride, di(p-trifluoromethyl-phenyl)methylene(cyclopentadienyl)(octamethyltetrahydrodicyclopentafluorenyl)zirconium dichloride, di(p-trifluoromethyl-phenyl)methylene(cyclopentadienyl)(dibenzofluorenyl)zirconium dichloride, di(p-trifluoromethyl-phenyl)methylene(cyclopentadienyl) (1,1',3,6,8,8'-hexamethyl-2,7-dihydrodicyclopentafluorenyl)zirconium dichloride, di(p-trifluoromethyl-phenyl)methylene(cyclopentadienyl) (1,3,3',6,6',8-hexamethyl-2,7-dihydrodicyclopentafluorenyl)zirconium dichloride, di(p-trifluoromethyl-phenyl)methylene(cyclopentadienyl) (2,7-diphenyl-3,6-ditert-butylfluorenyl)zirconium dichloride, di(p-trifluoromethyl-phenyl)methylene(cyclopentadienyl) (2,7-dimethyl-3,6-ditert-butylfluorenyl)zirconium dichloride, di(p-trifluoromethyl-phenyl)methylene(cyclopentadienyl)(2,7-(trimethylphenyl)-3,6-ditert-butylfluorenyl)zirconium dichloride, di(p-trifluoromethyl-phenyl)methylene(cyclopentadienyl)(2,7-(dimethylphenyl)-3,6-ditert-butylfluorenyl)zirconium dichloride, di(p-trifluoromethyl-phenyl)methylene(cyclopentadienyl) (2,3,6,7-tetratert-butylfluorenyl)zirconium dichloride, di(p-tert-butyl-phenyl)methylene(cyclopentadienyl)(2,7-ditert-butylfluorenyl)zirconium dichloride, di(p-tert-butyl-phenyl)methylene(cyclopentadienyl)(3,6-ditert-butylfluorenyl)zirconium dichloride, di(p-tert-butyl-phenyl)methylene(cyclopentadienyl)(octamethyloctahydrodibenzofluorenyl)zirconium dichloride, di(p-tert-butyl-phenyl)methylene(cyclopentadienyl)(octamethyltetrahydrodicyclopentafluorenyl)zirconium dichloride, di(p-tert-butyl-phenyl)methylene(cyclopentadienyl)(dibenzofluorenyl)zirconium dichloride, di(p-tert-butyl-phenyl)methylene(cyclopentadienyl)(1,1',3,6,8,8'-hexamethyl-2,7-dihydrodicyclopentafluorenyl)zirconium dichloride, di(p-tert-butyl-phenyl)methylene(cyclopentadienyl)(1,3,3',6,6',8-hexamethyl-2,7-dihydrodicyclopentafluorenyl)zirconium dichloride, di(p-tert-butyl-phenyl)methylene(cyclopentadienyl)(2,7-diphenyl-3,6-ditert-butylfluorenyl)zirconium dichloride, di(p-tert-butyl-phenyl)methylene(cyclopentadienyl)(2,7-dimethyl-3,6-ditert-butylfluorenyl)zirconium dichloride, di(p-tert-butyl-phenyl)methylene(cyclopentadienyl)(2,7-(trimethylphenyl)-3,6-ditert-butylfluorenyl)zirconium dichloride, di(p-tert-butyl-phenyl)methylene(cyclopentadienyl)(2,7-(dimethylphenyl)-3,6-ditert-butylfluorenyl)zirconium dichloride, di(p-tert-butyl-phenyl)methylene(cyclopentadienyl)(2,3,6,7-tetratert-butylfluorenyl)zirconium dichloride, di(p-n-butyl-phenyl)methylene(cyclopentadienyl)(2,7-ditert-butylfluorenyl)zirconium dichloride, di(p-n-butyl-phenyl)methylene(cyclopentadienyl)(3,6-ditert-butylfluorenyl)zirconium dichloride, di(p-n-butyl-phenyl)methylene(cyclopentadienyl)(octamethyloctahydrodibenzofluorenyl)zirconium dichloride, di(p-n-butyl-phenyl)methylene(cyclopentadienyl)(octamethyltetrahydrodicyclopentafluorenyl)zirconium dichloride, di(p-n-butyl-phenyl)methylene(cyclopentadienyl)(dibenzofluorenyl)zirconium dichloride, di(p-n-butyl-phenyl)methylene(cyclopentadienyl)(1,1',3,6,8,8'-hexamethyl-2,7-dihydrodicyclopentafluorenyl)zirconium dichloride, di(p-n-butyl-phenyl)methylene(cyclopentadienyl)(1,3,3',6,6',8-hexamethyl-2,7-dihydrodicyclopentafluorenyl)zirconium dichloride, di(p-n-butyl-phenyl)methylene(cyclopentadienyl)(2,7-diphenyl-3,6-ditert-butylfluorenyl)zirconium dichloride, di(p-n-butyl-phenyl)methylene(cyclopentadienyl)(2,7-dimethyl-3,6-ditert-butylfluorenyl)zirconium dichloride, di(p-n-butyl-phenyl)methylene(cyclopentadienyl)(2,7-(trimethylphenyl)-3,6-ditert-butylfluorenyl)zirconium dichloride, di(p-n-butyl-phenyl)methylene(cyclopentadienyl)(2,7-(dimethylphenyl)-3,6-ditert-butylfluorenyl)zirconium dichloride, di(p-n-butyl-phenyl)methylene(cyclopentadienyl)(2,3,6,7-tetra tert-butylfluorenyl)zirconium dichloride, di(p-biphenyl)methylene(cyclopentadienyl)(2,7-ditert-butylfluorenyl)zirconium dichloride, di(p-biphenyl)methylene(cyclopentadienyl)(3,6-ditert-butylfluorenyl)zirconium dichloride, di(p-biphenyl)methylene(cyclopentadienyl)(octamethyloctahydrodibenzofluorenyl)zirconium dichloride, di(p-biphenyl)methylene(cyclopentadienyl)(octamethyltetrahydrodicyclopentafluorenyl)zirconium dichloride, di(p-biphenyl)methylene(cyclopentadienyl)(dibenzofluorenyl)zirconium dichloride, di(p-biphenyl)methylene(cyclopentadienyl)(1,1',3,6,8,8'-hexamethyl-2,7-dihydrodicyclopentafluorenyl)zirconium dichloride, di(p-biphenyl)methylene(cyclopentadienyl)(1,3,3',6,6',8-hexamethyl-2,7-dihydrodicyclopentafluorenyl)zirconium dichloride, di(p-biphenyl)methylene(cyclopentadienyl)(2,7-diphenyl-3,6-ditert-butylfluorenyl)zirconium dichloride, di(p-biphenyl)methylene(cyclopentadienyl)(2,7-dimethyl-3,6-ditert-butylfluorenyl)zirconium dichloride, di(p-biphenyl)methylene(cyclopentadienyl)(2,7-(trimethylphenyl)-3,6-ditert-butylfluorenyl)zirconium dichloride, di(p-biphenyl)methylene(cyclopentadienyl)(2,7-(dimethylphenyl)-3,6-ditert-butylfluorenyl)zirconium dichloride, di(p-biphenyl)methylene(cyclopentadienyl)(2,3,6,7-tetratert-butylfluorenyl)zirconium dichloride, di(1-naphthyl)methylene(cyclopentadienyl)(2,7-ditert-butylfluorenyl)zirconium dichloride, di(1-naphthyl)methylene(cyclopentadienyl)(3,6-ditert-butylfluorenyl)zirconium dichloride, di(1-naphthyl)methylene(cyclopentadienyl)(octamethyloctahydrodibenzofluorenyl)zirconium dichloride, di(1-naphthyl)methylene(cyclopentadienyl)(octamethyltetrahydrodicyclopentafluorenyl)zirconium dichloride, di(1-naphthyl)methylene(cyclopentadienyl)(dibenzofluorenyl)zirconium dichloride, di(1-naphthyl)methylene(cyclopentadienyl)(1,1',3,6,8,8'-hexamethyl-2,7-dihydrodicyclopentafluorenyl)zirconium dichloride, di(1-naphthyl)methylene(cyclopentadienyl)(1,3,3',6,6',8-hexamethyl-2,7-dihydrodicyclopentafluorenyl)zirconium dichloride, di(1-naphthyl)methylene(cyclopentadienyl)(2,7-diphenyl-3,6-ditert-butylfluorenyl)zirconium dichloride, di(1-naphthyl)methylene(cyclopentadienyl)(2,7-dimethyl-3,6-ditert-butylfluorenyl)zirconium dichloride, di(1-naphthyl)methylene(cyclopentadienyl)(2,7-(trimethylphenyl)-3,6-ditert-butylfluorenyl)zirconium dichloride, di(1-naphthyl)methylene(cyclopentadienyl)(2,7-(dimethylphenyl)-3,6-ditert-butylfluorenyl)zirconium dichloride, di(1-naphthyl)methylene(cyclopentadienyl)(2,3,6,7-tetratert-butylfluorenyl)zirconium dichloride, di(2-naphthyl)methylene(cyclopentadienyl)(2,7-ditert-butylfluorenyl)zirconium dichloride, di(2-naphthyl)methylene(cyclopentadienyl)(3,6-ditert-butylfluorenyl)zirconium dichloride, di(2-naphthyl)methylene(cyclopentadienyl)(octamethyloctahydrodibenzofluorenyl)zirconium dichloride, di(2-naphthyl)methylene(cyclopentadienyl)(octamethyltetrahydrodicyclopentafluorenyl)zirconium dichloride, di(2-naphthyl)methylene(cyclopentadienyl)(dibenzofluorenyl)zirconium dichloride, di(2-naphthyl)methylene(cyclopentadienyl)(1,1',3,6,8,8'-hexamethyl-2,7-dihydrodicyclopentafluorenyl)zirconium dichloride, di(2-naphthyl)methylene(cyclopentadienyl)(1,3,3',6,6',8-hexamethyl-2,7-dihydrodicyclopentafluorenyl)zirconium dichloride, di(2-naphthyl)methylene(cyclopentadienyl)(2,7-diphenyl-3,6-ditert-butylfluorenyl)zirconium dichloride, di(2-naphthyl)methylene(cyclopentadienyl)(2,7-dimethyl-3,6-ditert-butylfluorenyl)zirconium dichloride, di(2-naphthyl)methylene(cyclopentadienyl)(2,7-(trimethylphenyl)-3,6-ditert-butylfluorenyl)zirconium dichloride, di(2-naphthyl)methylene(cyclopentadienyl)(2,7-(dimethylphenyl)-3,6-ditert-butylfluorenyl)zirconium dichloride, di(2-naphthyl)methylene(cyclopentadienyl)(2,3,6,7-tetratert-butylfluorenyl)zirconium dichloride, di(m-tolyl)methylene(cyclopentadienyl)(2,7-ditert-butyl fluorenyl)zirconium dichloride, di(m-tolyl)methylene(cyclopentadienyl)(2,7-dimethylfluorenyl) zirconium dichloride, di(m-tolyl)methylene(cyclopentadienyl)(3,6-ditert-butylfluorenyl)zirconium dichloride, di(p-isopropylphenyl)methylene(cyclopentadienyl)(octamethyloctahydrodibenzofluorenyl)zirconium dichloride, di(p-isopropylphenyl)methylene(cyclopentadienyl)(octamethyltetrahydrodicyclopentafluorenyl)zirconium dichloride, di(p-isopropylphenyl)methylene(cyclopentadienyl)(2,7-ditert-butylfluorenyl)zirconium dichloride, di(p-isopropylphenyl)methylene(cyclopentadienyl)(3,6-ditert-butylfluorenyl) zirconium dichloride, di(p-methoxy-m-methylphenyl)methylene(cyclopentadienyl) (octamethyloctahydrodibenzofluorenyl)zirconium dichloride, di(p-methoxy-m-methylphenyl)methylene(cyclopentadienyl)(octamethyltetrahydrodicyclopentafluorenyl)zirconium dichloride, di(p-methoxy-m-methylphenyl)methylene(cyclopentadienyl)(2,7-ditert-butylfluorenyl) zirconium dichloride, di(p-methoxy-m-methylphenyl)methylene(cyclopentadienyl)(3,6-ditert-butylfluorenyl) zirconium dichloride, diphenylsilylene(cyclopentadienyl)(2,7-ditert-butylfluorenyl)zirconium dichloride, diphenylsilylene(cyclopentadienyl)(3,6-ditert-butylfluorenyl) zirconium dichloride, diphenylsilylene(cyclopentadienyl)(octamethyloctahydrodibenzofluorenyl)zirconium dichloride, diphenylsilylene (cyclopentadienyl)(octamethyltetrahydrodicyclopentafluorenyl) zirconium dichloride, diphenylsilylene(cyclopentadienyl)(dibenzofluorenyl)zirconium dichloride, diphenylsilylene(cyclopentadienyl)(1,1',3,6,8,8'-hexamethyl-2,7-dihydrodicyclopentafluorenyl)zirconium dichloride, diphenylsilylene(cyclopentadienyl)(1,3,3',6,6',8-hexamethyl-2,7-dihydrodicyclopentafluorenyl) zirconium dichloride, diphenylsilylene(cyclopentadienyl)(2,7-diphenyl-3,6-ditert-butylfluorenyl)zirconium dichloride, diphenylsilylene(cyclopentadienyl)(2,7-dimethyl-3,6-ditert-butylfluorenyl)zirconium dichloride, diphenylsilylene(cyclopentadienyl)(2,7-(trimethylphenyl)-3,6-ditert-butylfluorenyl)zirconium dichloride, diphenylsilylene (cyclopentadienyl)(2,7-(dimethylphenyl)-3,6-ditert-butylfluorenyl)zirconium dichloride, and diphenylsilylene (cyclopentadienyl)(2,3,6,7-tetratert-butylfluorenyl) zirconium dichloride.

Examples of the bridged metallocene compound [I] also include compounds obtained by replacing, in the above described compounds, "zirconium" with "hafnium" or "titanium"; "dichloride" with "difluoride", "dibromide", "diiodide", "dimethyl", "methylethyl" or "dibenzyl"; and "cyclopentadienyl" with "3-tert-butyl-5-methyl-cyclopentadienyl", "3,5-dimethyl-cyclopentadienyl", "3-tert-butyl-cyclopentadienyl" or "3-methyl-cyclopentadienyl".

The above mentioned metallocene compounds can be produced by known methods, and the production method thereof is not particularly limited. Examples of the known method include methods described in WO 01/27124 A and WO 04/029062 A, filed by the present applicants.

Further, in the present invention, a compound represented by the following formula [A3] can also be used as the transition metal compound (A).

$$L^2M^1X^5{}_2 \quad [A3]$$

In the formula [A3], $M^1$ represents a transition metal atom of Group 4 in the periodic table.

$L^2$ is a derivative of a delocalized n-bond group, which imparts a constrained geometric shape to the active site of metal $M^1$, and $X^5$s may be the same or different from each other and each represents a hydrogen atom, a halogen atom, a hydrocarbon group having 20 or less carbon atoms, a silyl group having 20 or less silicon atoms, or a germyl group having 20 or less germanium atoms.

Of the compounds represented by the general formula [A3], a compound represented by the following formula [A4] is preferred.

[Chem. 13]

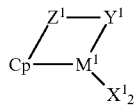

[A4]

In the formula [A4], $M^1$ represents a transition metal atom of Group 4 in the periodic table. Specifically, $M^1$ is zirconium, titanium or hafnium, and preferably, zirconium. Cp is bound to $M^1$ via a n-bond, and represents a substituted cyclopentadienyl group or a derivative thereof, wherein the substituted cyclopentadienyl group and the derivative have a substituent $Z^1$.

$Z^1$ represents a ligand containing an oxygen atom, a sulfur atom, a boron atom or an element of Group 14 in the periodic table, for example, $-Si(R^{55}{}_2)-$, $-C(R^{55}{}_2)-$, $-Si(R^{55}{}_2)Si(R^{55}{}_2)-$, $-C(R^{55}{}_2)C(R^{55}{}_2)-$, $-C(R^{55}{}_2)C(R^{55}{}_2)C(R^{55}{}_2)-$, $-C(R^{55})=C(R^{55})-$, $-C(R^{55}{}_2)Si(R^{55}{}_2)-$, or $-Ge(R^{55}{}_2)-$.

$Y^1$ represents a ligand containing a nitrogen atom, a phosphorus atom, an oxygen atom or a sulfur atom, for example, $-N(R^{52})-$, $-O-$, $-S-$, or $-P(R^{52})-$. Further, $Z^1$ and $Y^1$ may together form a condensed ring.

$R^{55}$ described above is a hydrogen atom or a group selected from alkyl, aryl, silyl, halogenated alkyl, and halogenated aryl groups having up to 20 non-hydrogen atoms, and combinations thereof. $R^{52}$ is an alkyl group having from 1 to 10 carbon atoms, an aryl group having from 6 to 10 carbon atoms or an aralkyl group having from 7 to 10 carbon atoms, or $R^{52}$ may form a condensed ring system of up to 30 non-hydrogen atoms together with one or more $R^{55}$s.

Specific examples of the transition metal compound represented by the general formula [A4] include (tert-butylamide) (tetramethyl-η5-cyclopentadienyl)-1,2-ethanediylzirconium dichloride, (tert-butylamide) (tetramethyl-η5-cyclopentadienyl)-1,2-ethanediyltitanium dichloride, (methylamide) (tetramethyl-η5-cyclopentadienyl)-1,2-ethanediyl zirconium dichloride, (methylamide) (tetramethyl-η5-cyclopentadienyl)-1,2-ethanediyltitanium dichloride, (ethylamide)(tetramethyl-η5-cyclopentadienyl)-methylenetitanium dichloride, (tert-butylamide)dimethyl(tetramethyl-η5-cyclopentadienyl)silanetitanium dichloride, (tert-butylamide)dimethyl(tetramethyl-η5-cyclopentadienyl) silanezirconium dichloride, (benzylamide)dimethyl-(tetramethyl-η5-cyclopentadienyl)silanetitanium dichloride, (phenylphosphide)dimethyl(tetramethyl-η5-cyclopentadienyl)silanezirconium dibenzyl, and the like.

The transition metal compound (A) as described above is used alone or in combination of two or more kinds.

[Transition Metal Compound (B)]

The transition metal compound (B) to be used in the present invention is a specific compound having a structure represented by the following general formula [B0], [B1], or [B2], and functions as an olefin polymerization catalyst in the presence of the compound (C) to be described later.

The olefin polymerization catalyst including the transition metal compound (B) has characteristics that it mainly polymerizes ethylene to give a vinyl-terminated macromonomer.

In cases where a method is used in which the olefin resin [R] is produced by a single-stage polymerization in one reactor, it is preferred that the olefin polymerization catalyst including the transition metal compound (B) further have a capability to polymerize ethylene with high selectivity. In addition, the olefin polymerization catalyst including the transition metal compound (B) preferably has a capability to produce substantially no olefin structure (so-called internal olefin) within the polymer chain, from the viewpoints of light resistance, coloring resistance, and the like.

A description will now be given regarding the characteristics of the chemical structure of the transition metal compound (B) to be used in the present invention.

The transition metal compound (B) to be used in the present invention is a transition metal compound represented by the following general formula [B0], [B1], or [B2].

[Chem. 14]

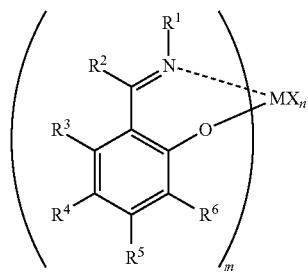

[B0]

In the general formula [B0], although N . . . M generally represents coordination, they may or may not be coordinated in the present invention.

In the general formula [B0], M represents a transition metal atom of Group 4 or 5 in the periodic table, specifically, titanium, zirconium, hafnium, vanadium, niobium, or tantalum. M is preferably a transition metal atom of Group 4 in the periodic table, specifically, titanium, zirconium or hafnium, and more preferably, zirconium.

m represents an integer of from 1 to 4, preferably from 1 to 2, and particularly preferably 2.

$R^1$ represents an acyclic hydrocarbon group having from 1 to 20 carbon atoms ($C_nH_{2n'+1}$, n'=1 to 20) or a hydrogen atom. $R^1$ is preferably a straight-chain hydrocarbon group having from 1 to 10 carbon atoms, and specific examples thereof include methyl group, ethyl group, n-propyl group, n-butyl group, n-pentyl group, n-hexyl group, and the like. Among these, preferred is a methyl group, an ethyl group, or an n-propyl group. $R^1$ is more preferably, a methyl group, an ethyl group, or a hydrogen atom.

$R^2$ to $R^6$, which may be the same or different from each other, each represents a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group, and two or more of these are optionally bound together to form a ring; and in cases where m is two or more, two of the groups represented by $R^2$ to $R^6$ are optionally bound to each other. Examples of the halogen atom include fluorine, chlorine, bromine and iodine.

Specific examples of the hydrocarbon group include: straight-chain or branched alkyl groups having from 1 to 30 carbon atoms, and preferably from 1 to 20 carbon atoms, such as methyl group, ethyl group, n-propyl group, isopropyl group, n-butyl group, isobutyl group, sec-butyl group, t-butyl group, neopentyl group, and n-hexyl group; straight-chain or branched alkenyl groups having from 2 to 30 carbon atoms, and preferably from 2 to 20 carbon atoms, such as vinyl group, allyl group, and isopropenyl group; straight-chain or branched alkynyl groups having from 2 to 30 carbon atoms, and preferably from 2 to 20 carbon atoms, such as ethynyl group, and propargyl group; cyclic saturated hydrocarbon groups having from 3 to 30 carbon atoms, and preferably from 3 to 20 carbon atoms, such as cyclopropyl group, cyclobutyl group, cyclopentyl group, cyclohexyl group, and adamantyl group; cyclic unsaturated hydrocarbon groups having from 5 to 30 carbon atoms such as cyclopentadienyl group, indenyl group, and fluorenyl group; aryl groups having from 6 to 30 carbon atoms, and preferably from 6 to 20 carbon atoms, such as phenyl group, naphthyl group, biphenyl group, terphenyl group, phenanthryl group, and anthracenyl group; alkyl-substituted aryl groups such as tolyl group, isopropylphenyl group, t-butylphenyl group, dimethylphenyl group, and di-t-butylphenyl group; and the like.

In the above mentioned hydrocarbon groups, a hydrogen atom(s) is/are optionally substituted with halogen, and examples of such substituted groups include halogenated hydrocarbon groups having from 1 to 30 carbon atoms, and preferably from 1 to 20 carbon atoms, such as trifluoromethyl group, pentafluorophenyl group and chlorophenyl group. Further, the hydrocarbon groups are optionally substituted with other hydrocarbon groups, and examples of such substituted groups include aryl-substituted alkyl groups such as benzyl group and cumyl group.

Still further, the above mentioned hydrocarbon groups may include: a heterocyclic compound residue; an oxygen-containing group such as an alkoxy group, an aryloxy group, an ester group, an ether group, an acyl group, a carboxyl group, a carbonate group, a hydroxy group, a peroxy group, or a carboxylic anhydride group; a nitrogen-containing group such as an amino group, an imino group, an amide group, an imide group, a hydrazino group, a hydrazono group, a nitro group, a nitroso group, a cyano group, an isocyano group, a cyanate group, an amidino group, a diazo group, or an ammonium salt of an amino group; a boron-containing group such as a boranediyl group, a boranetriyl group, or a diboranyl group; a sulfur-containing group such as a mercapto group, a thioester group, a dithioester group, an alkylthio group, an arylthio group, a thioacyl group, a thioether group, a thiocyanate group, an isothiocyanate group, a sulfonic ester group, a sulfonamide group, a thiocarboxyl group, a dithiocarboxyl group, a sulfo group, a sulfonyl group, a sulfinyl group, or a sulphenyl group; a phosphorus-containing group such as a phosphide group, a phosphoryl group, a thiophosphoryl group, or a phosphate group; a silicon-containing group, a germanium-containing group, or a tin-containing group.

Among these, particularly preferred are straight-chain or branched alkyl groups having from 1 to 30 carbon atoms, and preferably from 1 to 20 carbon atoms, such as methyl group, ethyl group, n-propyl group, isopropyl group, n-butyl group, isobutyl group, sec-butyl group, t-butyl group, neopentyl group, and n-hexyl group; aryl groups having from 6 to 30 carbon atoms, and preferably from 6 to 20 carbon atoms, such as phenyl group, naphthyl group, biphenyl group, terphenyl group, phenanthryl group, and anthracenyl group; and substituted aryl groups obtained by substituting the above mentioned aryl groups with 1 to 5 substituents, such as a halogen atom, an alkyl group or alkoxy group having from 1 to 30 carbon atoms and preferably from 1 to 20 carbon atoms, or an aryl group or aryloxy group having from 6 to 30 carbon atoms and preferably from 6 to 20 carbon atoms.

Examples of the oxygen-containing group, nitrogen-containing group, boron-containing group, sulfur-containing group, and phosphorus-containing group include the same groups as those exemplified above. Examples of the heterocyclic compound residue include residues of nitrogen-containing compounds such as pyrrol, pyridine, pyrimidine, quinoline, and triazine; residues of oxygen-containing compounds such as furan and pyran; residues of sulfur-containing compounds such as thiophene; and these heterocyclic compound residues further substituted with a substituent such as an alkyl group or alkoxy group having from 1 to 30 carbon atoms, and preferably from 1 to 20 carbon atoms.

Examples of the silicon-containing group include silyl groups, siloxy groups, hydrocarbon-substituted silyl groups, and hydrocarbon-substituted siloxy groups. Specific examples thereof include methylsilyl group, dimethylsilyl group, trimethylsilyl group, ethylsilyl group, diethylsilyl group, triethylsilyl group, diphenylmethylsilyl group, triphenylsilyl group, dimethylphenylsilyl group, dimethyl-t-butylsilyl group, and dimethyl(pentafluorophenyl)silyl group. Among these, preferred is a methylsilyl group, a dimethylsilyl group, a trimethylsilyl group, an ethylsilyl group, a diethylsilyl group, a triethylsilyl group, a dimethylphenylsilyl group, or a triphenylsilyl group. Particularly preferred is a trimethylsilyl group, a triethylsilyl group, a triphenylsilyl group, or a dimethylphenylsilyl group. Specific examples of the hydrocarbon-substituted siloxy group include trimethylsiloxy group.

Examples of the germanium-containing group include the above mentioned silicon-containing groups in which silicon is replaced by germanium, and examples of the tin-containing group include the silicon-containing groups in which silicon is replaced by tin.

Next, examples of $R^2$ to $R^6$ mentioned above will be described more specifically. Specific examples of the alkoxy group include methoxy group, ethoxy group, n-propoxy group, isopropoxy group, n-butoxy group, isobutoxy group, and t-butoxy group.

Specific examples of the alkylthio group include methylthio group, and ethylthio group. Specific examples of the aryloxy group include phenoxy group, 2,6-dimethylphenoxy group, and 2,4,6-trimethylphenoxy group. Specific examples of the arylthio group include phenylthio group, methylphenylthio group, and naphthylthio group.

Specific examples of the acyl group include formyl group, acetyl group, benzoyl group, p-chlorobenzoyl group, and p-methoxybenzoyl group. Specific examples of the ester group include acetyloxy group, benzoyloxy group, methoxycarbonyl group, phenoxycarbonyl group, and p-chlorophenoxycarbonyl group.

Specific examples of the thioester group include acetylthio group, benzoylthio group, methylthiocarbonyl group, and phenylthiocarbonyl group. Specific examples of the amide group include acetamide group, N-methylacetamide group, and N-methylbenzamide group. Specific examples of the imide group include acetimide group, and benzimide group. Specific examples of the amino group include dimethylamino group, ethylmethylamino group, and diphenylamino group.

Specific examples of the imino group include methylimino group, ethylimino group, propylimino group, butylimino group, and phenylimino group. Specific examples of the sulfonic ester group include methyl sulfonate group, ethyl sulfonate group, and phenyl sulfonate group. Specific examples of the sulfonamide group include phenylsulfonamide group, N-methylsulfonamide group, and N-methyl-p-toluenesulfonamide group.

In particular, $R^6$ is preferably a group selected from: branched alkyl groups having from 3 to 30 carbon atoms, and more preferably 3 to 20 carbon atoms, such as isopropyl, isobutyl, sec-butyl, tert-butyl, and neopentyl groups; more preferably, groups obtained by substituting hydrogen atom(s) in these groups with an aryl group having from 6 to 20 carbon atoms, such as phenylethyl group, diphenylmethyl group, cumyl group, diphenylethyl group, and triphenylmethyl group; and still more preferably, cyclic saturated hydrocarbon groups having from 3 to 30 carbon atoms, and preferably from 3 to 20 carbon atoms, such as adamantyl, cyclopropyl, cyclobutyl, cyclopentyl, and cyclohexyl groups. Alternatively, $R^6$ is also preferably an aryl group having from 6 to 30 carbon atoms, and preferably from 6 to 20 carbon atoms, such as a phenyl, naphthyl, fluorenyl, anthracenyl, or phenanthryl group, or a hydrocarbon-substituted silyl group.

Two or more of the groups represented by $R^2$ to $R^6$, preferably two or more groups adjacent to each other, are optionally bound together to form an aliphatic ring, an aromatic ring, or a hydrocarbon ring including a heteroatom such as a nitrogen atom; and these rings may further include a substituent. In cases where m is two or more, two of the groups represented by $R^2$ to $R^6$ are optionally bound to each other. Further, in cases where m is two or more, $R^1$s, $R^2$s, $R^3$s, $R^4$s, $R^5$s and $R^6$s may each be the same as or different from each other.

n is a number satisfying the valence of M, specifically, an integer of from 0 to 5, preferably from 1 to 4, and more preferably from 1 to 3.

X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. In cases where n is two or more, Xs may be the same as or different from each other.

Examples of the halogen atom include fluorine, chlorine, bromine and iodine.

Examples of the hydrocarbon group include the same groups as those exemplified in the description of $R^2$ to $R^6$. Specific examples thereof include: alkyl groups such as methyl group, ethyl group, propyl group, butyl group, hexyl group, octyl group, nonyl group, dodecyl group, and eicosyl group; cycloalkyl groups having from 3 to 30 carbon atoms such as cyclopentyl group, cyclohexyl group, norbornyl group, and adamantyl group; alkenyl groups such as vinyl group, propenyl group, and cyclohexenyl group; arylalkyl groups such as benzyl group, phenylethyl group, and phenylpropyl group; and aryl groups such as phenyl group, tolyl group, dimethylphenyl group, trimethylphenyl group, ethylphenyl group, propylphenyl group, biphenyl group, naphthyl group, methylnaphthyl group, anthryl group, and phenanthryl group; but not limited thereto. These hydrocarbon groups also include halogenated hydrocarbon groups, specifically, hydrocarbon groups having from 1 to 20 carbon atoms in which at least one hydrogen atom is substituted with a halogen atom.

Among these, those having from 1 to 20 carbon atoms are preferred.

Examples of the heterocyclic compound residue include the same groups as those exemplified in the description of $R^2$ to $R^6$.

Examples of the oxygen-containing group include the same groups as those exemplified in the description of $R^2$ to $R^6$. Specific examples thereof include hydroxy group; alkoxy groups such as methoxy group, ethoxy group, propoxy group, and butoxy group; aryloxy groups such as phenoxy group, methylphenoxy group, dimethylphenoxy group, and naphthoxy group; arylalkoxy groups such as phenylmethoxy group and phenylethoxy group; acetoxy group; and carbonyl group, but not limited thereto.

Examples of the sulfur-containing group include the same groups as those exemplified in the description of $R^2$ to $R^6$. Specific examples thereof include: sulfonate groups such as methylsulfonate group, trifluoromethanesulfonate group, phenylsulfonate group, benzylsulfonate group, p-toluenesulfonate group, trimethylbenzenesulfonate group, triisobutylbenzenesulfonate group, p-chlorobenzenesulfonate group, and pentafluorobenzenesulfonate group; sulfinate groups such as methylsulfinate group, phenylsulfinate group, benzylsulfinate group, p-toluenesulfinate group, trimethylbenzenesulfinate group, and pentafluorobenzenesulfinate group; alkylthio groups; and arylthio groups, but not limited thereto.

Examples of the nitrogen-containing group include the same groups as those exemplified in the description of $R^2$ to $R^6$. Specific examples thereof include: amino groups; alkylamino groups such as methylamino group, dimethylamino group, diethylamino group, dipropylamino group, dibutylamino group, and dicyclohexylamino group; arylamino groups and alkylarylamino groups such as phenylamino group, diphenylamino group, ditolylamino group, dinaphthylamino group, and methylphenylamino group, but not limited thereto.

Specific examples of the boron-containing group include $BR_4$ (wherein R represents a hydrogen atom, an alkyl group, an aryl group optionally containing a substituent, a halogen atom, or the like). Specific examples of the phosphorus-containing group include: trialkylphosphine groups such as trimethylphosphine group, tributylphosphine group, and tricyclohexylphosphine group; triarylphosphine groups such as triphenylphosphine group, and tritolylphosphine group; phosphite groups (phosphide groups) such as methyl phosphite group, ethyl phosphite group, and phenyl phosphite group; phosphonic acid groups; and phosphinic acid groups, but not limited thereto.

Specific examples of the silicon-containing group include the same groups as those exemplified in the description of $R^2$ to $R^6$. Specific examples thereof include: hydrocarbon-substituted silyl groups such as phenylsilyl group, diphenylsilyl group, trimethylsilyl group, triethylsilyl group, tripropylsilyl group, tricyclohexylsilyl group, triphenylsilyl group, methyldiphenylsilyl group, tritolylsilyl group, and trinaphthylsilyl group; hydrocarbon-substituted silyl ether groups such as trimethylsilyl ether group; silicon-substituted alkyl groups such as trimethylsilylmethyl group; and silicon-substituted aryl groups such as trimethylsilylphenyl group.

Specific examples of the germanium-containing group include the same groups as those exemplified in the description of $R^2$ to $R^6$. Specific examples thereof include the above mentioned silicon-containing groups in which silicon is replaced by germanium. Specific examples of the tin-containing group include the same groups as those exemplified in the description of $R^2$ to $R^6$. More specific examples thereof include the above mentioned silicon-containing groups in which silicon is replaced by tin.

Specific examples of the halogen-containing group include fluorine-containing groups such as $PF_6$ and $BF_4$; chlorine-containing groups such as $ClO_4$ and $SbCl_6$; and iodine-containing groups such as $IO_4$, but not limited thereto. Specific examples of the aluminum-containing group include $AlR_4$ (wherein R represents a hydrogen atom, an alkyl group, an aryl group optionally containing a substituent, a halogen atom, or the like), but not limited thereto.

In cases where n is two or more, a plurality of groups represented by X may be the same as or different from each other; and the plurality of groups represented by X may be bonded to each other to form a ring.

[Chem. 15]

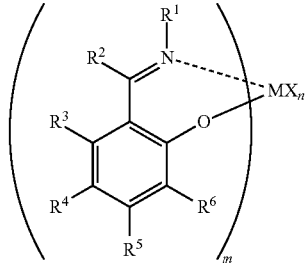

[B1]

In the general formula [B1], although N . . . M generally represents coordination, they may or may not be coordinated in the present invention.

In the general formula [B1], M represents a transition metal atom of Group 4 or 5 in the periodic table, specifically, titanium, zirconium, hafnium, vanadium, niobium, or tantalum. M is preferably a metal atom of Group 4, specifically, titanium, zirconium, or hafnium, and more preferably, zirconium.

m represents an integer of from 1 to 4, preferably from 1 to 2, and particularly preferably 2.

$R^1$ represents an alicyclic hydrocarbon group of a 3- to 10-membered ring, optionally containing one or more substituents. Specific examples of the alicyclic hydrocarbon group include cyclopropyl group, cyclobutyl group, cyclopentyl group, and cyclohexyl group.

The substituent of $R^1$ is not particularly limited, and examples thereof include hydrogen atom, halogen atom; groups selected from hydrocarbon groups, hydrocarbon-substituted silyl groups, hydrocarbon-substituted siloxy groups, oxygen-containing groups, sulfur-containing groups, nitrogen-containing groups, phosphorus-containing groups, halogen-containing groups, and heterocyclic compound residues; and hydrocarbon groups and hydrocarbon-substituted silyl groups containing these groups.

Specific examples of the substituent optionally contained in the above mentioned $R^1$ include hydrogen atom, methyl group, ethyl group, propyl group, methoxymethyl group, ethoxymethyl group, butoxymethyl group, phenoxymethyl group, ethoxyethyl group, dimethylaminomethyl group, dimethylaminoethyl group, nitromethyl group, nitroethyl group, cyanomethyl group, cyanoethyl group, trimethylsilyl group, and triethylsilyl group.

In the alicyclic hydrocarbon groups of a 3- to 5-membered ring containing two or more of the above mentioned substituents of $R^1$, the positions of the two or more substituents are not particularly limited.

$R^2$ to $R^6$, which may be the same or different from each other, each represents a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group, and two or more of these are optionally bound together to form a ring; and in cases where m is two or more, two of the groups represented by $R^2$ to $R^6$ are optionally bound to each other. Examples of the halogen atom include fluorine, chlorine, bromine and iodine.

Specific examples of the hydrocarbon group include: straight-chain or branched alkyl groups having from 1 to 30 carbon atoms, and preferably from 1 to 20 carbon atoms, such as methyl group, ethyl group, n-propyl group, isopropyl group, n-butyl group, isobutyl group, sec-butyl group, t-butyl group, neopentyl group, and n-hexyl group; straight-chain or branched alkenyl groups having from 2 to 30 carbon atoms, and preferably from 2 to 20 carbon atoms, such as vinyl group, allyl group, and isopropenyl group; straight-chain or branched alkynyl groups having from 2 to 30 carbon atoms, and preferably from 2 to 20 carbon atoms, such as ethynyl group, and propargyl group; cyclic saturated hydrocarbon groups having from 3 to 30 carbon atoms, and preferably from 3 to 20 carbon atoms, such as cyclopropyl group, cyclobutyl group, cyclopentyl group, cyclohexyl group, and adamantyl group; cyclic unsaturated hydrocarbon groups having from 5 to 30 carbon atoms such as cyclopentadienyl group, indenyl group, and fluorenyl group; aryl groups having from 6 to 30 carbon atoms, and preferably from 6 to 20 carbon atoms, such as phenyl group, benzyl group, naphthyl group, biphenyl group, terphenyl group, phenanthryl group, and anthracenyl group; alkyl-substituted aryl groups such as tolyl group, isopropylphenyl group, t-butylphenyl group, dimethylphenyl group, and di-t-butylphenyl group; and the like.

In the above mentioned hydrocarbon groups, a hydrogen atom (s) is/are optionally substituted with halogen, and examples of such substituted groups include halogenated hydrocarbon groups having from 1 to 30 carbon atoms, and preferably from 1 to 20 carbon atoms, such as trifluoromethyl group, pentafluorophenyl group and chlorophenyl group. Further, the hydrocarbon groups are optionally substituted with other hydrocarbon groups, and examples of such substituted groups include aryl-substituted alkyl groups such as benzyl group and cumyl group.

Still further, the above mentioned hydrocarbon groups may include: a heterocyclic compound residue; an oxygen-containing group such as an alkoxy group, an aryloxy group, an ester group, an ether group, an acyl group, a carboxyl group, a carbonate group, a hydroxy group, a peroxy group, or a carboxylic anhydride group; a nitrogen-containing group such as an amino group, an imino group, an amide group, an imide group, a hydrazino group, a hydrazono group, a nitro group, a nitroso group, a cyano group, an isocyano group, a cyanate group, an amidino group, a diazo group, or an ammonium salt of an amino group; a boron-containing group such as a boranediyl group, a boranetriyl group, or a diboranyl group; a sulfur-containing group such as a mercapto group, a thioester group, a dithioester group, an alkylthio group, an arylthio group, a thioacyl group, a thioether group, a thiocyanate group, an isothiocyanate group, a sulfonic ester group, a sulfonamide group, a thiocarboxyl group, a dithiocarboxyl group, a sulfo group, a sulfonyl group, a sulfinyl group, or a sulphenyl group; a phosphorus-containing group such as a phosphide group, a phosphoryl group, a thiophosphoryl group, or a phosphate group; a silicon-containing group, a germanium-containing group, or a tin-containing group.

Among these, particularly preferred are straight-chain or branched alkyl groups having from 1 to 30 carbon atoms, and preferably from 1 to 20 carbon atoms, such as methyl group, ethyl group, n-propyl group, isopropyl group, n-butyl group, isobutyl group, sec-butyl group, t-butyl group, neopentyl group, and n-hexyl group; aryl groups having from 6 to 30 carbon atoms, and preferably from 6 to 20 carbon atoms, such as phenyl group, naphthyl group, biphenyl group, terphenyl group, phenanthryl group, and anthracenyl group; and substituted aryl groups obtained by substituting the above mentioned aryl groups with 1 to 5 substituents, such as a halogen atom, an alkyl group or alkoxy group having from 1 to 30 carbon atoms and preferably from 1 to 20 carbon atoms, or an aryl group or aryloxy group having from 6 to 30 carbon atoms and preferably from 6 to 20 carbon atoms.

Examples of the oxygen-containing group, nitrogen-containing group, boron-containing group, sulfur-containing group, and phosphorus-containing group include the same groups as those exemplified above. Examples of the heterocyclic compound residue include residues of nitrogen-containing compounds such as pyrrol, pyridine, pyrimidine, quinoline, and triazine; residues of oxygen-containing compounds such as furan and pyran; residues of sulfur-containing compounds such as thiophene; and these heterocyclic compound residues further substituted with a substituent such as an alkyl group or alkoxy group having from 1 to 30 carbon atoms, and preferably from 1 to 20 carbon atoms.

Examples of the silicon-containing group include silyl groups, siloxy groups, hydrocarbon-substituted silyl groups, and hydrocarbon-substituted siloxy groups. Specific examples thereof include methylsilyl group, dimethylsilyl group, trimethylsilyl group, ethylsilyl group, diethylsilyl group, triethylsilyl group, diphenylmethylsilyl group, triphenylsilyl group, dimethylphenylsilyl group, dimethyl-t-butylsilyl group, and dimethyl(pentafluorophenyl)silyl group. Among these, preferred is a methylsilyl group, a dimethylsilyl group, a trimethylsilyl group, an ethylsilyl group, a diethylsilyl group, a triethylsilyl group, a dimethylphenylsilyl group, or a triphenylsilyl group. Particularly preferred is a trimethylsilyl group, a triethylsilyl group, a triphenylsilyl group, or a dimethylphenylsilyl group. Specific examples of the hydrocarbon-substituted siloxy group include trimethylsiloxy group.

Examples of the germanium-containing group include the above mentioned silicon-containing groups in which silicon is replaced by germanium, and examples of the tin-containing group include the silicon-containing groups in which silicon is replaced by tin.

Next, examples of $R^2$ to $R^6$ mentioned above will be described more specifically. Specific examples of the alkoxy group include methoxy group, ethoxy group, n-propoxy group, isopropoxy group, n-butoxy group, isobutoxy group, and t-butoxy group.

Specific examples of the alkylthio group include methylthio group, and ethylthio group. Specific examples of the aryloxy group include phenoxy group, 2,6-dimethylphenoxy group, and 2,4,6-trimethylphenoxy group. Specific examples of the arylthio group include phenylthio group, methylphenylthio group, and naphthylthio group.

Specific examples of the acyl group include formyl group, acetyl group, benzoyl group, p-chlorobenzoyl group, and p-methoxybenzoyl group. Specific examples of the ester group include acetyloxy group, benzoyloxy group, methoxycarbonyl group, phenoxycarbonyl group, and p-chlorophenoxycarbonyl group.

Specific examples of the thioester group include acetylthio group, benzoylthio group, methylthiocarbonyl group, and phenylthiocarbonyl group. Specific examples of the amide group include acetamide group, N-methylacetamide group, and N-methylbenzamide group. Specific examples of the imide group include acetimide group, and benzimide group.

Specific examples of the amino group include dimethylamino group, ethylmethylamino group, and diphenylamino group. Specific examples of the imino group include methylimino group, ethylimino group, propylimino group, butylimino group, and phenylimino group. Specific examples of the sulfonic ester group include methyl sulfonate group, ethyl sulfonate group, and phenyl sulfonate group.

Specific examples of the sulfonamide group include phenylsulfonamide group, N-methylsulfonamide group, and N-methyl-p-toluenesulfonamide group. Particularly in the present invention, $R^6$ is preferably a group selected from: branched alkyl groups having from 3 to 30 carbon atoms, and more preferably 3 to 20 carbon atoms, such as isopropyl, isobutyl, sec-butyl, tert-butyl, and neopentyl groups; more preferably, groups obtained by substituting hydrogen atom(s) in these groups with an aryl group having from 6 to 20 carbon atoms, such as phenylethyl group, diphenylmethyl group, cumyl group, diphenylethyl group, and triphenylmethyl group; and still more preferably, cyclic saturated hydrocarbon groups having from 3 to 30 carbon atoms, and preferably from 3 to 20 carbon atoms, such as adamantyl, cyclopropyl, cyclobutyl, cyclopentyl, and cyclohexyl groups. Alternatively, $R^6$ is also preferably an aryl group having from 6 to 30 carbon atoms, and preferably from 6 to 20 carbon atoms, such as a phenyl, naphthyl, fluorenyl, anthracenyl, or phenanthryl group, or a hydrocarbon-substituted silyl group.

Two or more of the groups represented by $R^2$ to $R^6$, preferably two or more groups adjacent to each other, are optionally bound together to form an aliphatic ring, an aromatic ring, or a hydrocarbon ring including a heteroatom such as a nitrogen atom; and these rings may further include a substituent. In cases where m is two or more, two of the groups represented by $R^2$ to $R^6$ are optionally bound to each other. Further, in cases where m is two or more, $R^1$s, $R^2$s, $R^3$s, $R^4$s, $R^5$s and $R^6$s may each be the same as or different from each other.

n is a number satisfying the valence of M, specifically, an integer of from 0 to 5, preferably from 1 to 4, and more preferably from 1 to 3.

X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. In cases where n is two or more, Xs may be the same as or different from each other.

Examples of the halogen atom include fluorine, chlorine, bromine and iodine.

Examples of the hydrocarbon group include the same groups as those exemplified in the description of $R^2$ to $R^6$. Specific examples thereof include: alkyl groups such as methyl group, ethyl group, propyl group, butyl group, hexyl group, octyl group, nonyl group, dodecyl group, and eicosyl group; cycloalkyl groups having from 3 to 30 carbon atoms such as cyclopentyl group, cyclohexyl group, norbornyl group, and adamantyl group; alkenyl groups such as vinyl group, propenyl group, and cyclohexenyl group; arylalkyl groups such as benzyl group, phenylethyl group, and phenylpropyl group; and aryl groups such as phenyl group, tolyl group, dimethylphenyl group, trimethylphenyl group, ethylphenyl group, propylphenyl group, biphenyl group, naphthyl group, methylnaphthyl group, anthryl group, and phenanthryl group; but not limited thereto. These hydrocarbon groups also include halogenated hydrocarbon groups, specifically, hydrocarbon groups having from 1 to 20 carbon atoms in which at least one hydrogen atom is substituted with a halogen atom.

Among these, those having from 1 to 20 carbon atoms are preferred.

Examples of the heterocyclic compound residue include the same groups as those exemplified in the description of $R^2$ to $R^6$.

Examples of the oxygen-containing group include the same groups as those exemplified in the description of $R^2$ to $R^6$. Specific examples thereof include hydroxy group; alkoxy groups such as methoxy group, ethoxy group, propoxy group, and butoxy group; aryloxy groups such as phenoxy group, methylphenoxy group, dimethylphenoxy group, and naphthoxy group; arylalkoxy groups such as phenylmethoxy group and phenylethoxy group; acetoxy group; and carbonyl group, but not limited thereto.

Examples of the sulfur-containing group include the same groups as those exemplified in the description of $R^2$ to $R^6$. Specific examples thereof include: sulfonate groups such as methylsulfonate group, trifluoromethanesulfonate group, phenylsulfonate group, benzylsulfonate group, p-toluenesulfonate group, trimethylbenzenesulfonate group, triisobutylbenzenesulfonate group, p-chlorobenzenesulfonate group, and pentafluorobenzenesulfonate group; sulfinate groups such as methylsulfinate group, phenylsulfinate group, benzylsulfinate group, p-toluenesulfinate group, trimethylbenzenesulfinate group, and pentafluorobenzenesulfinate group; alkylthio groups; and arylthio groups, but not limited thereto.

Examples of the nitrogen-containing group include the same groups as those exemplified in the description of $R^2$ to $R^6$. Specific examples thereof include: amino groups; alkylamino groups such as methylamino group, dimethylamino group, diethylamino group, dipropylamino group, dibutylamino group, and dicyclohexylamino group; arylamino groups and alkylarylamino groups such as phenylamino group, diphenylamino group, ditolylamino group, dinaphthylamino group, and methylphenylamino group, but not limited thereto.

Specific examples of the boron-containing group include $BR_4$ (wherein R represents a hydrogen atom, an alkyl group, an aryl group optionally containing a substituent, a halogen atom, or the like). Specific examples of the phosphorus-containing group include: trialkylphosphine groups such as trimethylphosphine group, tributylphosphine group, and tricyclohexylphosphine group; triarylphosphine groups such as triphenylphosphine group, and tritolylphosphine group; phosphite groups (phosphide groups) such as methyl phosphite group, ethyl phosphite group, and phenyl phosphite group; phosphonic acid groups; and phosphinic acid groups, but not limited thereto.

Specific examples of the silicon-containing group include the same groups as those exemplified in the description of $R^2$ to $R^6$. Specific examples thereof include: hydrocarbon-substituted silyl groups such as phenylsilyl group, diphenylsilyl group, trimethylsilyl group, triethylsilyl group, tripropylsilyl group, tricyclohexylsilyl group, triphenylsilyl group, methyldiphenylsilyl group, tritolylsilyl group, and trinaphthylsilyl group; hydrocarbon-substituted silyl ether groups such as trimethylsilyl ether group; silicon-substituted alkyl groups such as trimethylsilylmethyl group; and silicon-substituted aryl groups such as trimethylsilylphenyl group.

Specific examples of the germanium-containing group include the same groups as those exemplified in the description of $R^2$ to $R^6$. Specific examples thereof include the above mentioned silicon-containing groups in which silicon is replaced by germanium. Specific examples of the tin-containing group include the same groups as those exemplified in the description of $R^2$ to $R^6$. More specific examples thereof include the above mentioned silicon-containing groups in which silicon is replaced by tin.

Specific examples of the halogen-containing group include fluorine-containing groups such as $PF_6$ and $BF_4$; chlorine-containing groups such as $ClO_4$ and $SbCl_6$; and iodine-containing groups such as $IO_4$, but not limited thereto. Specific examples of the aluminum-containing group include $AlR_4$ (wherein R represents a hydrogen atom, an alkyl group, an aryl group optionally containing a substituent, a halogen atom, or the like), but not limited thereto.

In cases where n is two or more, a plurality of groups represented by X may be the same as or different from each other; and the plurality of groups represented by X may be bonded to each other to form a ring.

[Chem. 16]

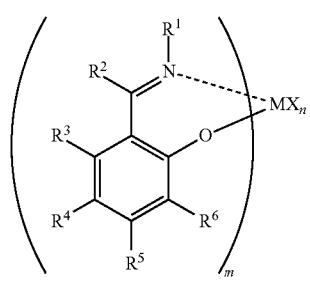

[B2]

In the general formula [B2], although N . . . M generally represents coordination, they may or may not be coordinated in the present invention.

In the general formula [B2], M represents a transition metal atom of Group 4 or 5 in the periodic table, specifically, titanium, zirconium, hafnium, vanadium, niobium, or tantalum. M is preferably a metal atom of Group 4, specifically, titanium, zirconium, or hafnium, and more preferably, zirconium.

m represents an integer of from 1 to 4, preferably from 1 to 2, and particularly preferably 2.

$R^1$ represents a bicyclic aliphatic hydrocarbon group having from 4 to 20 carbon atoms, optionally containing one or more substituents, wherein the two rings of the bicyclic aliphatic hydrocarbon group share at least one or more carbon atoms. Specific examples of the bicyclic aliphatic hydrocarbon group include spiro[2.2]pentane, spiro[2.3]hexane, spiro[2.4]heptane, spiro[2.5]octane, spiro[3.3]heptane, spiro[3.4]octane, spiro[3.5]nonane, spiro[4.4]nonane, spiro[4.5]decane, spiro[5.5]undecane, bicyclo[1.1.0]butane, bicyclo[2.1.0]pentane, bicyclo[2.2.0]hexane, bicyclo[3.1.0]hexane, bicyclo[3.2.0]heptane, bicyclo[3.3.0]octane, bicyclo[4.1.0]heptane, bicyclo[4.2.0]octane, bicyclo[4.3.0]nonane, bicyclo[4.4.0]decane, bicyclo[1.1.1]pentane, bicyclo[2.1.1]hexane, bicyclo[2.2.1]heptane, bicyclo[2.2.2.]octane, bicyclo[3.1.1]heptane, bicyclo[3.2.1]octane, bicyclo[3.2.2]nonane, bicyclo[3.3.1]nonane, bicyclo[3.3.2]decane, and bicyclo[3.3.3]undecane.

$R^1$ is preferably a bicyclic aliphatic hydrocarbon group having from 4 to 20 carbon atoms, optionally containing one or more substituents, wherein the two rings of the bicyclic aliphatic hydrocarbon group share two carbon atoms. Specific examples of the bicyclic aliphatic hydrocarbon group include bicyclo[1.1.0]butane, bicyclo[2.1.0]pentane, bicyclo [2.2.0]hexane, bicyclo[3.1.0]hexane, bicyclo [3.2.0]heptane, bicyclo[3.3.0]octane, bicyclo [4.1.0]heptane, bicyclo [4.2.0]octane, bicyclo [4.3.0]nonane, bicyclo[4.4.0]decane, bicyclo[1.1.1]pentane, bicyclo [2.1.1] hexane, bicyclo [2.2.1]heptane, bicyclo[2.2.2.]octane, bicyclo [3.1.1]heptane, bicyclo[3.2.1]octane, bicyclo[3.2.2]nonane, bicyclo [3.3.1]nonane, bicyclo[3.3.2]decane, and bicyclo[3.3.3]undecane.

More preferably, $R^1$ is a bridged bicyclic aliphatic hydrocarbon group having from 5 to 20 carbon atoms, optionally containing one or more substituents, wherein the two rings of the bridged bicyclic aliphatic hydrocarbon group share two carbon atoms. Specific examples of the bicyclic aliphatic hydrocarbon group include bicyclo[1.1.1]pentane, bicyclo[2.1.1]hexane, bicyclo [2.2.1] heptane, bicyclo [2.2.2.]octane, bicyclo [3.1.1] heptane, bicyclo[3.2.1]octane, bicyclo[3.2.2]nonane, bicyclo[3.3.1]nonane, bicyclo[3.3.2]decane, and bicyclo[3.3.3]undecane.

Particularly preferably, $R^1$ is bicyclo[2.2.1]heptane optionally containing one or more substituents. The substituent of $R^1$ is not particularly limited, and examples thereof include hydrogen atom, halogen atom; groups selected from hydrocarbon groups, hydrocarbon-substituted silyl groups, hydrocarbon-substituted siloxy groups, oxygen-containing groups, sulfur-containing groups, nitrogen-containing groups, phosphorus-containing groups, halogen-containing groups, and heterocyclic compound residues; and hydrocarbon groups and hydrocarbon-substituted silyl groups containing these groups.

Specific examples of the substituent optionally contained in the above mentioned $R^1$ include hydrogen atom, methyl group, ethyl group, propyl group, methoxymethyl group, ethoxymethyl group, butoxymethyl group, phenoxymethyl group, ethoxyethyl group, dimethylaminomethyl group, dimethylaminoethyl group, nitromethyl group, nitroethyl group, cyanomethyl group, cyanoethyl group, trimethylsilyl group, and triethylsilyl group.

In the bicyclic hydrocarbon group containing two or more of the above mentioned substituents of $R^1$, the positions of the two or more substituents are not particularly limited.

$R^2$ to $R^6$, which may be the same or different from each other, each represents a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group, and two or more of these are optionally bound together to form a ring; and in cases where m is two or more, two of the groups represented by $R^2$ to $R^6$ are optionally bound to each other. Examples of the halogen atom include fluorine, chlorine, bromine and iodine.

Specific examples of the hydrocarbon group include: straight-chain or branched alkyl groups having from 1 to 30 carbon atoms, and preferably from 1 to 20 carbon atoms, such as methyl group, ethyl group, n-propyl group, isopropyl group, n-butyl group, isobutyl group, sec-butyl group, t-butyl group, neopentyl group, and n-hexyl group; straight-chain or branched alkenyl groups having from 2 to 30 carbon atoms, and preferably from 2 to 20 carbon atoms, such as vinyl group, allyl group, and isopropenyl group; straight-chain or branched alkynyl groups having from 2 to 30 carbon atoms, and preferably from 2 to 20 carbon atoms, such as ethynyl group, and propargyl group; cyclic saturated hydrocarbon groups having from 3 to 30 carbon atoms, and preferably from 3 to 20 carbon atoms, such as cyclopropyl group, cyclobutyl group, cyclopentyl group, cyclohexyl group, and adamantyl group; cyclic unsaturated hydrocarbon groups having from 5 to 30 carbon atoms such as cyclopentadienyl group, indenyl group, and fluorenyl group; aryl groups having from 6 to 30 carbon atoms, and preferably from 6 to 20 carbon atoms, such as phenyl group, naphthyl group, biphenyl group, terphenyl group, phenanthryl group, and anthracenyl group; alkyl-substituted aryl groups such as tolyl group, isopropylphenyl group, t-butylphenyl group, dimethylphenyl group, and di-t-butylphenyl group; and the like.

In the above mentioned hydrocarbon groups, a hydrogen atom(s) is/are optionally substituted with halogen, and examples of such substituted groups include halogenated hydrocarbon groups having from 1 to 30 carbon atoms, and preferably from 1 to 20 carbon atoms, such as trifluoromethyl group, pentafluorophenyl group and chlorophenyl group. Further, the hydrocarbon groups are optionally substituted with other hydrocarbon groups, and examples of such substituted groups include aryl-substituted alkyl groups such as benzyl group and cumyl group.

Still further, the above mentioned hydrocarbon groups may include: a heterocyclic compound residue; an oxygen-containing group such as an alkoxy group, an aryloxy group, an ester group, an ether group, an acyl group, a carboxyl group, a carbonate group, a hydroxy group, a peroxy group, or a carboxylic anhydride group; a nitrogen-containing group such as an amino group, an imino group, an amide group, an imide group, a hydrazino group, a hydrazono group, a nitro group, a nitroso group, a cyano group, an isocyano group, a cyanate group, an amidino group, a diazo group, or an ammonium salt of an amino group; a boron-containing group such as a boranediyl group, a boranetriyl group, or a diboranyl group; a sulfur-containing group such as a mercapto group, a thioester group, a dithioester group, an alkylthio group, an arylthio group, a thioacyl group, a thioether group, a thiocyanate group, an isothiocyanate group, a sulfonic ester group, a sulfonamide group, a thiocarboxyl group, a dithiocarboxyl group, a sulfo group, a sulfonyl group, a sulfinyl group, or a sulphenyl group; a phosphorus-containing group such as a phosphide group, a phosphoryl group, a thiophosphoryl group, or a phosphate group; a silicon-containing group, a germanium-containing group, or a tin-containing group.

Among these, particularly preferred are straight-chain or branched alkyl groups having from 1 to 30 carbon atoms, and preferably from 1 to 20 carbon atoms, such as methyl group, ethyl group, n-propyl group, isopropyl group, n-butyl group, isobutyl group, sec-butyl group, t-butyl group, neopentyl group, and n-hexyl group; aryl groups having from 6 to 30 carbon atoms, and preferably from 6 to 20 carbon atoms, such as phenyl group, naphthyl group, biphenyl group, terphenyl group, phenanthryl group, and anthracenyl group; and substituted aryl groups obtained by substituting the above mentioned aryl groups with 1 to 5 substituents, such as a halogen atom, an alkyl group or alkoxy group having from 1 to 30 carbon atoms and preferably from 1 to 20 carbon atoms, or an aryl group or aryloxy group having from 6 to 30 carbon atoms and preferably from 6 to 20 carbon atoms.

Examples of the oxygen-containing group, nitrogen-containing group, boron-containing group, sulfur-containing group, and phosphorus-containing group include the same groups as those exemplified above. Examples of the heterocyclic compound residue include residues of nitrogen-containing compounds such as pyrrol, pyridine, pyrimidine, quinoline, and triazine; residues of oxygen-containing compounds such as furan and pyran; residues of sulfur-containing compounds such as thiophene; and these heterocyclic compound residues further substituted with a substituent such as an alkyl group or alkoxy group having from 1 to 30 carbon atoms, and preferably from 1 to 20 carbon atoms.

Examples of the silicon-containing group include silyl groups, siloxy groups, hydrocarbon-substituted silyl groups, and hydrocarbon-substituted siloxy groups. Specific examples thereof include methylsilyl group, dimethylsilyl group, trimethylsilyl group, ethylsilyl group, diethylsilyl group, triethylsilyl group, diphenylmethylsilyl group, triphenylsilyl group, dimethylphenylsilyl group, dimethyl-t-butylsilyl group, and dimethyl(pentafluorophenyl)silyl group. Among these, preferred is a methylsilyl group, a dimethylsilyl group, a trimethylsilyl group, an ethylsilyl group, a diethylsilyl group, a triethylsilyl group, a dimethylphenylsilyl group, or a triphenylsilyl group. Particularly preferred is a trimethylsilyl group, a triethylsilyl group, a triphenylsilyl group, or a dimethylphenylsilyl group. Specific examples of the hydrocarbon-substituted siloxy group include trimethylsiloxy group.

Examples of the germanium-containing group include the above mentioned silicon-containing groups in which silicon is replaced by germanium, and examples of the tin-containing group include the silicon-containing groups in which silicon is replaced by tin.

Next, examples of $R^2$ to $R^6$ mentioned above will be described more specifically. Specific examples of the alkoxy group include methoxy group, ethoxy group, n-propoxy group, isopropoxy group, n-butoxy group, isobutoxy group, and t-butoxy group.

Specific examples of the alkylthio group include methylthio group, and ethylthio group. Specific examples of the aryloxy group include phenoxy group, 2,6-dimethylphenoxy group, and 2,4,6-trimethylphenoxy group. Specific examples of the arylthio group include phenylthio group, methylphenylthio group, and naphthylthio group.

Specific examples of the acyl group include formyl group, acetyl group, benzoyl group, p-chlorobenzoyl group, and p-methoxybenzoyl group. Specific examples of the ester group include acetyloxy group, benzoyloxy group, methoxycarbonyl group, phenoxycarbonyl group, and p-chlorophenoxycarbonyl group.

Specific examples of the thioester group include acetylthio group, benzoylthio group, methylthiocarbonyl group, and phenylthiocarbonyl group. Specific examples of the amide group include acetamide group, N-methylacetamide group, and N-methylbenzamide group. Specific examples of the imide group include acetimide group, and benzimide group.

Specific examples of the amino group include dimethylamino group, ethylmethylamino group, and diphenylamino group. Specific examples of the imino group include methylimino group, ethylimino group, propylimino group, butylimino group, and phenylimino group. Specific examples of the sulfonic ester group include methyl sulfonate group, ethyl sulfonate group, and phenyl sulfonate group.

Specific examples of the sulfonamide group include phenylsulfonamide group, N-methylsulfonamide group, and N-methyl-p-toluenesulfonamide group.

Two or more of the groups represented by $R^2$ to $R^6$, preferably two or more groups adjacent to each other, are optionally bound together to form an aliphatic ring, an aromatic ring, or a hydrocarbon ring including a heteroatom such as a nitrogen atom; and these rings may further include a substituent.

In cases where m is two or more, two of the groups represented by $R^2$ to $R^6$ are optionally bound to each other. Further, incases where m is two or more, $R^1$s, $R^2$s, $R^3$s, $R^4$s, $R^5$s and $R^6$s may each be the same as or different from each other.

n is a number satisfying the valence of M, specifically, an integer of from 0 to 5, preferably from 1 to 4, and more preferably from 1 to 3.

X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. In cases where n is two or more, Xs may be the same as or different from each other.

Examples of the halogen atom include fluorine, chlorine, bromine and iodine.

Examples of the hydrocarbon group include the same groups as those exemplified in the description of $R^2$ to $R^6$. Specific examples thereof include: alkyl groups such as methyl group, ethyl group, propyl group, butyl group, hexyl group, octyl group, nonyl group, dodecyl group, and eicosyl group; cycloalkyl groups having from 3 to 30 carbon atoms such as cyclopentyl group, cyclohexyl group, norbornyl group, and adamantyl group; alkenyl groups such as vinyl group, propenyl group, and cyclohexenyl group; arylalkyl groups such as benzyl group, phenylethyl group, and phenylpropyl group; and aryl groups such as phenyl group, tolyl group, dimethylphenyl group, trimethylphenyl group, ethylphenyl group, propylphenyl group, biphenyl group, naphthyl group, methylnaphthyl group, anthryl group, and phenanthryl group; but not limited thereto. These hydrocarbon groups also include halogenated hydrocarbon groups, specifically, hydrocarbon groups having from 1 to 20 carbon atoms in which at least one hydrogen atom is substituted with a halogen atom.

Among these, those having from 1 to 20 carbon atoms are preferred.

Examples of the heterocyclic compound residue include the same groups as those exemplified in the description of $R^2$ to $R^6$.

Examples of the oxygen-containing group include the same groups as those exemplified in the description of $R^2$ to $R^6$. Specific examples thereof include hydroxy group; alkoxy groups such as methoxy group, ethoxy group, propoxy group, and butoxy group; aryloxy groups such as phenoxy group, methylphenoxy group, dimethylphenoxy group, and naphthoxy group; arylalkoxy groups such as phenylmethoxy group and phenylethoxy group; acetoxy group; and carbonyl group, but not limited thereto.

Examples of the sulfur-containing group include the same groups as those exemplified in the description of $R^2$ to $R^6$. Specific examples thereof include: sulfonate groups such as methylsulfonate group, trifluoromethanesulfonate group, phenylsulfonate group, benzylsulfonate group, p-toluenesulfonate group, trimethylbenzenesulfonate group, triisobutylbenzenesulfonate group, p-chlorobenzenesulfonate group, and pentafluorobenzenesulfonate group; sulfinate groups such as methylsulfinate group, phenylsulfinate group, benzylsulfinate group, p-toluenesulfinate group, trimethylbenzenesulfinate group, and pentafluorobenzenesulfinate group; alkylthio groups; and arylthio groups, but not limited thereto.

Examples of the nitrogen-containing group include the same groups as those exemplified in the description of $R^2$ to $R^6$. Specific examples thereof include: amino groups; alkylamino groups such as methylamino group, dimethylamino group, diethylamino group, dipropylamino group, dibutylamino group, and dicyclohexylamino group; arylamino groups and alkylarylamino groups such as phenylamino group, diphenylamino group, ditolylamino group, dinaphthylamino group, and methylphenylamino group, but not limited thereto.

Specific examples of the boron-containing group include $BR_4$ (wherein R represents a hydrogen atom, an alkyl group, an aryl group optionally containing a substituent, a halogen atom, or the like). Specific examples of the phosphorus-containing group include: trialkylphosphine groups such as trimethylphosphine group, tributylphosphine group, and tricyclohexylphosphine group; triarylphosphine groups such as triphenylphosphine group, and tritolylphosphine group; phosphite groups (phosphide groups) such as methyl phosphite group, ethyl phosphite group, and phenyl phosphite group; phosphonic acid groups; and phosphinic acid groups, but not limited thereto.

Specific examples of the silicon-containing group include the same groups as those exemplified in the description of $R^2$ to $R^6$. Specific examples thereof include: hydrocarbon-substituted silyl groups such as phenylsilyl group, diphenylsilyl group, trimethylsilyl group, triethylsilyl group, tripropylsilyl group, tricyclohexylsilyl group, triphenylsilyl group, methyldiphenylsilyl group, tritolylsilyl group, and trinaphthylsilyl group; hydrocarbon-substituted silyl ether groups such as trimethylsilyl ether group; silicon-substituted alkyl groups such as trimethylsilylmethyl group; and silicon-substituted aryl groups such as trimethylsilylphenyl group.

Specific examples of the germanium-containing group include the same groups as those exemplified in the description of $R^2$ to $R^6$. Specific examples thereof include the above mentioned silicon-containing groups in which silicon is replaced by germanium. Specific examples of the tin-containing group include the same groups as those exemplified in the description of $R^2$ to $R^6$. More specific examples thereof include the above mentioned silicon-containing groups in which silicon is replaced by tin.

Specific examples of the halogen-containing group include fluorine-containing groups such as $PF_6$ and $BF_4$; chlorine-containing groups such as $ClO_4$ and $SbCl_6$; and iodine-containing groups such as $IO_4$, but not limited thereto. Specific examples of the aluminum-containing group include $AlR_4$ (wherein R represents a hydrogen atom, an alkyl group, an aryl group optionally containing a substituent, a halogen atom, or the like), but not limited thereto.

In cases where n is two or more, a plurality of groups represented by X may be the same as or different from each other; and the plurality of groups represented by X may be bonded to each other to form a ring.

Preferred examples of the structure of the transition metal compound represented by the general formula [B0], [B1], or [B2] include those disclosed in JP 2003-73412 A.

The transition metal compound (B) represented by the general formula [B0], [B1], or [B2] as described above may be used alone or in combination of two or more kinds.

[Preferred Embodiment of the Transition Metal Compound (B)]

The transition metal compound (B) is preferably a compound having a structure represented by the general formula [B0]. Although a preferred embodiment of the compound represented by the general formula [B0] is as described above, a particularly preferred embodiment is as follows.

In the general formula [B0],

M represents a transition metal atom of Group 4 in the periodic table;

m is an integer of from 1 to 4;

$R^1$ is a straight-chain hydrocarbon group having from 1 to 10 carbon atoms;

$R^2$ to $R^5$, which may be the same or different from each other, each represents a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group, and two or more of these are optionally bound together to form a ring;

$R^6$ is a branched alkyl group having from 3 to 20 carbon atoms in which at least one hydrogen atom is substituted with an aryl group having from 6 to 20 carbon atoms; and n is a number satisfying the valence of M;

X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group; and in cases where n is an integer of two or more, a plurality of Xs may be the same or different from each other, and the plurality of groups represented by X may be bonded to each other to form a ring.

[Compound (C)]

The compound (C) to be used in the present invention is a compound which reacts with the compounds (A) and (B), and functions as an olefin polymerization catalyst. Specifically, the compound (C) is at least one compound selected from an organometallic compound (C-1), an organoaluminum oxy compound (C-2), and a compound (C-3) which reacts with the transition metal compound (A) or the transition metal compound (B) to form an ion pair. The compounds (C-1) to (C-3) will now be described in order.

(Organometallic Compound (C-1))

Specific examples of the organometallic compound (C-1) to be used in the present invention include: an organoaluminum compound represented by the following general formula (C-1a); an alkylated complex compound of a metal of Group 1 in the periodic table and aluminum, represented by the general formula (C-1b); and a dialkyl compound of a metal of Group 2 or Group 12 in the periodic table, represented by the general formula (C-1c). Note, however, that the organometallic compound (C-1) does not include the organoaluminum oxy compound (C-2) to be described later.

$$R^a_p Al(OR^b)_q H_r Y_s \quad (C\text{-}1a)$$

In the general formula (C-1a), $R^a$ and $R^b$, which may be the same or different from each other, each represents a hydrocarbon group having from 1 to 15 carbon atoms, and preferably from 1 to 4 carbon atoms; Y represents a halogen atom; and p, q, r, and s are numbers which satisfy the following relations: $0<p\leq3$, $0\leq q<3$, $0\leq r<3$, $0\leq s<3$, and $p+q+r+s=3$.

$$M^3 AlR^c_4 \quad (C\text{-}1b)$$

In the general formula (C-1b), $M^3$ represents Li, Na or K; and $R^c$ represents a hydrocarbon group having from 1 to 15 carbon atoms, and preferably from 1 to 4 carbon atoms.

$$R^d R^e M^4 \quad (C\text{-}1c)$$

In the general formula (C-1c), $R^d$ and $R^e$, which may be the same or different from each other, each represents a hydrocarbon group having from 1 to 15 carbon atoms, and preferably from 1 to 4 carbon atoms; and $M^4$ represents Mg, Zn or Cd.

Examples of the organoaluminum compound represented by the general formula (C-1a) include the following compounds:

an organoaluminum compound represented by:

$$R^a_p Al(OR^b)_{3-p}$$

(wherein, $R^a$ and $R^b$, which may be the same or different from each other, each represents a hydrocarbon group having from 1 to 15 carbon atoms, and preferably from 1 to 4 carbon atoms, and p is preferably a number satisfying $1.5\leq p\leq3$);

an organoaluminum compound represented by:

$$R^a_p AlY_{3-p}$$

(wherein, $R^a$ represents a hydrocarbon group having from 1 to 15 carbon atoms, and preferably from 1 to 4 carbon atoms; Y represents a halogen atom; and p is preferably a number satisfying $0<p<3$);

an organoaluminum compound represented by:

$$R^a_p AlH_{3-p}$$

(wherein, $R^a$ represents a hydrocarbon group having from 1 to 15 carbon atoms, and preferably from 1 to 4 carbon atoms: and p is preferably a number satisfying $2\leq p<3$); and an organoaluminum compound represented by:

$$R^a_p Al(OR^b)_q Y_s$$

(wherein, $R^a$ and $R^b$, which may be the same or different from each other, each represents a hydrocarbon group having from 1 to 15 carbon atoms, and preferably from 1 to 4 carbon atoms; Y represents a halogen atom; and p, q, and s are numbers which satisfy the following relations: $0<p\leq3$, $0\leq q<3$, $0\leq s<3$, and $p+q+s=3$).

Specific examples of the organoaluminum compound represented by the general formula (C-1a) include: tri-n-alkylaluminums such as trimethylaluminum, triethylaluminum, tri-n-butylaluminum, tripropylaluminum, tripentylaluminum, trihexylaluminum, trioctylaluminum, and tridecylaluminum;

tri-branched alkylaluminums such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum, and tri-2-ethylhexylaluminum;

tricycloalkylaluminums such as tricyclohexylaluminum, and tricyclooctylaluminum;

triarylaluminums such as triphenylaluminum, and tritolylaluminum;

dialkylaluminum hydrides such as diisobutylaluminum hydride;

trialkenylaluminums such as triisoprenylaluminum represented by (i-CH$_9$)$_x$Al$_y$(C$_5$H$_{10}$)$_z$ (wherein, x, y, and z are positive numbers, and z≥2x);

alkylaluminum alkoxides such as isobutylaluminum methoxide, isobutylaluminum ethoxide, and isobutylaluminum isopropoxide;

dialkylaluminum alkoxides such as dimethylaluminum methoxide, diethylaluminum ethoxide, and dibutylaluminum butoxide;

alkylaluminum sesquialkoxides such as ethylaluminum sesquiethoxide, and butylaluminum sesquibutoxide;

partially alkoxylated alkylaluminums having an average composition represented by R$^a$$_{2.5}$Al(OR$^b$)$_{0.5}$ (wherein, R$^a$ and R$^b$, which may be the same or different from each other, each represents a hydrocarbon group having from 1 to 15 carbon atoms, and preferably from 1 to 4 carbon atoms);

dialkylaluminum aryloxides such as diethylaluminum phenoxide, diethylaluminum(2,6-di-t-butyl-4-methylphenoxide), ethylaluminumbis(2,6-di-t-butyl-4-methylphenoxide), diisobutylaluminum(2,6-di-t-butyl-4-methylphenoxide), and isobutylaluminumbis(2,6-di-t-butyl-4-methylphenoxide);

dialkylaluminum halides such as dimethylaluminum chloride, diethylaluminum chloride, dibutylaluminum chloride, diethylaluminum bromide, and diisobutylaluminum chloride;

alkylaluminum sesquihalides such as ethylaluminum sesquichloride, butylaluminum sesquichloride, and ethylaluminum sesquibromide; partially halogenated alkylaluminums such as alkylaluminum dihalides, for example, ethylaluminum dichloride, propylaluminum dichloride, and butylaluminum dibromide;

dialkylaluminum hydrides such as diethylaluminum hydride, and dibutylaluminum hydride;

other partially hydrogenated alkylaluminums such as alkylaluminum dihydrides, for example, ethylaluminum dihydride, and propylaluminum dihydride;

partially alkoxylated and halogenated alkylaluminums such as ethylaluminum ethoxychloride, butylaluminum butoxychloride, ethylaluminum ethoxybromide; and the like.

Further, a compound similar to the compound represented by (C-1a) can also be used in the present invention, and examples of such a compound include organoaluminum compounds in which two or more aluminum compounds are bound via a nitrogen atom. Specific examples thereof include (C$_2$H$_5$)$_2$AlN(C$_2$H$_5$)Al(C$_2$H$_5$)$_2$.

Examples of the compound represented by the general formula (C-1b) include LiAl(C$_2$H$_5$)$_4$ and LiAl(C$_7$H$_{15}$)$_4$.

Examples of the compound represented by the general formula (C-1c) include dimethylmagnesium, diethylmagnesium, dibutylmagnesium, butylethylmagnesium, dimethylzinc, diethylzinc, diphenylzinc, di-n-propylzinc, diisopropylzinc, di-n-butylzinc, diisobutylzinc, bis(pentafluorophenyl) zinc, dimethylcadmium, diethylcadmium, and the like.

Further, other examples of the organometallic compound (C-1) which can be used include methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, and the like.

Still further, it is also possible to use, as the organometallic compound (C-1), a combination of compounds capable of forming the above mentioned organoaluminum compound in the polymerization system, for example, a combination of a halogenated aluminum and an alkyllithium, or a combination of a halogenated aluminum and an alkylmagnesium.

The organometallic compound (C-1) as described above is used alone, or in combination of two or more kinds.

(Organoaluminum Oxy-Compound (C-2))

The organoaluminum oxy compound (C-2) to be used in the present invention may be a conventionally known aluminoxane, or a benzene-insoluble organoaluminum oxy compound as one exemplified in JP H2-78687 A. Specific examples of the organoaluminum oxy compound (C-2) include methylaluminoxane, ethylaluminoxane, isobutylaluminoxane and the like.

A conventionally known aluminoxane can be produced, for example, by any of the following methods, and it is usually obtained as a solution of hydrocarbon solvent.

(1) A method in which an organoaluminum compound such as a trialkylaluminum is added to a hydrocarbon medium suspension of a compound containing adsorbed water or a salt containing water of crystallization, for example, magnesium chloride hydrate, copper sulfate hydrate, aluminum sulfate hydrate, nickel sulfate hydrate or cerous chloride hydrate, to allow the adsorbed water or the water of crystallization to react with the organoaluminum compound.

(2) A method in which water, ice or water vapor is allowed to directly act on an organoaluminum compound such as a trialkylaluminum in a medium such as benzene, toluene, ethyl ether, or tetrahydrofuran.

(3) A method in which an organoaluminum compound such as a trialkylaluminum is reacted with an organic tin oxide such as dimethyltin oxide or dibutyltin oxide in a medium such as decane, benzene, or toluene.

The above mentioned aluminoxane may contain a small amount of an organometallic component. Further, after removing the solvent or unreacted organoaluminum compound from the recovered solution of the aluminoxane by distillation, the resulting aluminoxane may be redissolved in a solvent, or suspended in a poor solvent for aluminoxane.

Specific examples of the organoaluminum compound used in the production of aluminoxane include the same as those exemplified as the organoaluminum compounds represented by the general formula (C-1a).

Among these, preferred is a trialkylaluminum or a tricycloalkylaluminum, and particularly preferred is trimethylaluminum.

The organoaluminum compounds as described above are used alone, or in combination of two or more kinds.

Examples of the solvent to be used in the production of aluminoxane include hydrocarbon solvents including: aromatic hydrocarbons such as benzene, toluene, xylene, cumene, and cymene; aliphatic hydrocarbons such as pentane, hexane, heptane, octane, decane, dodecane, hexadecane, and octadecane; alicyclic hydrocarbons such as cyclopentane, cyclohexane, cyclooctane, and methylcyclopentane; petroleum fractions such as gasoline, kerosene, and gas oil; and halides, particularly, chlorides and bromides, of the above mentioned aromatic hydrocarbons, aliphatic hydrocarbons, and alicyclic hydrocarbons. In addition, ethers such as ethyl ether and tetrahydrofuran can also be used. Of these solvents, particularly preferred is an aromatic hydrocarbon or an aliphatic hydrocarbon.

Still further, it is preferred that the benzene-insoluble organoaluminum oxy compound to be used in the present invention contain an Al component soluble in benzene at 60° C. in an amount of usually 10% or less, preferably 5% or less, and particularly preferably 2% or less, in terms of Al atom. In other words, the benzene-insoluble organoaluminum oxy compound is preferably insoluble or poorly soluble in benzene.

The organoaluminum oxy compound (C-2) to be used in the present invention may also be, for example, an organoaluminum oxy compound containing boron, represented by the following general formula (III):

[Chem. 17]

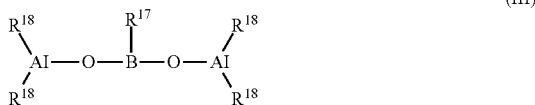

(III)

(wherein in the general formula (III), $R^{17}$ represents a hydrocarbon group having from 1 to 10 carbon atoms; and four $R^{18}$s, which may be the same or different from each other, each represents a hydrogen atom, a halogen atom, and a hydrocarbon group having from 1 to 10 carbon atoms).

The organoaluminum oxy compound containing boron represented by the general formula (III) above can be produced by reacting an alkylboronic acid represented by the following general formula (IV) with an organoaluminum compound at a temperature of from −80° C. to room temperature for one minute to 24 hours in an inert solvent under an inert gas atmosphere:

(IV)

(wherein in the general formula (IV), $R^{19}$ represents the same group as defined for $R^{17}$ in the general formula (III)).

Specific examples of the alkylboronic acid represented by the general formula (IV) include methylboronic acid, ethylboronic acid, isopropylboronic acid, n-propylboronic acid, n-butylboronic acid, isobutylboronic acid, n-hexylboronic acid, cyclohexylboronic acid, phenylboronic acid, 3,5-difluorophenylboronic acid, pentafluorophenylboronic acid, and 3,5-bis(trifluoromethyl)phenylboronic acid. Among these, preferred are methylboronic acid, n-butylboronic acid, isobutylboronic acid, 3,5-difluorophenylboronic acid, and pentafluorophenylboronic acid. These may be used alone or in combination of two or more kinds.

Specific examples of the organoaluminum compound to be reacted with the alkylboronic acid as described above include the same as those exemplified as the organoaluminum compounds represented by the general formula (C-1a) above.

The organoaluminum compound is preferably a trialkylaluminum or a tricycloalkylaluminum, and particularly preferably, trimethylaluminum, triethylaluminum, or triisobutylaluminum. These may be used alone or in combination of two or more kinds.

The organoaluminum oxy compound (C-2) as described above is used alone, or in combination of two or more kinds.
((C-3) Compound which Reacts with Transition Metal Compound (A) or Transition Metal Compound (B) to Form Ion Pair)

Examples of the compound (C-3) (hereinafter, referred to as "ionized ionic compound") which reacts with the transition metal compound (A) or the transition metal compound (B) to form an ion pair, which is used in the present invention, include Lewis acids, ionic compounds, borane compounds and carborane compounds described in JP H1-501950 A, JP H1-502036 A, JP H3-179005 A, JP H3-179006 A, JP H3-207703 A, JP H3-207704 A, U.S. Pat. No. 5,321,106 B; and the like. Further, the compound (C-3) may also be a heteropoly compound or an isopoly compound.

Specific examples of the Lewis acid include compounds represented by $BR_3$ (wherein R represents a phenyl group which optionally contains a substituent such as fluorine, a methyl group, or a trifluoromethyl group; or fluorine), such as trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron, and tris(3,5-dimethylphenyl)boron.

Examples of the ionic compound include compounds represented by the following general formula (V):

[Chem. 18]

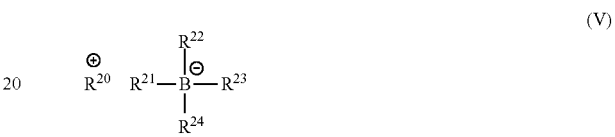

(V)

(wherein in the general formula (V), $R^{20}$ is $H^+$, a carbonium cation, an oxonium cation, an ammonium cation, a phosphonium cation, a cycloheptyltrienyl cation or a ferrocenium cation including a transition metal; and $R^{21}$ to $R^{24}$, which may be the same or different from each other, each represents an organic group, preferably an aryl group or a substituted aryl group).

Specific examples of the carbonium cation include tri-substituted carbonium cations such as triphenylcarbonium cation, tri(methylphenyl)carbonium cation, tri(dimethylphenyl)carbonium cation; and the like.

Specific examples of the ammonium cation include trialkylammonium cations such as trimethylammonium cation, triethylammonium cation, tripropylammonium cation, tributylammonium cation, and tri(n-butyl)ammonium cation; N,N-dialkylanilinium cations such as N,N-dimethylanilinium cation, N,N-diethylanilinium cation, and N,N-2,4,6-pentamethylanilinium cation; dialkylammonium cations such as di(isopropyl)ammonium cation, and dicyclohexylammonium cation; and the like.

Specific examples of the phosphonium cation include triarylphosphonium cations such as triphenylphosphonium cation, tri(methylphenyl)phosphonium cation, tri(dimethylphenyl)phosphonium cation; and the like.

$R^{20}$ is preferably a carbonium cation or an ammonium cation, and particularly preferably, a triphenylcarbonium cation, an N,N-dimethylanilinium cation, or an N,N-diethylanilinium cation.

Examples of the ionic compound include trialkyl-substituted ammonium salts, N,N-dialkylanilinium salts, dialkylammonium salts, triarylphosphonium salts, and the like.

Specific examples of the trialkyl-substituted ammonium salt include triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tri(n-butyl)ammonium tetra(pentafluorophenyl)boron, tripropylammonium tetra(o,p-dimethylphenyl)boron, tri(n-butyl)ammonium tetra(m,m-dimethylphenyl)boron, tri(n-butyl)ammonium tetra(p-trifluoromethylphenyl)boron, tri(n-butyl)ammonium tetra(3,5-ditrifluoromethylphenyl)boron, tri(n-butyl)ammonium tetra(o-tolyl)boron, and the like.

Specific examples of the N,N-dialkylanilinium salt include N,N-dimethylanilinium tetra(phenyl)boron, N,N-diethylanilinium tetra(phenyl)boron, N,N,2,4,6-pentamethylanilinium tetra(phenyl)boron, and the like.

Specific examples of the dialkylammonium salt include di(1-propyl)ammonium tetra(pentafluorophenyl)boron, dicyclohexylammonium tetra(phenyl)boron, and the like.

Further, examples of the ionic compound include triphenylcarbenium tetrakis(pentafluorophenyl)borate, N,N-dimethylanilinium tetrakis(pentafluorophenyl)borate, ferrocenium tetra(pentafluorophenyl)borate, triphenylcarbeniumpentaphenylcyclopentadienyl complex, N,N-diethylaniliniumpentaphenylcyclopentadienyl complex, and boron compounds represented by the following formulae (VI) and (VII):

[Chem. 19]

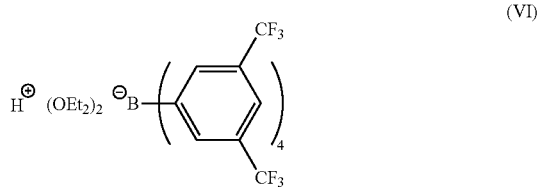

(VI)

(wherein in the formula (VI), Et represents an ethyl group)

[Chem. 20]

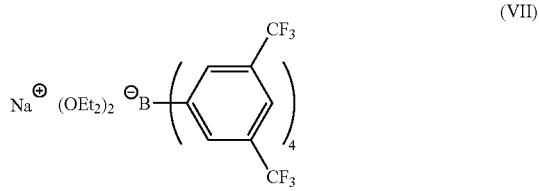

(VII)

(wherein in the formula (VII), Et represents an ethyl group).

Specific examples of the borane compound as an example of the ionized ionic compound (compound (C-3)) include: decaborane; salts of anions such as bis[tri(n-butyl)ammonium]nonaborate, bis[tri(n-butyl)ammonium]decaborate, bis[tri(n-butyl)ammonium]undecaborate, bis[tri(n-butyl)ammonium]dodecaborate, bis[tri(n-butyl)ammonium]decachlorodecaborate, and bis[tri(n-butyl)ammonium]dodecachlorododecaborate; salts of metal borane anions such as tri(n-butyl)ammoniumbis(dodecahydride dodecaborate)cobaltate and bis[tri(n-butyl)ammonium]bis(dodecahydride dodecaborate)nickelate (III); and the like.

Specific examples of the carborane compound as an example of the ionized ionic compound include: salts of anions such as 4-carbanonaborane, 1,3-dicarbanonaborane, 6,9-dicarbadecaborane, dodecahydride-1-phenyl-1,3-dicarbanonaborane, dodecahydride-1-methyl-1,3-dicarbanonaborane, undecahydride-1,3-dimethyl-1,3-dicarbanonaborane, 7,8-dicarbaundecaborane, 2,7-dicarbaundecaborane, undecahydride-7,8-dimethyl-7,8-dicarbaundecaborane, dodecahydride-11-methyl-2,7-dicarbaundecaborane, tri(n-butyl)ammonium 1-carbadecaborate, tri(n-butyl)ammonium 1-carbaundecaborate, tri(n-butyl)ammonium 1-carbadodecaborate, tri(n-butyl)ammonium 1-trimethylsilyl-1-carbadecaborate, tri(n-butyl)ammoniumbromo-1-carbadodecaborate, tri(n-butyl)ammonium 6-carbadecaborate, tri(n-butyl)ammonium 6-carbaundecaborate, tri(n-butyl)ammonium 7-carbaundecaborate, tri(n-butyl)ammonium 7,8-dicarbaundecaborate, tri(n-butyl)ammonium 2,9-dicarbaundecaborate, tri(n-butyl)ammoniumdodecahydride-8-methyl-7,9-dicarbaundecaborate, tri(n-butyl)ammoniumundecahydride-8-ethyl-7,9-dicarbaundecaborate, tri(n-butyl)ammoniumundecahydride-8-butyl-7,9-dicarbaundecaborate, tri(n-butyl)ammoniumundecahydride-8-allyl-7,9-dicarbaundecaborate, tri(n-butyl)ammoniumundecahydride-9-trimethylsilyl-7,8-dicarbaundecaborate, and tri(n-butyl)ammoniumundecahydride-4,6-dibromo-7-carbaundecaborate; salts of metal carborane anions such as tri(n-butyl)ammoniumbis(nonahydride-1,3-dicarbanonaborate)cobaltate (III), tri(n-butyl)ammoniumbis(undecahydride-7,8-dicarbaundecaborate)ferrate (III), tri(n-butyl)ammoniumbis(undecahydride-7,8-dicarbaundecaborate) cobaltate (III), tri(n-butyl)ammoniumbis(undecahydride-7,8-dicarbaundecaborate) nickelate (III), tri(n-butyl)ammoniumbis(undecahydride-7,8-dicarbaundecaborate) cuprate (III), tri(n-butyl)ammoniumbis(undecahydride-7,8-dicarbaundecaborate)aurate (III), tri(n-butyl)ammoniumbis(nonahydride-7,8-dimethyl-7,8-dicarbaundecaborate)ferrate (III), tri(n-butyl)ammoniumbis(nonahydride-7,8-dimethyl-7,8-dicarbaundecaborate)chromate (III), tri(n-butyl)ammoniumbis(tribromooctahydride-7,8-dicarbaundecaborate)cobaltate (III), tris[tri(n-butyl)ammonium]bis(undecahydride-7-carbaundecaborate)chromate (III), bis[tri(n-butyl)ammonium]bis(undecahydride-7-carbaundecaborate) manganate (IV), bis[tri(n-butyl)ammonium]bis(undecahydride-7-carbaundecaborate)cobaltate (III), and bis[tri(n-butyl)ammonium]bis(undecahydride-7-carbaundecaborate)nickelate (IV); and the like.

The heteropoly compound as an example of the ionized ionic compound is a compound including an atom selected from silicon, phosphorus, titanium, germanium, arsenic and tin, and one or not less than two kinds of atoms selected from vanadium, niobium, molybdenum and tungsten. Specific examples thereof include phosphovanadic acid, germanovanadic acid, arsenovanadic acid, phosphoniobic acid, germanoniobic acid, siliconomolybdic acid, phosphomolybdic acid, titanomolybdic acid, germanomolybdic acid, arsenomolybdic acid, stannomolybdic acid, phosphotungstic acid, germanotungstic acid, stannotungstic acid, phosphomolybdovanadic acid, phosphotungstovanadic acid, germanotaungstovanadic acid, phosphomolybdotungstovanadic acid, germanomolybdotungstovanadic acid, phosphomolybdotungstic acid, and phosphomolybdoniobic acid; and salts of these acids, but not limited thereto. Further, examples of the above mentioned salts include salts of the above mentioned acid with, for example, a metal of Group 1 or 2 in the periodic table, specifically, lithium, sodium, potassium, rubidium, cesium, beryllium, magnesium, calcium, strontium, or barium; and organic salts, such as triphenylethyl salt, of the above mentioned acid.

The isopoly compound as an example of the ionized ionic compound is a compound composed of ions of one type of metal atom selected from vanadium, niobium, molybdenum and tungsten, and it can be considered as a molecular ion species of a metal oxide. Specific examples thereof include vanadic acid, niobic acid molybdic acid, tungstic acid, and salts of these acids, but not limited thereto. Further, the above mentioned salts include salts of the above mentioned acid with, for example, a metal of Group 1 or 2 in the periodic table, specifically, lithium, sodium, potassium, rubidium, cesium, beryllium, magnesium, calcium, strontium, or barium; and organic salts, such as triphenylethyl salt, of the above mentioned acid.

The ionized ionic compound as described above (the compound (C-3) which reacts with the transition metal compound (A) or the transition metal compound (B) to form an ion pair) is used alone, or in combination of two or more kinds.

When the organoaluminum oxy compound (C-2), such as methylaluminoxane as a co-catalyst component, is used in combination, along with the transition metal compound (A) or the transition metal compound (B), a very high polymerization activity for an olefin compound will be exhibited.

The ionized ionic compound (C-3) as described above is used alone, or in combination of two or more kinds.

Further, the olefin polymerization catalyst to be used in the method for producing the olefin resin [R] according to the present invention may include a carrier (D) described below, as required, along with the above mentioned components (A) to (C).

[Carrier (D)]

The carrier (D) which can be used in the present invention is an inorganic or organic compound, which is a solid in the form of granules or fine particles. By allowing the transition metal compound (A) and the compound (B) to be supported on the carrier (D), a polymer having a favorable morphology can be obtained.

The inorganic compound is preferably a porous oxide, an inorganic halide, a clay, a clay mineral, an ion-exchangeable layered compound or a solid organoaluminum oxy compound.

Specific examples of the porous oxide which can be used include $SiO_2$, $Al_2O_3$, $MgO$, $ZrO$, $TiO_2$, $B_2O_3$, $CaO$, $ZnO$, $BaO$, $ThO_2$, and the like; and composites and mixtures containing these. Further, for example, a natural or synthetic zeolite, $SiO_2$—$MgO$, $SiO_2$—$Al_2O_3$, $SiO_2$—$TiO_2$, $SiO_2$—$V_2O_5$, $SiO_2$—$Cr_2O_3$, $SiO_2$—$TiO_2$—$MgO$ or the like can also be used. Of these, a porous oxide comprising $SiO_2$ and/or $Al_2O_3$ as a main component(s) is preferred.

The porous oxide may contain a small amount of a carbonate, sulfate, nitrate and/or oxide component(s), such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, and/or $Li_2O$.

While the properties of the porous oxide vary depending on the type and the production method thereof, the porous oxide to be preferably used in the present invention has: a particle size of from 10 to 300 µm, and preferably from 20 to 200 µm; a specific surface area within the range of from 50 to 1000 $m^2/g$, and preferably from 100 to 700 $m^2/g$; and a pore volume within the range of from 0.3 to 3.0 $cm^3/g$. Such a porous oxide is calcined, as necessary, at a temperature of from 100 to 1000° C., preferably from 150 to 700° C. before being used.

Examples of the inorganic halide include $MgCl_2$, $MgBr_2$, $MnCl_2$, $MnBr_2$ and the like. The inorganic halide may be used as it is, or may be ground by a ball mill or a vibration mill before being used. It is also possible to use fine particles obtained by dissolving the inorganic halide in a solvent such as alcohol and then allowing it to precipitate using a precipitating agent.

The clay usually comprises a clay mineral as a major component. The ion-exchangeable layered compound is a compound having a crystalline structure in which planes formed by ionic bonding and the like are stacked in parallel with a weak mutual bonding force, and ions contained therein can be exchanged. Most of the clay minerals are ion-exchangeable layered compounds. The clay, the clay mineral, and the ion-exchangeable layered compound to be used may be naturally-occurring as well as artificially synthesized products.

The clay, the clay mineral or the ion-exchangeable layered compound may be, for example, an ionic crystalline compound having a layered crystalline structure such as hexagonal close-packed structure, antimony structure, $CdCl_2$ structure, or $CdI_2$ structure.

Examples of the clay and the clay mineral include kaolin, bentonite, kibushi clay, gairome clay, allophane, hisingerite, pyrophyllite, mica group, montmorillonite group, vermiculite, chlorite group, palygorskite, kaolinite, nacrite, dickite, halloysite, and the like.

Examples of the ion-exchangeable layered compound include crystalline acid salts of polyvalent metals such as α-$Zr(HAsO_4)_2 \cdot H_2O$, α-$Zr(HPO_4)_2$, α-$Zr(KPO_4)_2 \cdot 3H_2O$, α-$Ti(HPO_4)_2$, α-$Ti(HAsO_4)_2 \cdot H_2O$, α-$Sn(HPO_4)_2 \cdot H_2O$, γ-$Zr(HPO_4)_2$, γ-$Ti(HPO_4)_2$, γ-$Ti(NH_4PO_4)_2 \cdot H_2O$, and the like.

The clay, the clay mineral or the ion-exchangeable layered compound as described above, preferably has a pore volume of 0.1 cc/g or more for pores having a pore radius of 20 Å or more, as measured by a mercury penetration method, and particularly preferably from 0.3 to 5 cc/g. The pore volume as used herein is measured for pores having a radius within the range of from 20 to 30,000 Å, by a mercury penetration method using a mercury porosimeter.

When, as the carrier, a carrier having a pore volume of less than 0.1 cc/g for pores having a pore radius of 20 Å or more is used, it tends to be difficult to obtain a high polymerization activity.

It is also preferred that the clay or the clay mineral to be used in the present invention be subjected to chemical treatment. The chemical treatment may be a surface treatment for removing impurities attached to the surface of the clay or the clay material, or a treatment intended to affect the crystalline structure of the clay or the clay material, any of which can be used. Specific examples of the chemical treatment include an acid treatment, an alkali treatment, a salt treatment, and an organic matter treatment. The acid treatment not only removes impurities on the surface, but also increases the surface area of the clay or the clay material by eluting cations such as Al, Fe, and Mg from the crystalline structure. The alkali treatment destroys the crystalline structure of the clay, thereby changing the structure of the clay. The salt treatment and the organic matter treatment result in the formation of ion complexes, molecular complexes, organic derivatives or the like, thereby changing the surface area or interlayer distance.

The ion-exchangeable layered compound to be used in the present invention may be a layered compound in which the interlayer distance is increased by exchanging the exchangeable ions between layers with other larger and bulkier ions, utilizing its ion-exchange properties. Such bulky ions play a pillar-like role to support the layered structure, and are usually referred to as "pillar". Introduction of another substance (s) into the space between layers of a layered compound is referred to as "intercalation". Examples of guest compounds to be intercalated include: cationic inorganic compounds such as $TiCl_4$ and $ZrCl_4$; metal alkoxides such as $Ti(OR)_4$, $Zr(OR)_4$, $PO(OR)_3$, and $B(OR)_3$ (wherein R is a hydrocarbon group or the like); and metal hydroxide ions such as $[Al_{13}O_4(OH)_{24}]^{7+}$, $[Zr_4(OH)_{14}]^{2+}$, and $[Fe_3O(OCOCH_3)_6]^+$. These compounds may be used alone or in combination of two or more kinds. The intercalation of these compounds may be carried out in the presence of a polymerization product obtained by hydrolysis of a metal alkoxide such as $Si(OR)_4$, $Al(OR)_3$ or $Ge(OR)_4$ (wherein R represents a hydrocarbon group or the like), or in the presence of a colloidal inorganic compound such as SiO$_2$. Examples of the pillar include oxides resulting from thermal dehydration of the above mentioned metal hydroxide ions intercalated between layers.

The clay, the clay mineral, or the ion-exchangeable layered compound to be used in the present invention may be used as it is, or it may be subjected to ball milling, sieving or the like before being used. Alternatively, it may be subjected to an additional water absorption or thermal dehydration treatment before being used. The clay, the clay mineral, or the ion-exchangeable layered compound may be used alone or in combination with two or more kinds.

The solid organoaluminum oxy compound is a solid component obtainable by insolubilizing the organoaluminum oxy compound (B-2), and it can be produced by a method disclosed in JP H11-140113 A, JP 2000-38410 A, JP 2000-95810 A, WO 2010/55652 A, or the like.

The carrier (D) is an inorganic or organic compound as described above. The organic compound may be, for example, a solid in the form of granules or fine particles, having a particle size within the range of from 10 to 300 μm. Specific examples thereof include (co)polymers produced using, as a main component, an α-olefin having from 2 to 14 carbon atoms, such as ethylene, propylene, 1-butene, or 4-methyl-1-pentene; (co)polymers produced using, as a main component, vinylcyclohexane or styrene; and modified products thereof.

The olefin polymerization catalyst to be used in the production method of the olefin resin [R] according to the present invention may include an organic compound component (E) described below, as required, along with the above mentioned components (A) to (C).

[Organic Compound Component (E)]

The organic compound component (E) is used, as required, for the purpose of improving the polymerization performance (such as catalyst activity) of the olefin polymerization catalyst of the present invention and the physical properties (such as increasing the molecular weight of the resulting polymer) of the resulting polymer. Examples of the organic compound include an alcohol, a phenolic compound, a carboxylic acid, a phosphorus compound, a sulfonic acid salt and the like, but not limited thereto.

As the alcohol or the phenolic compound, one represented by $R^{25}$—OH is usually used, wherein $R^{25}$ represents a hydrocarbon group having from 1 to 50 carbon atoms (in the case of a phenol, one having from 6 to 50 carbon atoms) or a halogenated hydrocarbon group having from 1 to 50 carbon atoms (in the case of a phenol, one having from 6 to 50 carbon atoms).

The alcohol is preferably one in which $R^{25}$ is a halogenated hydrocarbon group. The phenolic compound is preferably one in which the α,α'-position of the hydroxyl group is substituted with a hydrocarbon having from 1 to 20 carbon atoms.

As the carboxylic acid, one represented by $R^{26}$—COOH is usually used, wherein $R^{26}$ represents a hydrocarbon group having from 1 to 50 carbon atoms or a halogenated hydrocarbon group having from 1 to 50 carbon atoms. In particular, a halogenated hydrocarbon group having from 1 to 50 carbon atoms is preferred.

Preferred examples of the phosphorus compound include phosphoric acids containing a P—O—H bond, phosphates containing a P—OR and a P═O bond, and phosphine oxide compounds.

The sulfonic acid salt may be, for example, one represented by the following general formula (VIII):

[Chem. 21]

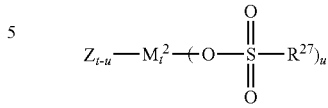

(VIII)

(wherein in the general formula (VIII), $M^2$ represents an element of Groups 1 to 14 in the periodic table, $R^{27}$ is a hydrogen atom, a hydrocarbon group having from 1 to 20 carbon atoms or a halogenated hydrocarbon group having from 1 to 20 carbon atoms; Z is a hydrogen atom, a halogen atom, a hydrocarbon group having from 1 to 20 carbon atoms or a halogenated hydrocarbon group having from 1 to 20 carbon atoms; t is an integer of from 1 to 7; u is an integer satisfying 1≤u≤7; and t–u is an integer satisfying t–u≥1).

[Polymerization Method]

A description will now be given regarding the method for producing the olefin resin [R], in which olefins are polymerized in the presence of the olefin polymerization catalyst including the above mentioned components (A), (B), and (C).

The polymerization can be carried out either by a liquid phase polymerization method, such as solution polymerization, bulk polymerization, or suspension polymerization; or a gas phase polymerization method.

Examples of inert hydrocarbon media to be used in the liquid phase polymerization method include: aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethylene chloride, chlorobenzene, and dichloromethane; and mixtures thereof. An olefin itself may be used as a solvent.

When the above mentioned olefin polymerization catalyst is used in the production of the olefin resin [R], the transition metal compound (A) is used in such an amount that it accounts for usually from $10^{-8}$ to 1 mole, and preferably from $10^{-7}$ to 0.5 moles per liter of the reaction volume, and the transition metal compound (B) is used in such an amount that it accounts for usually from $10^{-12}$ to $10^{-2}$ moles, and preferably from $10^{-10}$ to $10^{-3}$ moles per liter of the reaction volume. In addition, the transition metal compound (A) and the transition metal compound (B) are used in such amounts that the molar ratio (B/A) of the transition metal compound (B) to the transition metal compound (A) is usually from 0.00001 to 100, preferably from 0.00005 to 10, still more preferably from 0.000075 to 1, and still further preferably from 0.0001 to 0.5.

The organometallic compound (C-1) is used in such an amount that the molar ratio (C-1/M) of the organometallic compound (C-1) to transition metal atoms (M) in the transition metal compound (A) and the transition metal compound (B) is usually from 0.01 to 100,000, and preferably from 0.05 to 50,000.

The organoaluminum oxy compound (C-2) is used in such an amount that the molar ratio (C-2/M) of aluminum atoms in the organoaluminum oxy compound (C-2) to the transition metal atoms (M) in the transition metal compound (A) and the transition metal compound (B) is usually from 10 to 500,000, and preferably from 20 to 100,000.

The ionized ionic compound (C-3) is used in such an amount that the molar ratio (C-3/M) of the ionized ionic compound (C-3) to the transition metal atoms (M) in the transition metal compound (A) and the transition metal compound (B) is usually from 1 to 10, and preferably from 1 to 5.

When the above mentioned olefin polymerization catalyst is used, the polymerization of olefins is carried out usually at a polymerization temperature within the range of from −50 to +300° C., and preferably from 0 to 170° C. The polymerization is performed usually at a polymerization pressure of from normal pressure to 9.8 MPa (100 kg/cm$^2$), preferably from normal pressure to 4.9 MPa (50 kg/cm$^2$), and the polymerization reaction can be carried out using any of a batch method, a semi-continuous method, and a continuous method.

The molecular weight of the resulting olefin polymer can be adjusted by allowing hydrogen to exist in the polymerization system, or by changing the polymerization temperature. Further, the molecular weight can also be adjusted by selecting any of the components to be used as the (A), (B) and (C), or by selecting the combinations thereof.

Examples of the olefins to be used in the polymerization include ethylene and the above mentioned α-olefins having from 3 to 20 carbon atoms. As the olefins, ethylene is used as an essential monomer, and one or more other monomers can be used in combination.

In the present invention, the olefin resin [R] can be produced by either the following polymerization method [a] or [b].

Polymerization Method [a]

A method including a pre-process [a-1], in which ethylene is polymerized in the presence of the transition metal compound (B) and the compound (C) to give a vinyl-terminated macromonomer; and a post-process [a-2] to be carried out subsequently, in which ethylene and at least one α-olefin selected from α-olefins having from 3 to 20 carbon atoms are copolymerized, in the presence of the reaction product obtained in the pre-process [a-1], and in the presence of the transition metal compound (A) and the compound (C).

Polymerization Method [b]

A method in which ethylene and at least one α-olefin selected from α-olefins having from 3 to 20 carbon atoms are copolymerized in the presence of the transition metal compound (A), the transition metal compound (B), and the compound (C).

A preferred embodiment of the polymerization method [a] and the polymerization method [b] will now be described.

Polymerization Method [a]
Pre-Process [a-1]

The pre-process [a-1] is a process for mainly polymerizing ethylene using an olefin polymerization catalyst composed of the transition metal compound (B) and the compound (C) to obtain a vinyl-terminated macromonomer which is substantially an ethylene polymer. The polymerization method is not particularly limited as long as it satisfies the above mentioned ranges. In the case of liquid phase polymerization, the resulting reaction liquid may be introduced to the post-process as it is. Alternatively, the resulting vinyl-terminated macromonomer may be retrieved from the resulting reaction liquid, and the vinyl-terminated macromonomer may then be introduced to the post-process in the form of a lump as it is or in the form of a powder, or it may be formed into a slurry or melted again before being introduced to the post-process.

Post-Process [a-2]

It is a method including a post-process in which ethylene, at least one α-olefin selected from α-olefins having from 3 to 20 carbon atoms, and the vinyl-terminated macromonomer obtained in the pre-process [a-1] are copolymerized in the presence of the transition metal compound (A) and the compound (C). The polymerization method is not particularly limited as long as it satisfies the above mentioned ranges. Since it is a process that produces a non-crystalline or low-crystalline ethylene/α-olefin copolymer moiety, a liquid phase polymerization method is preferred. Particularly, a solution polymerization is preferred, in terms of controlling the concentration of the respective monomers so that an olefin resin [R] having a desired structure can be obtained.

The polymerization reaction may be carried out by a batch method both in the pre-process [a-1] and in the post-process [a-2]; or carried out in a manner that the pre-process [a-1] is performed by a batch method and, by introducing a retrieved vinyl-terminated macromonomer, the post-process [a-2] is performed by a continuous method. Alternatively, the polymerization reaction may be carried out in a manner that the pre-process [a-1] is performed by a continuous method and, by introducing a resulting product as it is, the post-process [a-2] is also performed by a continuous method. Further, the polymerization reaction may also be carried out by a continuous method in the pre-process [a-1], and by a batch method in the post-process [a-2].

Polymerization Method [b]

The polymerization method [b] is a method in which ethylene and at least one α-olefin selected from α-olefins having from 3 to 20 carbon atoms are polymerized in a single-stage in the presence of the transition metal compound (A), the transition metal compound (B), and the compound (C), which method can be carried out in one polymerization vessel. The olefin polymerization catalyst composed of the transition metal compound (B) and the compound (C) tends to polymerize ethylene with high selectivity, even if an α-olefin(s) other than ethylene is/are present in the polymerization system. Further, the olefin polymerization catalyst tends to produce a polymer having a relatively lower molecular weight, and the resulting polymer has a vinyl terminal. Accordingly, the olefin polymerization catalyst composed of the transition metal compound (B) and the compound (C) is capable of producing a vinyl-terminated macromonomer which is substantially an ethylene polymer.

On the other hand, an olefin polymerization catalyst composed of the transition metal compound (A) and compound (C) is capable of producing a polymer having a larger molecular weight, and it is also capable of copolymerizing ethylene, the α-olefin, and the vinyl-terminated macromonomer obtained by using the olefin polymerization catalyst composed of the transition metal compound (B) and the compound (C). Thus, it is possible to incorporate the olefin polymer [R1] into the olefin resin [R] under single polymerization reaction conditions.

In the method for producing the olefin resin [R] according to the present invention, the polymerization processes in the post-process [a-2] of the polymerization method [a] and the polymerization method [b] are preferably carried out by a solution polymerization method at a temperature within the range of from 80 to 300° C.

The "solution polymerization" according to the present invention is a generic term used to refer to methods in which polymerization is carried out in a state where a polymer is dissolved in an inert hydrocarbon solvent to be described later. In the solution polymerization according to the present invention, the polymerization temperature is usually from 80° C. to 300° C., and preferably from 90° C. to 250° C. In the solution polymerization, when the polymerization temperature is lower than 80° C., the vinyl-terminated macromonomer may not be sufficiently dissolved in the solvent, resulting in a failure to efficiently produce the olefin polymer [R1]. Further, when the polymerization temperature is lower than 80° C., the polymerization activity is extremely reduced, and it may be impractical in terms of productivity. In the polymerization temperature range of 80° C. or more, the solution viscosity during the polymerization decreases as the temperature increases, thereby allowing for an easy removal of polymerization heat and the production of an olefin polymer having a higher molecular weight. However, a polymerization temperature exceeding 300° C. is not preferred, since it may lead to a deterioration of the resulting polymer. The polymerization is carried out usually at a polymerization pressure of from normal pressure to 10 MPa gauge pressure, and preferably from normal pressure to 8 MPa gauge pressure; and the polymerization reaction can be carried out using any of a batch method, a semi-continuous method, and a continuous method. It is also possible to carry out the polymerization in two or more stages varying in reaction conditions. The molecular weight of the resulting olefin polymer can be adjusted by changing the concentration of hydrogen in the polymerization system or the polymerization temperature within the scope of the present invention. Further, the molecular weight can also be adjusted by changing the amount of the compound (C) to be used. In cases where hydrogen is added, the amount thereof is preferably from about 0.001 to 5,000 NL per 1 kg of the olefin polymer to be produced.

The solvent to be used in the solution polymerization according to the present invention is usually an inert hydrocarbon solvent, and preferably a saturated hydrocarbon having a boiling point of from 50 to 200° C. at normal pressure. Specific examples thereof include aliphatic hydrocarbons such as pentane, hexane, heptane, octane, decane, dodecane, and kerosene; and alicyclic hydrocarbons such as cyclopentane, cyclohexane, and methylcyclopentane. Note that, aromatic hydrocarbons such as benzene, toluene and xylene, and halogenated hydrocarbons such as ethylene chloride, chlorobenzene and dichloromethane are also included in the definition of the inert hydrocarbon solvent, and the use thereof is not limited.

[Other Components]

The olefin resin [R] according to the present invention can include other resins, rubbers, inorganic fillers and/or the like to the extent that the object of the present invention is not impaired. The olefin resin [R] can also include additives such as a weathering stabilizer, a heat stabilizer, an antistatic agent, an anti-slip agent, an anti-blocking agent, an antifogging agent, a lubricant, a pigment, a dye, a plasticizer, an anti-aging agent, a hydrochloric acid absorbent, an antioxidant and the like, and/or a crystal nucleating agent. In the olefin resin according to the present invention, the amounts to be added of the above mentioned other resins, rubbers, inorganic fillers, additives and the like are not particularly limited as long as the object of the present invention is not impaired. In an exemplary embodiment, the olefin resin [R] is included, for example, in an amount of from 5 to 100% by weight, preferably from 25% by weight to 100% by weight, more preferably from 50 to 100% by weight, and still more preferably from 70 to 100% by weight with respect to the total weight.

[Molded Article]

Since the olefin resin [R] according to the present invention has an improved heat resistance, reduced stickiness, and excellent optical properties and low temperature properties, as well as improved balance between these physical properties, as described above, it can be used in various types of molded articles for which olefin resins are used. The olefin resin according to the present invention can be molded into various types of molded articles, by various types of molding methods.

EXAMPLES

The present invention will now be described with reference to Examples. However, the present invention is not limited by these Examples.

(Measurement of Melting Peak Tm and Heat of Fusion ΔH)

Melting peaks Tm and heats of fusion ΔH were obtained by carrying out a DSC measurement under the following conditions.

Using a differential scanning calorimeter [RDC 220 manufactured by Seiko Instruments Inc.], about 10 mg of a sample was heated from 30° C. to 200° C. at a temperature rise rate of 50° C./min under a nitrogen atmosphere, and maintained at the temperature for 10 minutes. Then the sample was cooled to 30° C. at a temperature decrease rate of 10° C./min, and maintained at the temperature for 5 minutes, followed by heating to 200° C. at a temperature rise rate of 10° C./min. An endothermic peak observed at the second temperature elevation was obtained as the melting peak (Tm). The heat of fusion ΔH was obtained by calculating the area of the above mentioned melting peak (Tm). When multiple melting peaks were observed, the heat of fusion ΔH was obtained by calculating the entire area of the melting peaks.

(Measurement of Glass Transition Temperature (Tg))

The glass transition temperature (Tg) was measured by DSC under the following conditions.

Using a differential scanning calorimeter [RDC 220 manufactured by Seiko Instruments Inc.], about 10 mg of a sample was heated from 30° C. to 200° C. at a temperature rise rate of 50° C./min under a nitrogen atmosphere, and maintained at the temperature for 10 minutes. Then the sample was cooled to −100° C. at a temperature decrease rate of 10° C./min, and maintained at the temperature for 5 minutes, followed by heating to 200° C. at a temperature rise rate of 10° C./min. The glass transition temperature (Tg) is detected as a parallel shift of the baseline when the DSC curve is bent due to changes in specific heat at the second temperature elevation. A temperature observed at the intersection between the tangent line to the baseline on the lower temperature side of the bend and the tangent line at a point having a maximum inclination in the bent portion was defined as the glass transition temperature (Tg).

(Measurement of o-Dichlorobenzene-Soluble Portion by CFC)

The percentage E (wt %) of a portion soluble in o-dichlorobenzene at 20° C. or lower was obtained by performing CFC measurement under the following conditions. Apparatus: cross-fractionation chromatograph, CFC2 (Polymer ChAR); Detector (built-in): infrared spectrophotometer IR$^4$ (Polymer ChAR); Detection wavelength: 3.42 μm (2,920 cm$^{-1}$), fixed; Sample concentration: 120 mg/30 mL; Injection volume: 0.5 mL; Temperature decrease time: 1.0° C./min; Elution segment: 4.0° C. interval (−20° C. to 140° C.); GPC column: Shodex HT-806M×3 columns (Showa Denko Co., Ltd.); GPC column temperature: 140° C.; GPC column calibration: monodisperse polystyrene (Tosoh Corporation); Molecular weight calibration method: universal calibration method (in terms of polystyrene); Mobile phase: o-dichlorobenzene (BHT added); and Flow rate: 1.0 mL/min.

(Pulsed NMR Measurement)

Pulsed NMR measurement was carried out under the following conditions. Apparatus: JNM-MU25 manufactured by JEOL, Co. Ltd.; Measurement method: Carr Purecell Meiboom Gill method (CPMG method); Pulse width: 90° pulse, 2.0 μs; Repetition time: 4 sec; Number of scans: 8 times; and Measurement temperature: 200° C.

(Tensile Test)

The elastic modulus was obtained by measuring a test specimen having a thickness of 3.0 mm obtained by press-molding (200° C.×5 min) in accordance with ASTM D638.

($^{13}$C-NMR Measurement)

The $^{13}$C-NMR measurement was carried out under the following conditions, for the purpose of analyzing the α-olefin composition in a polymer, confirming the number of methyl branches of the macromonomer, and confirming the graft structure. Apparatus: AVANCE III 500 CryoProbe Prodigy type nuclear magnetic resonance apparatus manufactured by Bruker Biospin GmbH; Nucleus measured: $^{13}$C (125 MHz): Measurement mode: single pulse proton broad-band decoupling; Pulse width: 45° (5.00 μsec), Number of points: 64 k; Measurement range: 250 ppm (−55 to 195 ppm), Repetition time: 5.5 sec, Number of scans: 512 times, Solvent for measurement: o-dichlorobenzene/benzene-d$_6$ (4/1 v/v); Sample concentration: ca. 60 mg/0.6 mL; Measurement temperature: 120° C., Window function: exponential (BF: 1.0 Hz); and Chemical shift reference: benzene-d$_6$ (128.0 ppm).

(Transmission Electron Microscope Observation)

The observation of the phase structure of an olefin resin was carried out as follows, using a transmission electron microscope. A quantity of 40 g of the olefin resin and an antioxidant, Irganox (40 mg), were introduced (manufactured by Toyo Seiki Co., Ltd.), and the resultant was melt-kneaded at 200° C. and at 60 rpm for 5 minutes, and formed into a sheet by press working. The resulting molded article was observed using a transmission electron microscope (H-7650 manufactured by Hitachi, Ltd.), and the phase structure was observed according to the method as described above.

(GPC Analysis)

The GPC analysis was carried out for the purpose of analyzing the molecular weight of a polymer and estimating the amount of remaining macromonomer under the following conditions. Apparatus: Alliance GPC model 2000, manufactured by Waters Corporation; Column: TSK gel GMH6-HT×2 columns, TSK gel GMH6-HTL×2 columns (each manufactured by Tosoh Corporation; inner diameter: 7.5 mm×length: 30 cm); Column temperature: 140° C.; Mobile phase: o-dichlorobenzene (containing 0.025% dibutylhydroxytoluene); Detector: differential refractometer; Flow rate: 1.0 mL/min; Sample concentration: 0.15% (w/v); Injection volume: 0.5 mL; Sampling time interval: 1 sec; and Column calibration: monodisperse polystyrene (manufactured by Tosoh Corporation).

(Solid Viscoelasticity Measurement)

The measurement of solid viscoelasticity was performed as an evaluation of heat resistance of an olefin resin. The ratio (G'$_{20}$° C./G'$_{80}$° C.) of a storage modulus at 20° C. (G'$_{20}$° C.) to a storage modulus at 80° C. was calculated to be used as an index for the heat resistance. A lower value of the ratio G'$_{20}$° C./G'$_{80}$° C. indicates a lower temperature dependence, and thus, an excellent heat resistance, and a higher value of the ratio G'$_{20}$° C./G'$_{80}$° C. indicates a higher temperature dependence, and thus, a poor heat resistance.

The solid viscoelasticity was measured using a test specimen obtained by press-molding (200° C.×5 min) under the following conditions. Apparatus: RSA-III manufactured by TA instruments; Measurement mode: tensile mode (Auto tension, Auto strain control); Measurement temperature: −100° C. to 150° C. (up to a measurable temperature); Temperature rise rate: 3° C./min, Measurement frequency: 1 Hz; and Measurement atmosphere: nitrogen.

(Light Transmittance)

As an evaluation of optical properties of an olefin resin, the measurement of the light transmittance of a sheet of the resin was performed as follows. First, a pressed sheet sample having a thickness of 300 μm was prepared. The pressed sheet sample was cut into a size of 3 cm×5 cm, and the total light transmittance at a wavelength of from 300 to 800 nm of the pressed sheet sample was measured using a spectrophotometer manufactured by Hitachi, Ltd. (brand name: "U-4100") equipped with an integrating sphere having a diameter of 60 mm.

(Adherence Test)

As an evaluation of stickiness of an olefin resin, the adherence test of a sheet of the resin was performed as follows. A higher peel strength indicates a higher stickiness of the resin, and a lower peel strength indicates a lower stickiness. First, pressed sheet samples having a thickness of 0.1 mm were prepared. Two of the pressed sheet samples were then stacked, and a load of 500 kgf/m$^2$ was applied to the resultant at 40° C. for 24 hours. T-type peel test was carried out at a measurement temperature of 23.0° C., a test speed of 200.0 mm/min, and a test specimen width of 80.0 mm to measure the adhesion strength of the sample. When the sample was stretched without peeling or ruptured at the chucking portion due to having an extremely high adhesion strength, the sample was defined as "unable to peel".

(Reagents Used)

Toluene to be used was purified using an organic solvent purification apparatus manufactured by Glass Contour. A 10 wt % solution of methylaluminoxane/hexane, MMAO-3A, manufactured by Tosoh Finechem Corporation was used as methylaluminoxane. As triisobutylaluminum, one manufactured by Tosoh Corporation was diluted with toluene (1.0 M) and used.

(Structure and Composition Ratio of Olefin Polymer [R1])

The examination of the structure of the olefin polymer [R1] was carried out by the above mentioned methods.

The composition ratio of the olefin polymer [R1] in the olefin resin [R] was estimated based on the equation below.

$$[R1](\text{wt \%}) = 100 - MM - E_{[R]} * (100/(E_{[main\ chain]});$$

[R1](wt %): composition ratio (wt %) of olefin polymer [R1],

MM: percentage of remaining macromonomer (wt %) as measured by GPC $E_{[R]}$: percentage (wt %) of portion soluble in o-dichlorobenzene at 20° C. or lower as measured by CFC, in the olefin resin [R]

$E_{[main\ chain]}$: percentage (wt %) of portion soluble in o-dichlorobenzene at 20° C. or lower as measured by CFC, in the ethylene/α-olefin copolymer corresponding solely to the main chain of the olefin polymer [R1], synthesized according to the above mentioned method.

The polymerization in Examples and Comparative Examples will now be described. Note that there were cases where polymerization was carried out for a plurality of times, for the purpose of analysis, and the synthesis of samples for comparison.

Example 1

Synthesis of Macromonomer (P-1) (Pre-Process [A-1])

A compound (1) used as a catalyst was synthesized according to [Synthesis Example 3] in WO 2006/057229 A, and a macromonomer was synthesized according to [Example 1] therein. The resulting product had an Mw of 1,550 in terms of polyethylene, an Mw/Mn of 2.32, and a ratio of molecules whose one terminal has an unsaturated bond as measured by $^{1}$H-NMR of 99.0 mol %.

[Chem. 22]

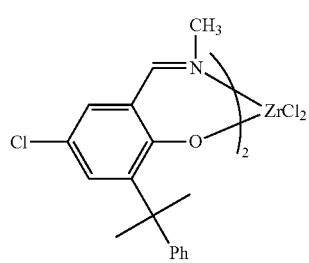

Compound (1)

<Graft Copolymerization (Post-Process [b-1])>

A compound (2) used as a catalyst was synthesized by a known method.

To a sufficiently nitrogen-substituted glass reactor with a capacity of 1 L, 5.0 g of a macromonomer (P-1) and 500 ml of xylene were introduced, followed by heating to 100° C. to allow the macromonomer dissolved. To the resultant, ethylene and 1-butene were supplied continuously, at 100 liter/hr and at 68 liter/hr, respectively, to saturate the liquid phase and the gas phase. While continuing to supply ethylene and 1-butene, 1.6 mL (1.6 mmol) of a decane solution (1.0 mol/L) of triisobutylaluminum (also referred to as iBu$_3$Al), 4.0 mL (0.0080 mmol) of a toluene solution (0.0020 mol/L) of the compound (2), and then 2.5 mL (0.010 mmol) of a toluene solution (4.0 mmol/L) of triphenylcarbenium tetrakis(pentafluorophenyl)borate (also referred to as Ph$_3$CB(C$_6$F$_5$)$_4$) were added, and polymerization was performed at 100° C. for 15 minutes under normal pressure. The polymerization was terminated by adding a small amount of isobutanol. The resulting polymerization reaction solution was added to 1.5 liter of methanol containing a small amount of hydrochloric acid to allow a polymer precipitated. The precipitated polymer was washed with methanol and then dried under reduced pressure at 80° C. for 10 hours to give 24.0 g of an olefin resin. The analysis results of the resulting olefin resin are shown in Table 1, and the analysis results of the olefin polymer are shown in Table 6.

[Chem. 23]

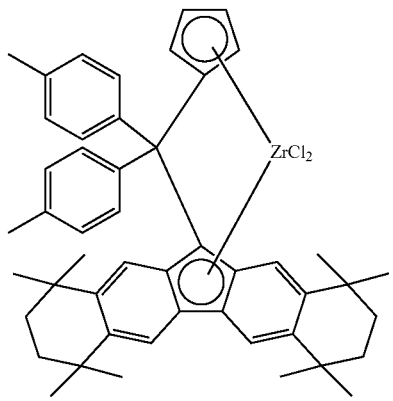

Compound (2)

Example 2

The same procedure as in Example 1 was carried out except that the charged amount of the macromonomer (P-1) was changed to 15.0 g. The amount of the resulting olefin resin was 33.5 g. The analysis results of the resulting olefin resin are shown in Table 1, and the analysis results of the olefin polymer are shown in Table 6.

Example 3

Synthesis of Macromonomer (P-2) (Pre-Process [A-1])

A compound (3) used as a catalyst and a macromonomer were synthesized according to [Synthesis Example 2] in WO 2013-220992 A. The resulting product had an Mw of 4,770 in terms of polyethylene, an Mw/Mn of 2.25, and a ratio of molecules whose one terminal has an unsaturated bond as measured by $^{1}$H-NMR of 97.0 mol %. In the following formula representing the compound (3), Et represents an ethyl group.

[Chem. 24]

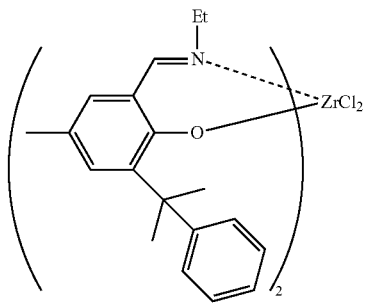

Compound (3)

<Graft Copolymerization (Post-Process [b-1])>

The same procedure as in Example 1 was carried out except that the macromonomer (P-2) was used instead of the macromonomer (P-1). The amount of the resulting olefin resin was 24.5 g. The analysis results of the resulting olefin resin are shown in Table 1, and the analysis results of the olefin polymer are shown in Table 6.

Example 4

The same procedure as in Example 3 was carried out except that the charged amount of the macromonomer (P-2) was changed to 15.0 g. The amount of the resulting olefin resin was 34.4 g. The analysis results of the resulting olefin resin are shown in Table 1, and the analysis results of the olefin polymer are shown in Table 6.

Comparative Example 1

The same procedure as in Example 1 was carried out except that the polymerization was performed without adding any macromonomer. The amount of the resulting olefin resin was 19.6 g. The analysis results of the resulting olefin resin are shown in Table 1, and the analysis results of the olefin polymer are shown in Table 6.

Comparative Example 2

To a sufficiently nitrogen-substituted glass reactor with a capacity of 1 L, 5.0 g of the macromonomer (P-1), 19.6 g of the polymer obtained in Comparative Example 1, and 500 ml of xylene were introduced, and the resultant was heated to 100° C. to allow the macromonomer dissolved and the polymer obtained in Comparative Example 1. The resulting polymer solution was added to 1.5 liter of methanol to allow a polymer precipitated. The precipitated polymer was washed with methanol and then dried under reduced pressure at 80° C. for 10 hours to give 24.6 g of an olefin resin. The analysis results of the resulting olefin resin are shown in Table 1, and the analysis results of the olefin polymer are shown in Table 6.

Comparative Example 3

The same procedure as in Comparative Example 2 was carried out except that the macromonomer (P-2) was used instead of the macromonomer (P-1). The amount of the resulting olefin resin was 24.6 g. The analysis results of the resulting olefin resin are shown in Table 1, and the analysis results of the olefin polymer are shown in Table 6.

Example 5

Graft Copolymerization (Post-Process [B-1])

To a sufficiently nitrogen-substituted glass reactor with a capacity of 1 L, 5.0 g of the macromonomer (P-1) and 500 ml of xylene were introduced, followed by heating to 100° C. to allow the macromonomer dissolved. Then the resultant was cooled to 85° C., and ethylene and 1-butene were supplied continuously thereto at 100 liter/hr and at 68 liter/hr, respectively, to saturate the liquid phase and the gas phase. While continuing to supply ethylene and 1-butene, 1.6 mL (1.6 mmol) of a decane solution (1.0 mol/L) of triisobutylaluminum (also referred to as iBu$_3$Al), 1.0 mL (0.0020 mmol) of a toluene solution (0.0020 mol/L) of the compound (2), and then 1.25 mL (0.005 mmol) of a toluene solution (4.0 mmol/L) of triphenylcarbenium tetrakis(pentafluorophenyl)borate (also referred to as Ph$_3$CB(C$_6$F$_5$)$_4$) were added, and polymerization was performed at 85° C. for 15 minutes under normal pressure. The polymerization was terminated by adding a small amount of isobutanol. The resulting polymerization reaction solution was added to 1.5 liter of methanol containing a small amount of hydrochloric acid to allow a polymer precipitated. The precipitated polymer was washed with methanol and then dried under reduced pressure at 80° C. for 10 hours to give 18.7 g of an olefin resin. The analysis results of the resulting olefin resin are shown in Table 2, and the analysis results of the olefin polymer are shown in Table 7.

Example 6

The same procedure as in Example 5 was carried out except that the macromonomer (P-2) was used instead of the macromonomer (P-1). The amount of the resulting olefin resin was 18.2 g. The analysis results of the resulting olefin resin are shown in Table 2, and the analysis results of the olefin polymer are shown in Table 7.

Comparative Example 4

The same procedure as in Example 5 was carried out except that the polymerization was performed without adding any macromonomer. The analysis results of the resulting olefin resin are shown in Table 2, and the analysis results of the olefin polymer are shown in Table 7.

Example 7

The same procedure as in Example 1 was carried out except that the charged amount of the macromonomer (P-1) was changed to 5.0 g. The amount of the resulting olefin resin was 26.5 g. The analysis results of the resulting olefin resin are shown in Table 2, and the analysis results of the olefin polymer are shown in Table 7.

Figure 3:
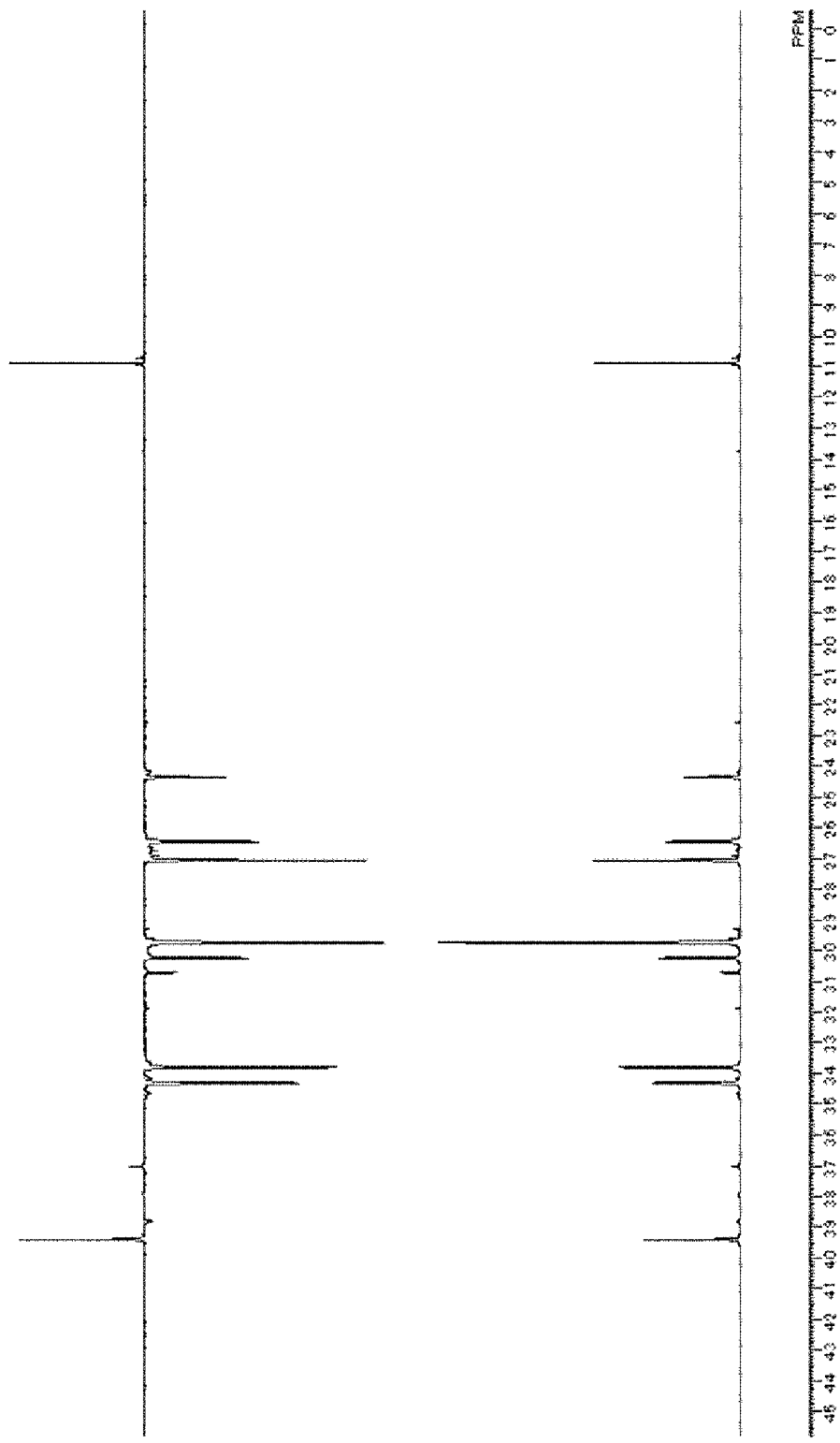
FIG. 3 shows the $^{13}$C-NMR spectra of the olefin resin produced in Example 7.
Figure 4:
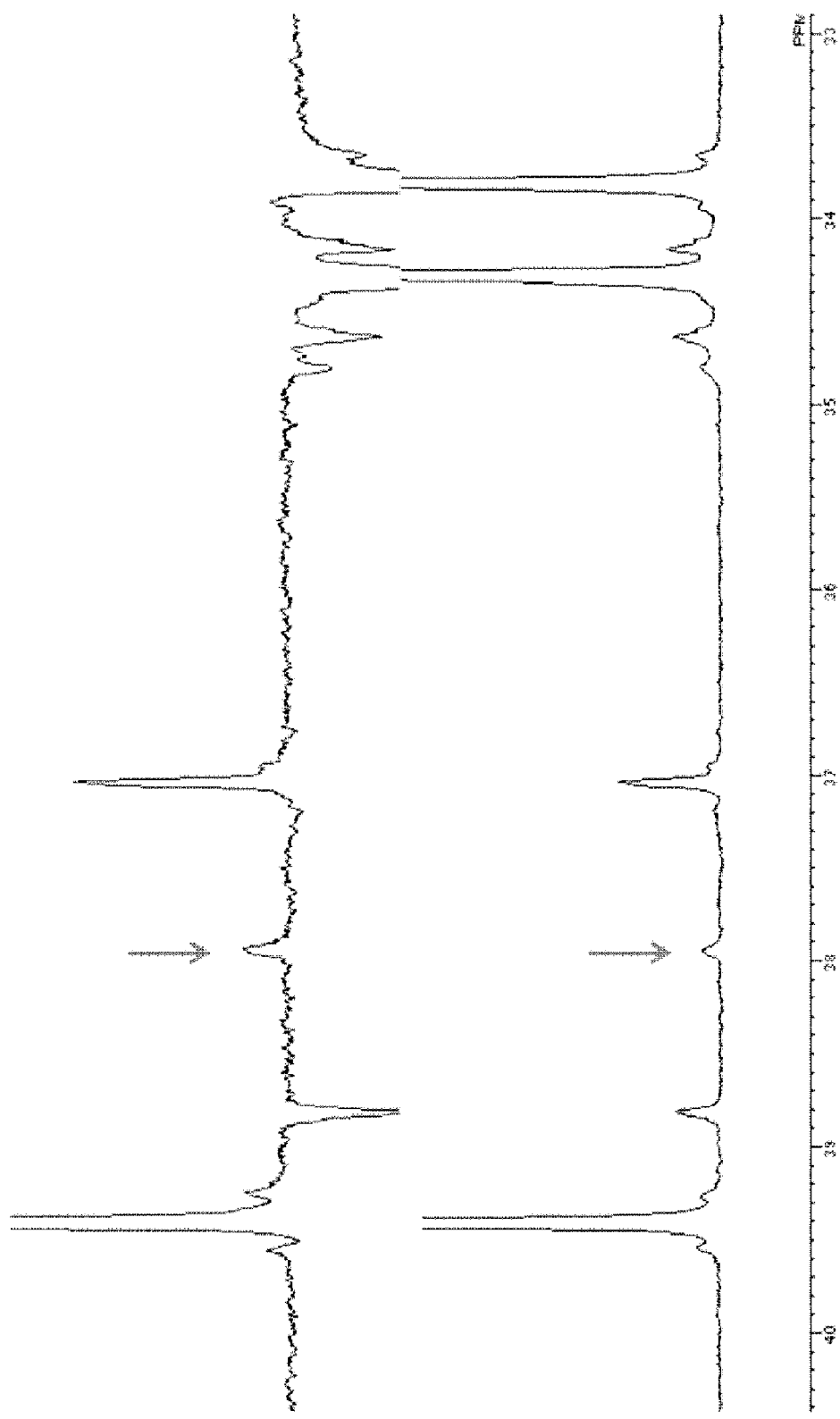
FIG. 4 shows the $^{13}$C-NMR spectra (enlarged views of the region of from 33 to 44 ppm) of the olefin resin produced in Example 7.
Figure 7:
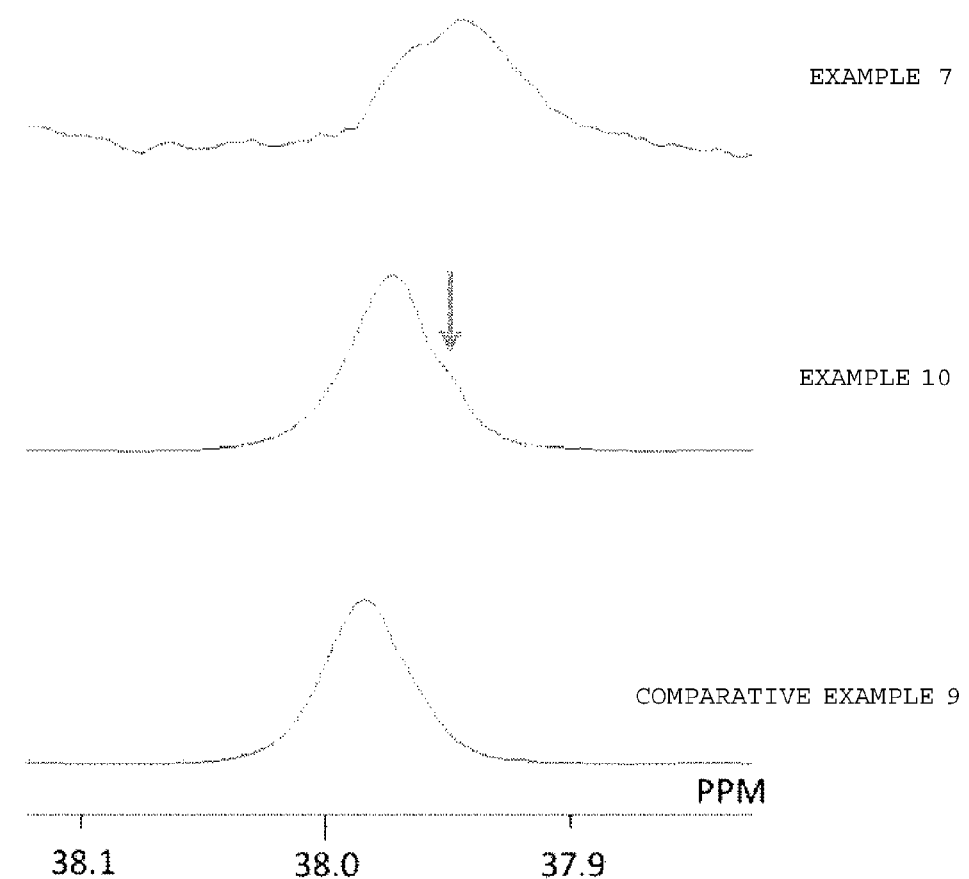
FIG. 7 shows enlarged views of the region around 38 ppm (upper portion: Example 7, mid-portion: Example 10, and lower portion: Comparative Example 9) of the $^{13}$C-NMR spectra of the olefin resins produced in Example 7, Example 10, and Comparative Example 9.

The phase structure (at a magnification of 4,000-fold) observed by a transmission electron microscope is shown in FIG. 1. The $^{13}$C-NMR spectra of the olefin resin are shown in FIG. 3 and FIG. 4 (FIG. 4 shows enlarged views of the region of from 33 to 44 ppm of the spectra shown in FIG. 3; the upper portion of FIG. 3 shows the DEPT 135 spectrum). The upper portion of the FIG. 7 shows a further enlarged view of the region around 38 ppm of the $^{13}$C-NMR spectra.

Comparative Example 5

The same procedure as in Example 7 was carried out except that the polymerization was performed without adding any macromonomer. The amount of the resulting olefin resin was 21.4 g. The analysis results of the resulting olefin resin are shown in Table 2, and the analysis results of the olefin polymer are shown in Table 7.

Comparative Example 6

To a sufficiently nitrogen-substituted glass reactor with a capacity of 1 L, 5.0 g of the macromonomer (P-1), 21.4 g of the polymer obtained in Comparative Example 5, and 500 ml of xylene were introduced, and the resultant was heated to 100° C. to allow the macromonomer dissolved and the polymer obtained in Comparative Example 5. The resulting polymer solution was added to 1.5 liter of methanol to allow a polymer precipitated. The precipitated polymer was washed with methanol and then dried under reduced pressure at 80° C. for 10 hours to give 26.4 g of an olefin resin. The analysis results of the resulting olefin resin are shown in Table 2, and the analysis results of the olefin polymer are shown in Table 7.

Figure 2:
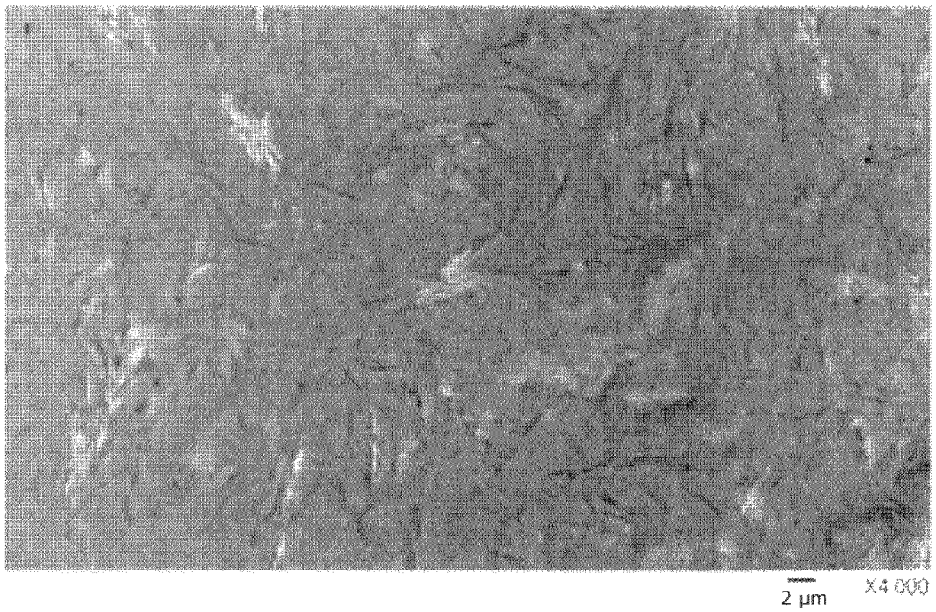
FIG. 2 is an image of the olefin resin produced in Comparative Example 6 obtained by transmission electron microscope observation (at a magnification of 4,000-fold).
Figure 5:
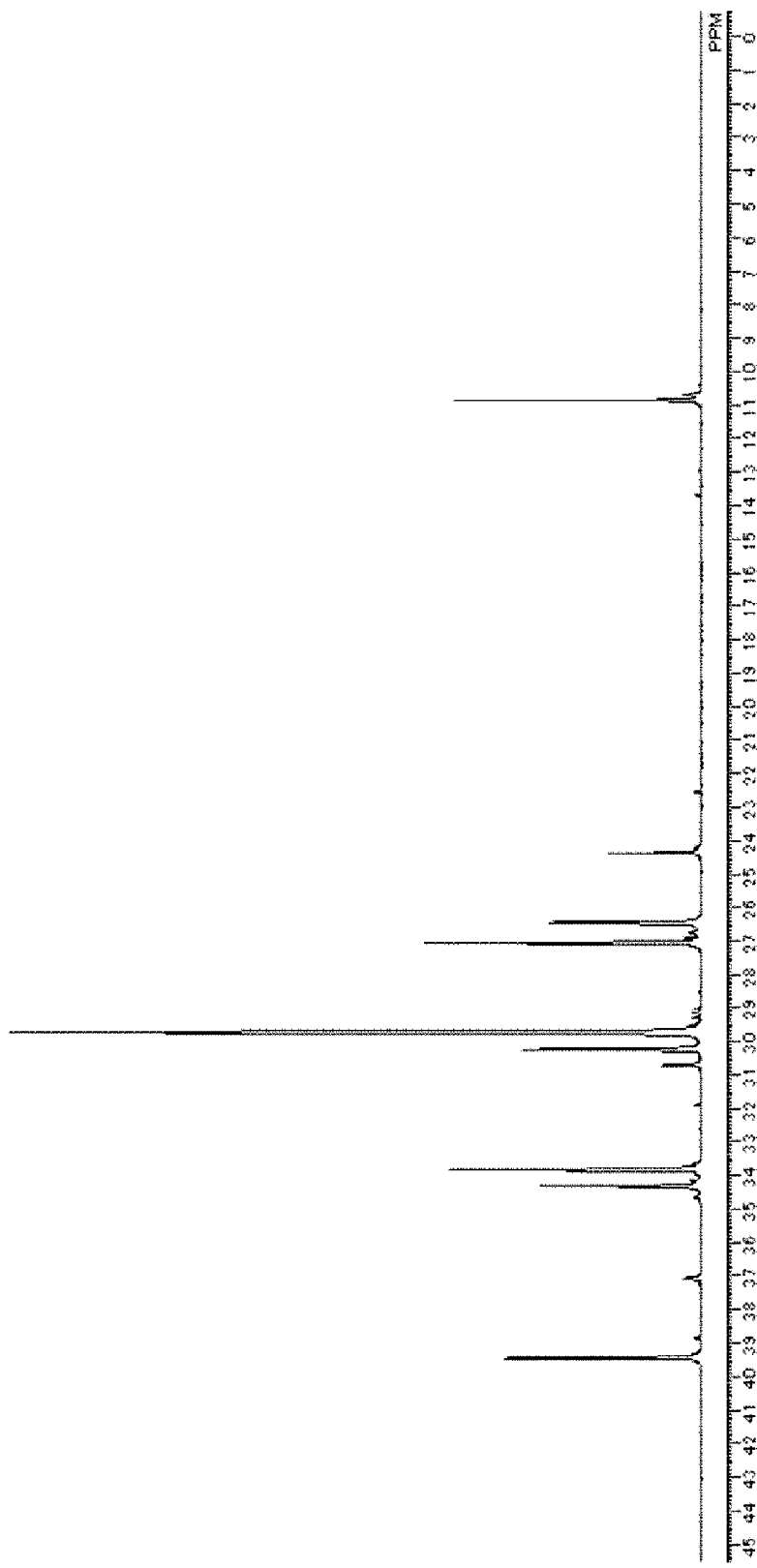
FIG. 5 shows the $^{13}$C-NMR spectrum of the olefin resin produced in Comparative Example 6.
Figure 6:
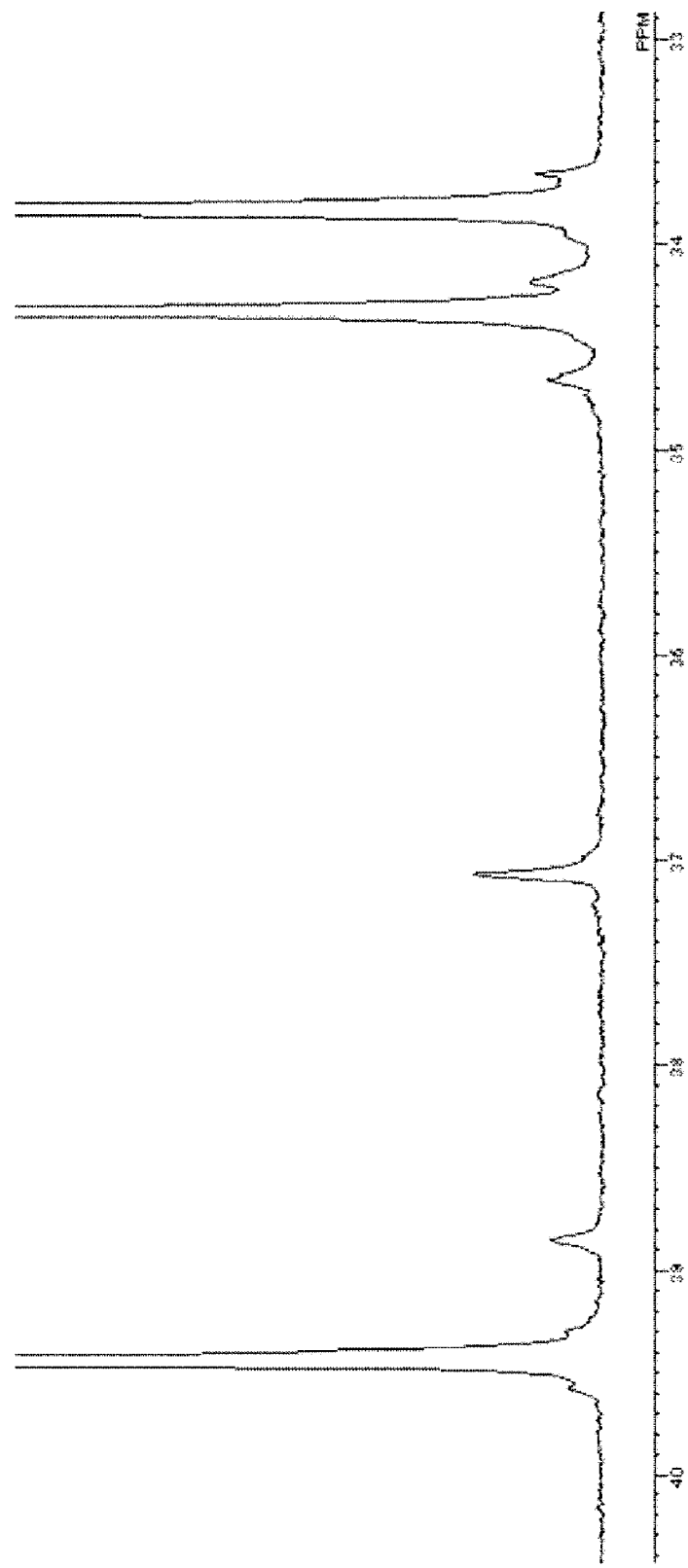
FIG. 6 shows the $^{13}$C-NMR spectrum (an enlarged view of the region of from 33 to 44 ppm) of the olefin resin produced in Comparative Example 6.

In addition, the phase structure (at a magnification of 4,000-fold) observed by a transmission electron microscope is shown in FIG. 2. The $^{13}$C-NMR spectrum is shown in FIG. 5 and FIG. 6 (FIG. 6 is an enraged view of the region of from 33 to 44 ppm).

Example 8

Graft Copolymerization (Post-Process [B-1])

To a sufficiently nitrogen-substituted glass reactor with a capacity of 1 L, 6.0 g of the macromonomer (P-2) and 500 ml of xylene were introduced, followed by heating to 100° C. to allow the macromonomer dissolved. To the resultant, ethylene and propylene were supplied continuously at 100 liter/hr and at 50 liter/hr, respectively, to saturate the liquid phase and the gas phase. While continuing to supply ethylene and propylene, 2.72 mL (4.0 mmol in terms of aluminum atom) of a decane solution of methylaluminoxane (also referred to as MAO), and 4.0 mL (0.0080 mmol) of a toluene solution (0.0020 mol/L) of the compound (2) were added, and polymerization was performed at 100° C. for 15 minutes under normal pressure. The polymerization was terminated by adding a small amount of isobutanol. The resulting polymerization reaction solution was added to 1.5 liter of methanol containing a small amount of hydrochloric acid to allow a polymer precipitated. The precipitated polymer was washed with methanol and then dried under reduced pressure at 80° C. for 10 hours to give 32.0 g of an olefin resin. The analysis results of the resulting olefin resin are shown in Table 3, and the analysis results of the olefin polymer are shown in Table 8.

Comparative Example 7

The same procedure as in Example 8 was carried out except that the polymerization was performed without adding any macromonomer. The amount of the resulting olefin resin was 27.9 g. The analysis results of the resulting olefin resin are shown in Table 3, and the analysis results of the olefin polymer are shown in Table 8.

Example 9

The same procedure as in Example 8 was carried out except that the charged amount of the macromonomer (P-2) was changed to 5.0 g, and that propylene was supplied at 15 liter/hr. The amount of the resulting olefin resin was 25.5 g. The analysis results of the resulting olefin resin are shown in Table 3, and the analysis results of the olefin polymer are shown in Table 8.

Comparative Example 8

The same procedure as in Example 9 was carried out except that the polymerization was performed without adding any macromonomer. The amount of the resulting olefin resin was 20.4 g. The analysis results of the resulting olefin resin are shown in Table 3, and the analysis results of the olefin polymer are shown in Table 8.

Example 10

A compound (4) used as a catalyst was synthesized by a known method.
To a sufficiently nitrogen-substituted stainless steel autoclave having a capacity of 1 L, 5.0 g of the macromonomer (P-1), 500 mL of heptane, 10 mL of 1-octene, and 0.5 mL (0.5 mmol) of a decane solution (1.0 mol/L) of triisobutylaluminum (also referred to as iBu$_3$Al) were introduced under flow of nitrogen. The autoclave was then sealed, heated to 120° C., and maintained at the temperature for 30 minutes. Subsequently, ethylene partial pressure was increased to 0.3 MPa, and the temperature was maintained at 120° C. To the resultant, 3.6 mL (0.00036 mmol) of a toluene solution (0.00010 mol/L) of the compound (4), and then 1.25 mL (0.005 mmol) of a toluene solution (4.0 mmol/L) of triphenylcarbenium tetrakis(pentafluorophenyl) borate (also referred to as Ph$_3$CB(C$_6$F$_5$)$_4$) were injected under pressure to initiate polymerization. The pressure was maintained while continuously supplying ethylene gas, and the polymerization was carried out at 120° C. for 60 minutes. Then the polymerization was terminated by injecting 5 mL of methanol under pressure. The resulting polymerization reaction solution was added to 1.5 liter of a mixed solution of methanol (750 mL) and acetone (750 mL) containing a small amount of hydrochloric acid, to allow a polymer precipitated. The precipitated polymer was washed with methanol and then dried under reduced pressure at 80° C. for 10 hours to give 10.4 g of an olefin resin. The analysis results of the resulting olefin resin are shown in Table 3, and the analysis results of the olefin polymer are shown in Table 8.

Further, the mid-portion of the FIG. 7 shows an enlarged view of the region around 38 ppm of the $^{13}$C-NMR spectrum of the olefin resin.

[Chem. 25]

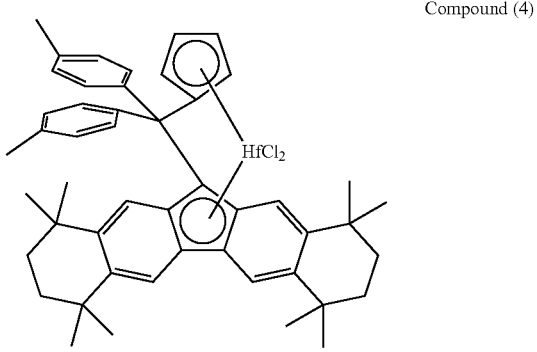

Compound (4)

Comparative Example 9

The same procedure as in Example 10 was carried out except that the charged amount of the compound (4) was changed to 0.00025 mmol, and that the polymerization was carried out without adding any macromonomer. The analysis results of the resulting olefin resin are shown in Table 3, and the analysis results of the olefin polymer are shown in Table 8.

Further, the lower portion of the FIG. 7 shows an enlarged view of the region around 38 ppm of the $^{13}$C-NMR spectrum of the olefin resin.

Example 11

A compound (5) used as a catalyst was synthesized by a known method.
To a stainless steel autoclave equipped with a pressure control valve and having a capacity of 1 L, each of the followings were continuously supplied: heptane at 1,048 mL/hr; octene at 66 mL/hr; a toluene solution of a mixture of the compound (5) and triisobutylaluminum (also referred to as iBu₃Al) (compound (5): 0.025 mmol/L, iBu₃Al: 2.5 mmol/L) at 112 mL/hr; a heptane solution (12.5 mmol/L) of triisobutylaluminum (also referred to as iBu₃Al) at 34 mL/hr; a toluene solution (0.1 mmol/L) of triphenylcarbenium tetrakis(pentafluorophenyl)borate (also referred to as $Ph_3CB(C_6F_5)_4$) at 122 mL/hr; a toluene solution (0.01 mmol/L) of the compound (1) at 28 mL/hr; ethylene at 300 g/L; and hydrogen at 12 mL/h (intermittently supplied at intervals of 42 seconds). The pressure control valve was set at 0.74 MPa, and while maintaining the temperature inside the polymerization vessel at 110° C., the polymerization reaction solution was taken out continuously, such that the amount of liquid inside the polymerization vessel was maintained at 700 mL. Two hours after the start of the introduction of all the above mentioned solvents, monomers, catalysts and the like, the polymerization reaction solution was collected for 30 minutes. The resulting polymerization reaction solution was added to 1.5 liter of a mixed solution of methanol (750 mL) and acetone (750 mL) containing a small amount of hydrochloric acid, to allow a polymer precipitated. The precipitated polymer was washed with methanol and then dried under reduced pressure at 80° C. for 10 hours to give 29.8 g of an olefin resin. The analysis results of the resulting olefin resin are shown in Table 4, and the analysis results of the olefin polymer are shown in Table 9.

[Chem. 26]

Compound (5)

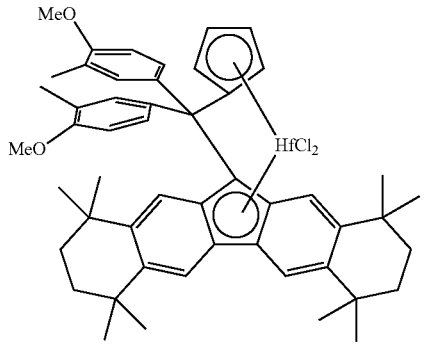

Example 12

The same procedure as in Example 11 was carried out except that the flow rate of the toluene solution of the compound (1) was changed to 56 mL/hr, and the flow rate of heptane was changed to 1,020 mL/hr so that the flow rate of the total liquid would be the same as that in Example 11. The amount of the resulting olefin resin was 34.5 g. The analysis results of the resulting olefin resin are shown in Table 4, and the analysis results of the resulting olefin polymer are shown in Table 9.

Comparative Example 10

The same procedure as in Example 11 was carried out except that the toluene solution of the compound (1) was not introduced, and the flow rate of heptane was changed to 1,076 mL/hr so that the flow rate of the total liquid would be the same as that in Example 11. The amount of the resulting olefin resin was 21.9 g. The analysis results of the resulting olefin resin are shown in Table 4, and the analysis results of the olefin polymer are shown in Table 9.

Comparative Example 11

The analysis results of an olefin block copolymer manufactured by The Dow Chemical Company, brand name "INFUSE 9007", are shown in Table 5.

Comparative Example 12

The analysis results of an olefin block copolymer manufactured by The Dow Chemical Company, brand name "INFUSE 9100", are shown in Table 5.

The analysis results of the polymers of Comparative Examples 1 to 10 shown in Tables 6 to 9 are those of ethylene/α-olefin ethylene/α-olefin copolymers, and each of the resins obtained in the Comparative Examples do not include the olefin polymer [R1]. The numerical values shown in parentheses in the section of "Side chain: ethylene polymer unit" in the rows of Comparative Examples 2 to 3 and Comparative Example 6 in Tables 6 and 7, are the analysis results of the mixed ethylene polymers.

TABLE 1

|  | Example 1 | Example 2 | Example 3 | Example 4 | Comparative Example 1 | Comparative Example 2 | Comparative Example 3 |
|---|---|---|---|---|---|---|---|
| Melting peak [Tm] observed at 60° C. or higher (° C.) | 98.8/114.6 | 103.4/113.8 | 117.0/122.5 | 123.9 | Not observed | 102.2/117.6 | 124.8 |
| Heat of fusion [ΔH] (J/g) | 32.1 | 84.8 | 42.2 | 97.3 | Not observed | 35.7 | 54.6 |
| Amount of portion soluble at 20° C. or lower [E] (%) | 18 | 12 | 22 | 14 | 96 | 75 | 75 |
| Glass transition temperature [Tg] (%) | −71.4 | −69.4 | −71.9 | −71.4 | −72.2 | −72.0 | −72.2 |
| Pulsed NMR Relaxation time T2 fourth (ms) | 218 | 258 | 206 | 249 | — | — | — |
| component Content (%) | 20 | 25.4 | 20.2 | 24.3 | — | — | — |
| Intrinsic viscosity [η] (g/dl) | 1.04 | 0.92 | 1.08 | 1.03 | 1.15 | n.d. | n.d. |
| Elastic modulus (MPa) | 13.3 | 71 | 19.7 | 86.1 | <1.5 | 6.5 | 5.9 |
| Storage elastic modulus ratio (80° C./20° C.) | 5.5 | 4.5 | 2.3 | 2.2 | 18.0 | 11.5 | 4.3 |
| Adhesion (N/10 mm) | 0.35 | 0.0086 | 0.83 | 0.024 | Unable to peal | Unable to peal | Unable to peal |
| Light transmittance 325 nm (%) | 80 | 85 | 79 | 84 | 90 | 48 | 46 |

TABLE 2

|  | Example 5 | Example 6 | Comparative Example 4 | Example 7 | Comparative Example 5 | Comparative Example 6 |
|---|---|---|---|---|---|---|
| Melting peak [Tm] observed at 60° C. or higher (° C.) | 97.7/117.7 | 110.1/123.6 | Not observed | 93.8 | Not observed | 100.9/116.4 |
| Heat of fusion [ΔH] (J/g) | 40.4 | 55.4 | Not observed | 28.0 | Not observed | 32.9 |
| Amount of portion soluble at 20° C. or lower [E] (%) | 12 | 16 | 98 | 13.7 | 96 | 79.9 |
| Glass transition temperature [Tg] (%) | −70.2 | −72.7 | −72.5 | −70.3 | −71.2 | −71.5 |
| Pulsed NMR fourth component — Relaxation time T2 (ms) | 220 | 203 | — | 243 | — | 382 |
| Pulsed NMR fourth component — Content (%) | 22.3 | 21.6 | — | 18.9 | — | 26.1 |
| Intrinsic viscosity [η] (g/dl) | 1.9 | 1.77 | 2.12 | 1.68 | 1.99 | — |
| Elastic modulus (MPa) | 22.4 | 27.0 | 1.7 | 14.5 | n.d. | 7.3 |
| Storage elastic modulus ratio (80° C./20° C.) | — | — | — | — | — | — |
| Adhesion (N/10 mm) | 0.84 | 1.20 | Unable to peal | 0.61 | Unable to peal | Unable to peal |
| Light transmittance 325 nm (%) | 78 | 79 | 91 | 85 | 84 | 50 |

TABLE 3

|  | Example 8 | Comparative Example 7 | Example 9 | Comparative Example 8 | Example 10 | Comparative Example 9 |
|---|---|---|---|---|---|---|
| Melting peak [Tm] observed at 60° C. or higher (° C.) | 114.7 | −35.5 | 113.9 | 48.4 | 104.9/119.5 | Not observed |
| Heat of fusion [ΔH] (J/g) | 35.6 | 7.6 | 26.0 | 60.1 | 97.2 | Not observed |
| Amount of portion soluble at 20° C. or lower [E] (%) | 22 | 96 | 19 | 72 | 6 | 56 |
| Glass transition temperature [Tg] (%) | −60.0 | −60.6 | −46.6 | −51.3 | −60.3 | −60.7 |
| Pulsed NMR fourth component — Relaxation time T2 (ms) | 177 | — | 176 | — | 453 | — |
| Pulsed NMR fourth component — Content (%) | 20.4 | — | 15.2 | — | 34.1 | — |
| Intrinsic viscosity [η] (g/dl) | 1.26 | 1.24 | 1.46 | 1.32 | 1.52 | 2.5 |
| Elastic modulus (MPa) | — | — | — | — | — | — |
| Storage elastic modulus ratio (80° C./20° C.) | — | — | — | — | — | — |
| Adhesion (N/10 mm) | 0.062 | Unable to peal | 0.0045 | 0.0124 | 0.0074 | Unable to peal |
| Light transmittance 325 nm (%) | 79 | 93 | 74 | 82 | 71 | 81 |

TABLE 4

|  | Example 11 | Example 12 | Comparative Example 10 |
|---|---|---|---|
| Melting peak [Tm] observed at 60° C. or higher (° C.) | 62.5 | 116.8/61.7 | Not observed |
| Heat of fusion [ΔH] (J/g) | 59.4 | 64.6 | Not observed |
| Amount of portion soluble at 20° C. or lower [E] (%) | 15.6 | 9.0 | 53.3 |
| Glass transition temperature [Tg] (%) | −59.1 | −59.3 | −61.9 |
| Pulsed NMR fourth component — Relaxation time T2 (ms) | 152 | 254 | 145 |
| Pulsed NMR fourth component — Content (%) | 16 | 19.0 | 12.5 |
| Intrinsic viscosity [η] (g/dl) | 1.34 | 1.16 | 1.50 |
| Elastic modulus (MPa) | — | — | — |
| Storage elastic modulus ratio (80° C./20° C.) | 96.7 | 23.0 | 216.6 |
| Adhesion (N/10 mm) | 0.58 | 0.034 | 1.16 Fully stretched |
| Light transmittance 325 nm (%) | 83 | 85 | 88 |

TABLE 5

|  | Comparative Example 11 | Comparative Example 12 |
|---|---|---|
| Melting peak [Tm] observed at 60° C. or higher (° C.) | 119.5 | 121.4 |
| Heat of fusion [ΔH] (J/g) | 22 | 57.9 |
| Amount of portion soluble at 20° C. or lower [E] (%) | 31.2 | 12.0 |
| Glass transition temperature [Tg] (%) | −65.0 | −62.0 |
| Pulsed NMR fourth component — Relaxation time T2 (ms) | 137 | 152 |
| Pulsed NMR fourth component — Content (%) | 8.6 | 10.0 |
| Intrinsic viscosity [η] (g/dl) | — | — |
| Elastic modulus (MPa) | 11.0 | — |
| Storage elastic modulus ratio (80° C./20° C.) | 3.4 | 2.9 |
| Adhesion (N/10 mm) | 3.4 | 0.35 |
| Light transmittance 325 nm (%) | 70 | 53 |

TABLE 6

|  |  |  | Example 1 | Example 2 | Example 3 | Example 4 | Comparative Example 1 | Comparative Example 2 | Comparative Example 3 |
|---|---|---|---|---|---|---|---|---|---|
| Structure of olefin polymer [R1] | Main chain: ethylene/α-olefin copolymer unit | α-olefin species | 1-butene | 1-butene | 1-butene | 1-butene | 1-butene | 1-butene | 1-butene |
|  |  | α-olefin composition (mol %) | 32 | 32 | 32 | 32 | 32 | 32 | 32 |
|  |  | Intrinsic viscosity [η] (g/dl) | 1.15 | 1.15 | 1.15 | 1.15 | 1.15 | 1.15 | 1.15 |
|  | Side chain: ethylene polymer unit | Weight average molecular weight | 1600 | 1600 | 5300 | 5300 | — | (1600) | (5300) |
|  |  | Number of grafts (/1,000 C) | 3.7 | 10.6 | 1.1 | 3.7 | — | 0 | 0 |
|  |  | Methyl branches (/1,000 C) | <0.05 | <0.05 | <0.05 | <0.05 | — | (<0.05) | (<0.05) |
| Composition ratio of remaining macromonomer (wt %) |  |  | 6.1 | 14.1 | 7.0 | 16.9 | 0 | 21.5 | 20.4 |
| Composition ratio of olefin polymer [R1] (wt %) |  |  | 75 | 73 | 70 | 69 | 0 | 0 | 0 |

TABLE 7

|  |  |  | Example 5 | Example 6 | Comparative Example 4 | Example 7 | Comparative Example 5 | Comparative Example 6 |
|---|---|---|---|---|---|---|---|---|
| Structure of olefin polymer [R1] | Main chain: ethylene/α-olefin copolymer unit | α-olefin species | 1-butene | 1-butene | 1-butene | 1-butene | 1-butene | 1-butene |
|  |  | α-olefin composition (mol %) | 35 | 35 | 35 | 24 | 24 | 24 |
|  |  | Intrinsic viscosity [η] (g/dl) | 2.12 | 2.12 | 2.12 | 1.99 | 1.99 | 1.99 |
|  | Side chain: ethylene polymer unit | Weight average molecular weight | 1600 | 5300 | — | 1600 | — | (1600) |
|  |  | Number of grafts (/1,000 C) | 2.6 | 1 | — | 3.2 | — | 0 |
|  |  | Methyl branches (/1,000 C) | <0.05 | <0.05 | — | <0.05 | — | (<0.05) |
| Composition ratio of remaining macromonomer (wt %) |  |  | 15.3 | 16.4 | 0 | 5.5 | 0 | 19.2 |
| Composition ratio of olefin polymer [R1] (wt %) |  |  | 72 | 67 | 0 | 80 | 0 | 0 |

TABLE 8

|  |  |  | Example 8 | Comparative Example 7 | Example 9 | Comparative Example 8 | Example 10 | Comparative Example 9 |
|---|---|---|---|---|---|---|---|---|
| Structure of olefin polymer [R1] | Main chain: ethylene/α-olefin copolymer unit | α-olefin species | propylene | propylene | propylene | propylene | 1-octene | 1-octene |
|  |  | α-olefin composition (mol %) | 36 | 36 | 17 | 17 | 15 | 17 |
|  |  | Intrinsic viscosity [η] (g/dl) | 1.24 | 1.24 | 1.32 | 1.32 | 2.3 | 2.5 |
|  | Side chain: ethylene polymer unit | Weight average molecular weght | 5300 | — | 5300 | — | 1600 | — |
|  |  | Number of grafts (/1,000 C) | 1.4 | — | 1.42 | — | 5.7 | — |
|  |  | Methyl branches (/1,000 C) | <0.05 | — | <0.05 | — | <0.05 | — |
| Composition ratio of remaining macromonomer (wt %) |  |  | 2.0 | 0 | 1 | 0 | 32.3 | 0 |
| Composition ratio of olefin polymer [R1] (wt %) |  |  | 75 | 0 | 73 | 0 | 57 | 0 |

TABLE 9

|  |  |  | Example 11 | Example 12 | Comparative Example 10 |
|---|---|---|---|---|---|
| Structure of olefin polymer [R1] | Main chain: ethylene/α-olefin copolymer unit | α-olefin species | 1-octene | 1-octene | 1-octene |
|  |  | α-olefin composition (mol %) | Up to 15 | Up to 15 | 15 |
|  |  | Intrinsic viscosity [η] (g/dl) | Up to 1.5 | Up to 1.5 | 1.50 |
|  | Side chain: ethylene polymer unit | Weight average molecular weight | 1600 | 1600 | — |
|  |  | Number of grafts (/1,000 C) | 0.5 | 3.1 | — |
|  |  | Methyl branches (/1,000 C) | 1.6 | 8.7 | 0 |
| Composition ratio of remaining macromonomer (wt %) |  |  | 1.6 | 8.7 | 0 |
| Composition ratio of olefin polymer [R1] (wt %) |  |  | 69 | 79 | 0 |

The Comparison of the above mentioned Examples with Comparative Examples will now be described in detail.

Comparison of Examples 1 to 4 with Comparative Example 1

The resin of Comparative Example 1 is an ethylene/α-olefin copolymer which is equivalent to the main chain unit of the olefin polymer included in the resins of Examples 1 to 4. While the resins of Examples 1 to 4 satisfy the requirements of the present invention due to including a significant amount the olefin polymer [R1], the resin of Comparative Example 1 does not satisfy the requirements of the present invention regarding the melting peak Tm, the heat of fusion ΔH, and the amount E of the portion soluble at 20° C. or lower. Consequently, the results of the solid viscoelasticity test and the adherence test respectively indicate that the resins of Examples 1 to 4 have a better heat resistance and reduced stickiness as compared to Comparative Example 1.

Comparison of Example 1 with Comparative Example 2

The resin of Comparative Example 2 is one obtained by mixing the ethylene/α-olefin copolymer component and the ethylene polymer component included in the resin of Example 1 at the same weight ratio as in Example 1. While the resin of Example 1 satisfies the requirements of the present invention due to including a significant amount of the olefin polymer [R1], the resin of Comparative Example 2 does not satisfy the requirement of the present invention regarding the amount E of the portion soluble at 20° C. or lower. Consequently, the results of the solid viscoelasticity test, the adherence test, and the light transmittance measurement respectively indicate that the resin of Example 1 has a better heat resistance, a reduced stickiness, and a better light transmittance as compared to Comparative Example 2.

Comparison of Example 3 with Comparative Example 3

The resin of Comparative Example 3 is one obtained by mixing the ethylene/α-olefin copolymer component and the ethylene polymer component included in the resin of Example 3 at the same weight ratio as in Example 3. While the resin of Example 3 satisfies the requirements of the present invention due to including a significant amount of the olefin polymer [R1], the resin of Comparative Example 3 does not satisfy the requirement of the present invention regarding the amount E of the portion soluble at 20° C. or lower. Consequently, the results of the solid viscoelasticity test, the adherence test, and the light transmittance measurement respectively indicate that the resin of Example 3 has a better heat resistance, a reduced stickiness, and a better light transmittance as compared to Comparative Example 3.

Comparison of Examples 5 and 6 with Comparative Example 4

The resin of Comparative Example 4 is an ethylene/α-olefin copolymer equivalent to the main chain unit of the olefin polymer [R1] included in the resins of Examples 5 and 6. While the resins of Example 5 and 6 satisfy the requirements of the present invention due to including a significant amount of the olefin polymer [R1], the resin of Comparative Example 4 does not satisfy the requirements of the present invention regarding the melting peak Tm, the heat of fusion ΔH, and the amount E of the portion soluble at 20° C. or lower. Consequently, the results of the adherence test indicate that the resins of Examples 5 and 6 have less stickiness as compared to Comparative Example 4.

Comparison of Example 7 with Comparative Example 5

The resin of Comparative Example 5 is an ethylene/α-olefin copolymer equivalent to the main chain unit of the olefin polymer [R1] included in the resin of Example 7. While the resin of Example 7 satisfies the requirements of the present invention due to including a significant amount of the olefin polymer [R1], the resin of Comparative Example 5 does not satisfy the requirements of the present invention regarding the melting peak Tm, heat of fusion ΔH, and the amount E of the portion soluble at 20° C. or lower. Consequently, the results of the adherence test indicate that the resin of Example 7 has less stickiness as compared to Comparative Example 5.

Comparison of Example 7 with Comparative Example 6

The resin of Comparative Example 6 is one obtained by mixing the ethylene/α-olefin copolymer component and the ethylene polymer component included in Example 7 at the same weight ratio as in Example 7. While the resin of Example 7 satisfies the requirements of the present invention due to including a significant amount of the olefin polymer [R1], the resin of Comparative Example 3 does not satisfy the requirement of the present invention regarding the amount E of the portion soluble at 20° C. or lower. Consequently, the results of the adherence test and the light transmittance measurement respectively indicate that the resin of Example 7 has less stickiness and a better light transmittance as compared to Comparative Example 6.

Further, it can be seen from FIG. 1 and FIG. 2 that, in the phase structure of the resin of Comparative Example 6 shown in FIG. 2, a lamellar structure indicating the crystalline component spreads over the entire visual field, forming a continuous phase, whereas in the phase structure of the resin of Example 7 shown in FIG. 1, a phase indicating the crystalline component is a discontinuous phase of micrometer order. The reason for this is thought to be as follows: since the resin of Example 7 includes a significant amount of the olefin polymer [R1], the non-crystalline or low-crystalline component composed of the ethylene/α-olefin copolymer component and the crystalline component composed of the ethylene polymer component in the resin are highly compatible, thereby resulting in the formation of the above mentioned microphase-separated structure.

Further, as shown in FIG. 3, FIG. 4 and the upper portion of the FIG. 7, in the $^{13}$C-NMR spectrum of the resin of Example 7, a signal (37.94 ppm) assigned to the methine carbon derived from the insertion of the macromonomer is observed in addition to a signal (39.41 ppm) assigned to the methine carbon derived from insertion of 1-butene. On the other hand, as shown in FIG. 5 and FIG. 6, in the $^{13}$C-NMR spectrum of the resin of Comparative Example 6, although the signal assigned to the methine carbon derived from insertion of 1-butene is observed, the signal assigned to the methine carbon derived from insertion of the macromonomer is not observed. From this, it is confirmed that the copolymerization of ethylene and 1-butene in the presence of macromonomer results in the formation of a significant amount of a graft-type polymer including ethylene polymer units as side chains.

Comparison of Example 8 with Comparative Example 7

The resin of Comparative Example 7 is an ethylene/α-olefin copolymer equivalent to the main chain unit of the olefin polymer [R1] included in the resin of Example 8. While the resin of Example 8 satisfies the requirements of the present invention by including a significant amount of the olefin polymer [R1], the resin of Comparative Example 7 does not satisfy the requirements of the present invention regarding the melting peak Tm and the amount E of the portion soluble at 20° C. or lower. Consequently, the results of the adherence test indicate that the resin of Example 8 has less stickiness as compared to Comparative Example 7.

Comparison of Example 9 with Comparative Example 8

The resin of Comparative Example 8 is an ethylene/α-olefin copolymer equivalent to the main chain unit of the olefin polymer [R1] included in the resin of Example 9. While the resin of Example 9 satisfies the requirements of the present invention due to including a significant amount of the olefin polymer [R1], the resin of Comparative Example 8 does not satisfy the requirements of the present invention regarding the melting peak Tm and the amount E of the portion soluble at 20° C. or lower. Consequently, the results of the adherence test indicate that the resin of Example 9 has less stickiness as compared to Comparative Example 8.

Comparison of Example 10 with Comparative Example 9

The resin of Comparative Example 9 is an ethylene/α-olefin copolymer equivalent to the main chain unit of the olefin polymer [R1] included in the resin of the Example 10. While the resin of Example 10 satisfies the requirements of the present invention due to including a significant amount the olefin polymer [R1], the resin of Comparative Example 9 does not satisfy the requirements of the present invention regarding the melting peak Tm, the heat of fusion ΔH, and the amount E of the portion soluble at 20° C. or lower. Consequently, the results of the adherence test indicate that the resin of Example 10 has less stickiness as compared to Comparative Example 9.

Further, as shown in the mid-portion of FIG. 7, in the $^{13}$C-NMR spectrum of the resin of Example 10, a signal (37.95 ppm) assigned to the methine carbon derived from insertion of the macromonomer (signal shown with an arrow) is observed in addition to a signal (37.97 ppm) assigned to the methine carbon derived from insertion of 1-octene. On the other hand, as shown in the lower portion of FIG. 7, in the $^{13}$C-NMR spectrum of the resin of Comparative Example 9, while the signal assigned to the methine carbon derived from insertion of 1-butene is observed, the signal assigned to the methine carbon derived from insertion of the macromonomer is not observed. From this, it is confirmed that the copolymerization of ethylene and 1-octene in the presence of the macromonomer results in the formation of a significant amount of a graft-type polymer including ethylene polymer units as side chains.

Comparison of Examples 11 and 12 with Comparative Example 10

The resin of Comparative Example 10 was produced in the same manner as in Examples 11 and 12 but without adding a catalyst component that produces the macromonomer. In view of the fact that the production conditions and the glass transition temperature thereof are approximately the same, the resin of Comparative Example 10 is assumed to be an ethylene/α-olefin copolymer equivalent to the main chain unit of the olefin polymer [R1] included in the resins of Examples 11 and 12. While the resins of Examples 11 and 12 satisfy the requirements of the present invention due to including a significant amount of the olefin polymer [R1], the resin of Comparative Example 10 does not satisfy the requirements of the present invention regarding the melting peak Tm, heat of fusion ΔH, and the amount E of the portion soluble at 20° C. or lower. Consequently, the results of the adherence test indicate that the resins of Examples 11 and 12 have less stickiness as compared to Comparative Example 10.

Comparison of Examples 1 to 12 with Comparative Example 11

The resin of Comparative Example 11 is known to include a polymer having a multi-block structure of an ethylene polymer chain and an ethylene/1-octene copolymer chain. While the resins of Examples 1 to 12 satisfy the requirements of the present invention due to including a significant amount of the olefin polymer [R1], the resin of Comparative Example 11 does not satisfy the requirement of the present invention regarding the spin-spin relaxation time (T2) of the component having the highest mobility, as obtained in the four-component approximation performed for the free induction decay curve in the above mentioned pulsed NMR, and the abundance ratio of the component. Consequently, the results of the adherence test indicate that the resins of Examples 1 to 12 have less stickiness as compared to Comparative Example 11. Further, it can be seen from the results of the light transmittance measurement that the resins of Examples 1 to 12 have an equivalent or better light transmittance as compared to Comparative Example 11.

Comparison of Examples 1 to 12 with Comparative Example 12

The resin of Comparative Example 12 is known to include a polymer having a multi-block structure of an ethylene polymer chain and an ethylene/1-octene copolymer chain. While the resins of Examples 1 to 12 satisfy the requirements of the present invention due to including a significant amount of the olefin polymer [R1], the resin of Comparative Example 12 does not satisfy the requirement of the present invention regarding the spin-spin relaxation time (T2) of the component having the highest mobility, as obtained in the four-component approximation performed for the free induction decay curve in the above mentioned pulsed NMR, and the abundance ratio of the component. Consequently, the results of the light transmittance measurement indicate that the resins of Examples 1 to 12 have a better light transmittance as compared to Comparative Example 12. Further, it can be seen from the results of the adherence test that resins of Examples 1 to 12 have an equivalent or less stickiness as compared to Comparative Example 12.

The invention claimed is:
1. An olefin resin satisfying the following requirements (I) to (V):
(I) a melting peak (Tm) as measured by differential scanning calorimetry (DSC) is observed within the range of from 60° C. to 130° C., and the heat of fusion ΔH at the melting peak is within the range of from 5 to 150 J/g;
(II) the percentage E (wt %) of a portion soluble in o-dichlorobenzene at 20° C. or lower as measured by cross-fractionation chromatography (CFC), and the heat of fusion ΔH as described in (I) above, satisfy the following relationships:

when the ΔH is 5 J/g or more and less than 15 J/g, the value E is 45 wt % or less, when the ΔH is 15 J/g or more and less than 30 J/g, the value E is 40 wt % or less, and when the ΔH is 30 J/g or more, the value E is 30 wt % or less;

(III) the glass transition temperature (Tg) as measured by differential scanning calorimetry (DSC) is within the range of −80 to −30° C.;

(IV) the spin-spin relaxation time (T2) of a component having the highest mobility, as obtained in a four-component approximation by a Lorentzian function performed for a free induction decay curve obtained by Carr Purcell Meiboom Gill method in a pulsed nuclear magnetic resonance measurement (pulsed NMR) at 200° C., is within the range of from 150 to 500 ms, and the abundance ratio of the component is within the range of from 15 to 50%; and (V) the intrinsic viscosity [η] as measured in decalin at 135° C. is within the range of from 0.1 to 12 dl/g.

2. The olefin resin according to claim 1, wherein the olefin resin has a tensile elastic modulus in accordance with ASTM D638 within the range of from 2 to 120 MPa.

3. A method for producing the olefin resin according to claim 1, the method comprising the step of copolymerizing ethylene and at least one α-olefin selected from α-olefins having from 3 to 20 carbon atoms in the presence of an olefin polymerization catalyst comprising each of the following components (A) to (C):

(A) a transition metal compound of a transition metal of Group 4 in the periodic table, the compound comprising a ligand having a cyclopentadienyl skeleton;

(B) at least one transition metal compound selected from compounds represented by the following general formulae [B0], [B1], or [B2]; and (C) at least one compound selected from an organometallic compound (C-1), an organoaluminum oxy compound (C-2), or a compound (C-3) which reacts with the transition metal compound (A) or the transition metal compound (B) to form an ion pair;

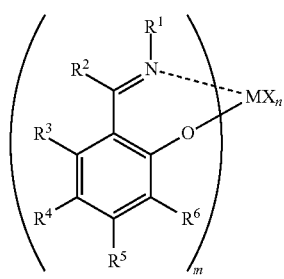
[B0]

wherein in the general formula [B0],

M represents a transition metal atom of Group 4 or 5 in the periodic table, m represents an integer of from 1 to 4;

$R^1$ represents an acyclic hydrocarbon group ($C_{n'}H_{2n'+1}$, n'=1 to 20) having from 1 to 20 carbon atoms or a hydrogen atom;

$R^2$ to $R^6$, which may be the same or different from each other, each represents a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group, and two or more of these are optionally bound together to form a ring;

in cases where m is two or more, two of the groups represented by $R^2$ to $R^6$ are optionally bound to each other;

n is a number satisfying the valence of M;

X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group; and in cases where n is two or more, Xs may be the same or different from each other, and a plurality of groups represented by X are may be bonded to each other to form a ring

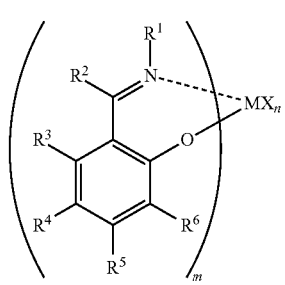
[B1]

wherein in the general formula [B1],

M represents a transition metal of the Group 4 or 5 in the periodic table;

m represents an integer of from 1 to 4;

$R^1$ represents an alicyclic hydrocarbon group of a 3- to 10-membered ring, optionally including one or more substituents;

$R^2$ to $R^6$, which may be the same or different from each other, each represents a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group, and two or more of these are optionally bound together to form a ring;

in cases where m is two or more, two of the groups represented by $R^2$ to $R^6$ are optionally bound to each other;

n is a number satisfying the valence of M;

X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group; and in cases where n is two or more, Xs may be the same or different from each other, and a plurality of groups represented by X may be bonded to each other to form a ring

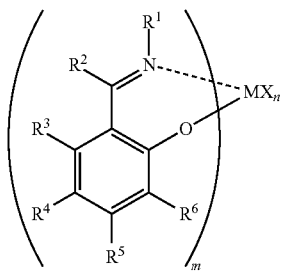

[B2]

wherein in the general formula [B2],

M represents a transition metal of the Group 4 or 5 in the periodic table;

m represents an integer of from 1 to 4;

$R^1$ represents a bicyclic aliphatic hydrocarbon group having from 4 to 20 carbon atoms, optionally containing one or more substituents, wherein the two rings of the bicyclic aliphatic hydrocarbon group share at least one or more carbon atoms;

$R^2$ to $R^6$, which may be the same or different from each other, each represents a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group, and two or more of these are optionally bound together to form a ring;

in cases where m is two or more, two of the groups represented by $R^2$ to $R^6$ are optionally bound to each other;

n is a number satisfying the valence of M;

X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group; and in cases where n is two or more, Xs may be the same or different from each other, and a plurality of groups represented by X may be bonded to each other to form a ring.

4. The method for producing the olefin resin, according to claim 3, wherein the transition metal compound (A) is a bridged metallocene compound represented by the following general formula (I):

[Chem. 4]

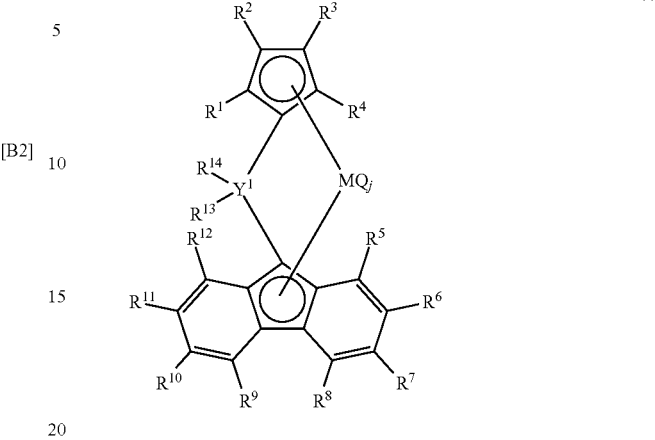

(I)

wherein in the formula (I), $R^1$, $R^2$, $R^3$, $R^4$, $R^5$, $R^8$, $R^9$ and $R^{12}$ each independently represents a hydrogen atom, a hydrocarbon group, a silicon-containing group, or a hetero atom-containing group other than silicon-containing groups, and two adjacent groups of the groups represented by $R^1$ to $R^4$ are optionally bound together to form a ring;

$R^6$ and $R^{11}$ are the same atom or the same group selected from hydrogen atom, hydrocarbon groups, silicon-containing groups, or hetero atom-containing groups other than the silicon-containing groups; $R^7$ and $R^{10}$ are the same atom or the same group selected from hydrogen atom, hydrocarbon groups, silicon-containing groups, or hetero atom-containing groups other than the silicon-containing groups; $R^6$ and $R^7$ are optionally bound together to form a ring; and $R^{10}$ and $R^{11}$ are optionally bound together to form a ring; with the proviso that not all of $R^6$, $R^7$, $R^{10}$ and $R^{11}$ are hydrogen atoms;

$R^{13}$ and $R^{14}$ each independently represent an aryl group;

M represents a titanium atom, a zirconium atom or a hafnium atom;

$Y^1$ represents a carbon atom or a silicon atom;

Q represents a halogen atom, a hydrocarbon group, a halogenated hydrocarbon group, a neutral conjugated or non-conjugated diene having from 4 to 10 carbon atoms, an anionic ligand or a neutral ligand capable of being coordinated with a lone pair of electrons;

j represents an integer of from 1 to 4; and in cases where j is an integer of two or more, a plurality of Qs may be the same as or different from each other.

5. The method for producing the olefin resin, according to claim 3, wherein the step of copolymerizing is carried out by a solution polymerization method at a temperature within the range of from 80 to 300° C.

6. A molded article obtained from the olefin resin according to claim 1.

7. An olefin polymer (R1) composed of a main chain polymer and a side chain polymer satisfying the following requirements:

(i) a main chain is composed of repeating units derived from ethylene, and repeating units derived from at least one α-olefin selected from α-olefins having from 3 to 20 carbon atoms, wherein the content of the repeating units derived from the α-olefin in the main chain is within the range of from 5 to 40 mol %;

(ii) the main chain has an intrinsic viscosity [η] as measured in decalin at 135° C. within the range of from 0.5 to 5 dl/g;

(iii) a side chain(s) is/are composed of repeating units derived from ethylene, and optional repeating units derived from at least one α-olefin selected from α-olefins having from 3 to 20 carbon atoms, wherein the content of the repeating units derived from ethylene in the side chain(s) is within the range of from 95 to 100 mol %;

(iv) the side chain(s) has/have a weight average molecular weight within the range of from 500 to 10,000; and (v) the side chain(s) is/are bound to the main chain at a ratio of 0.5 to 20 side chains per 1,000 main chain carbon atoms.

* * * * *